United States Patent
Kandadai et al.

(10) Patent No.: US 11,269,421 B2
(45) Date of Patent: Mar. 8, 2022

(54) METHOD AND APPARATUS FOR APPLYING FREE SPACE INPUT FOR SURFACE CONSTRAINED CONTROL

(71) Applicant: Atheer, inc., Santa Clara, CA (US)

(72) Inventors: Shashwat Kandadai, Cupertino, CA (US); Nathan Abercrombie, Oakland, CA (US); Yu-Hsiang Chen, Cupertino, CA (US); Sleiman Itani, East Palo Alto, CA (US)

(73) Assignee: Atheer, Inc., Santa Clara, CA (US)

( * ) Notice: Subject to any disclaimer, the term of this patent is extended or adjusted under 35 U.S.C. 154(b) by 0 days.

(21) Appl. No.: 17/175,671

(22) Filed: Feb. 14, 2021

(65) Prior Publication Data

US 2021/0311557 A1    Oct. 7, 2021

Related U.S. Application Data

(63) Continuation of application No. 16/458,470, filed on Jul. 1, 2019, now Pat. No. 10,955,930, which is a continuation of application No. 14/713,954, filed on May 15, 2015, now Pat. No. 10,401,966.

(51) Int. Cl.
  *G06F 3/01*    (2006.01)
  *G02B 27/01*    (2006.01)

(52) U.S. Cl.
  CPC ........... *G06F 3/017* (2013.01); *G02B 27/017* (2013.01)

(58) Field of Classification Search
  CPC ............................ G06F 3/017; G02B 27/017
  See application file for complete search history.

(56) References Cited

U.S. PATENT DOCUMENTS

| | | | |
|---|---|---|---|
| 7,898,522 B2* | 3/2011 | Hildreth | G06T 7/593 345/156 |
| 8,984,542 B2 | 3/2015 | Adams et al. | |
| 9,442,575 B1 | 9/2016 | Kandadai et al. | |
| 9,874,977 B1 | 1/2018 | Soyannwo et al. | |
| 9,946,383 B2 | 4/2018 | Cady et al. | |
| 2008/0094370 A1 | 4/2008 | Ording et al. | |
| 2008/0235621 A1 | 9/2008 | Boillot | |
| 2009/0322687 A1 | 12/2009 | Duncan et al. | |
| 2012/0056989 A1 | 3/2012 | Izumi | |
| 2013/0257692 A1* | 10/2013 | Yang | G06F 3/04815 345/8 |
| 2013/0278504 A1 | 10/2013 | Tong et al. | |

(Continued)

FOREIGN PATENT DOCUMENTS

WO    2014147686 A1    9/2014

*Primary Examiner* — Sepehr Azari
(74) *Attorney, Agent, or Firm* — Miller IP Law, LLC

(57) ABSTRACT

A free space input standard is instantiated on a processor. Free space input is sensed and communicated to the processor. If the free space input satisfies the free space input standard, a touch screen input response is invoked in an operating system. The free space input may be sensed using continuous implicit, discrete implicit, active explicit, or passive explicit approaches. The touch screen input response may be invoked through communicating virtual touch screen input, a virtual input event, or a virtual command to or within the operating system. In this manner free space gestures may control existing touch screen interfaces and devices, without modifying those interfaces and devices directly to accept free space gestures.

20 Claims, 28 Drawing Sheets

(56) References Cited

U.S. PATENT DOCUMENTS

| | | |
|---|---|---|
| 2013/0342571 A1 | 12/2013 | Kinnebrew et al. |
| 2014/0055353 A1* | 2/2014 | Takahama ............... G06F 3/011 |
| | | 345/156 |
| 2014/0125590 A1 | 5/2014 | Flagg et al. |
| 2014/0201689 A1 | 7/2014 | Bedikian et al. |
| 2015/0169070 A1* | 6/2015 | Harp .................... G02B 27/017 |
| | | 345/419 |
| 2015/0205358 A1 | 7/2015 | Lyren |
| 2015/0269783 A1 | 9/2015 | Yun |
| 2016/0034039 A1 | 2/2016 | Maeda et al. |
| 2016/0098094 A1* | 4/2016 | Minkkinen ......... G06F 3/04883 |
| | | 345/156 |
| 2016/0124514 A1* | 5/2016 | Cha ...................... G06F 3/0482 |
| | | 715/767 |
| 2016/0334875 A1 | 11/2016 | Kandadai et al. |
| 2016/0334940 A1 | 11/2016 | Kandadai et al. |

* cited by examiner

METHOD AND APPARATUS FOR APPLYING FREE SPACE INPUT FOR SURFACE CONSTRAINED CONTROL

CROSS-REFERENCE TO RELATED APPLICATION

This application is a continuation of U.S. patent application Ser. No. 16/458,470, filed Jul. 1, 2019, which is a continuation of U.S. Pat. No. 10,401,966, which patent was issued from U.S. patent application Ser. No. 14/713,954, filed May 15, 2015. The entirety of the aforementioned references is hereby incorporated by reference for all purposes.

FIELD OF THE INVENTION

The disclosure relates to controlling electronic devices with postures and/or gestures. The disclosure relates more particularly using free space (e.g. substantially unbounded and/or three dimensional) postures, gestures, and/or other input to invoke surface constrained input functions, and to control devices adapted to respond thereto.

DESCRIPTION OF RELATED ART

Input may be delivered through manipulations constrained to a surface, such as through the use of a so-called "touch screen" interface. Touch screens incorporate a contact sensing surface that overlays a visual display. Such an arrangement enables user to deliver input by physical contact, e.g. by touching a fingertip to the touch screen, moving that fingertip from place to place while in contact with the touch screen, etc.

Various specific contacts or sets of contacts with a touch screen may be assigned to correspond with specific functions for a device or system in communication with the touch screen. For example, touching the screen with a fingertip, sliding the fingertip to the right while remaining in contact with the touch screen, and lifting the fingertip away from the surface of the touch screen may collectively be referred to as a "right swipe", with a function such as "move screen contents to the right" being associated therewith.

However, physical contact input and/or surface constrained input may not be desirable in all circumstances. For example, in at least certain instances there may exist concerns regarding contamination, potential damage to the touch screen, difficulties in holding a physical screen while delivering inputs, etc. In addition, touch screens typically are limited to receiving only input that may be delivered on a finite, two dimensional surface.

BRIEF SUMMARY OF THE INVENTION

The embodiments are directed to a variety of systems, apparatus, methods, and paradigms for applying free space input for surface constrained control.

In one embodiment, a method is provided that includes establishing a free space input standard in a processor, sensing with a sensor a free space input, and communicating the free space input to the processor. If the free space input satisfies the free space input standard, a surface constrained input response for a surface constrained input is invoked in the processor.

The free space input standard may be a three dimensional input standard. The free space input standard may be a gesture standard and/or a posture standard. The free space input standard may include a standard for motion of an end effector in free space.

The surface constrained input may include a touch screen input, a touchdown, and/or a touchdown and swipe.

Sensing the free space input may include imaging, stereo imaging, video imaging, and depth imaging said free space input, may include evaluation over time, and may include evaluation of multiple images at intervals over time.

An apparatus may be controlled with the surface constrained input response.

The free space input standard may include multiple end effector standards for at least one end effector, considered collectively for the end effector with regard to the free space input. The free space input standard may include various standards, e.g., for speed, velocity, position, orientation, direction, acceleration, joint angle, separation, extension, and/or selection of the end effector.

The free space input standard may include a profile of a finger-extended side to side swipe considering path shape, velocity, acceleration, and joint position over time. The free space input standard may include various standards, e.g., standards for speed, velocity, position, orientation, direction, acceleration, joint angle, separation, extension, and selection of the end effector.

The free space input standard may include multiple end effector motion standards for an end effector considered sequentially with regard to at least first and second sub-standards, the first sub-standard corresponding to the first portion of a surface constrained input and the second sub-standard corresponding to the second portion of the surface constrained input, with the first and second portions being considered sequentially with regard to the free space input.

The free space input standard may include a standard for an effector contacting a bounding region, such that the end effector contacting the bounding region corresponds to a contact with a constraining surface of a surface constrained input.

The bounding region may include a spherical shell, a flat plane, and/or a rectilinear volume. The bounding region may at least substantially align with the surface of a physical object. The free space input standard may include standards for speed, velocity, position, orientation, direction, acceleration, joint angle, separation, extension, and/or selection of the end effector.

The free space input standard may include multiple end effector motion standards for an end effector and an indication at least substantially contemporary with motion of the end effector. The indication may include a hand posture, a hand gesture, an eye posture, an eye gesture, and/or a voice command. The free space input standard may include standards for speed, velocity, position, orientation, direction, acceleration, joint angle, separation, extension, and/or selection of the end effector.

The free space input standard may include multiple state standards. The state standards may be adapted to be combined to form multiple free space input standards, with each free space input standard corresponding with a free space input. Each state standard may include a standard for a motion of an end effector.

In another embodiment, an apparatus is provided that includes means for establishing a free space input standard in a processor, means for sensing with a sensor a free space input, and means for communicating the free space input to the processor. The apparatus also includes means for invoking in the processor a surface constrained input response for a surface constrained input, if the free space input satisfies the free space input standard.

In another embodiment, an apparatus is provided that includes a processor adapted to execute executable instructions, and a sensor in communication with the processor. The apparatus includes a free space input standard instantiated on the processor, and a free space input comparer instantiated on the processor and adapted to compare a free space input against the free space input standard. The apparatus also includes a surface constrained input response invoker instantiated on the processor and adapted to invoke in the processor a surface constrained input response for a surface constrained input.

The processor and sensor may be disposed on a head mounted display.

In another embodiment, a method is provided that includes establishing a free space input standard in a processor, sensing a free space input with a sensor, and communicating the free space input to the processor. The method includes generating in the processor a surface constrained communication, and communicating the surface constrained communication to a data entity, wherein the data entity executes a response corresponding with a surface constrained input, if the free space input satisfies the free space input standard.

The data entity may include an operating system, and/or may be instantiated on the processor.

The free space input may include three dimensional input, and/or may include a hand posture and/or a hand gesture.

The method may include generating in the processor a virtual surface constrained input, and communicating the virtual surface constrained input to the data entity, wherein the data entity accepts the virtual surface constrained input as surface constrained input and executes a response corresponding with the surface constrained input, if the free space input satisfies the free space input standard. Communicating the virtual surface constrained input to the data entity may include establishing a virtual surface constrained input link and identifying the virtual surface constrained input link to the data entity as a practical surface constrained input source.

The virtual surface constrained input may include a virtual touch screen input. The virtual surface constrained input may include a virtual touchdown input. The virtual surface constrained input may include a virtual touchdown and swipe input. The virtual surface constrained input may include at least x and y coordinates and pressure over time at least substantially corresponding with a touchdown and swipe on a touch screen.

The method may include generating the virtual surface constrained input considering said free space input. The virtual surface constrained input may include a translation of the free space input into a corresponding surface constrained form. The method may include generating the virtual surface constrained input exclusive of the free space input.

The method may include generating in the processor a virtual surface constrained input event for the data entity, and communicating the virtual surface constrained input event to the data entity, wherein the data entity accepts the virtual surface constrained input event as a surface constrained input event and executes a response corresponding with the surface constrained input event, if the free space input satisfies the free space input standard. Communicating the virtual surface constrained input event to the data entity may include establishing a virtual event link and identifying the virtual event link to the data entity as a practical event source.

The virtual surface constrained input event may include a virtual touch screen input event, a virtual touchdown input event, and/or a virtual touchdown and swipe input event.

The method may include generating in the processor a virtual command for a data entity, and communicating the virtual command to the data entity, wherein the data entity accepts the virtual command as a command and executes a response corresponding with the command, if the free space input satisfies the free space input standard. Communicating the virtual command to said data entity may include establishing a virtual command link and identifying the virtual command link to the data entity as a practical command source.

The virtual command may include a virtual touch screen command, a virtual touchdown command, and/or a virtual touchdown-and-swipe command.

The method may include controlling an apparatus with the response.

In another embodiment, a method is provided that includes establishing in a processor of a head mounted display a free space input standard including a standard for speed, velocity, direction, acceleration, joint angle, digit separation, digit extension, and/or digit selection of a hand gesture in free space. The method includes sensing with a depth imager of the head mounted display multiple depth images of the free space input of the hand gesture over time, and communicating the free space input to the processor. If the free space input satisfies said free space input standard, a virtual touch screen touchdown and swipe input is generated in the processor, and the virtual touch screen touchdown and swipe input is communicated to an operating system such that the operating system executes a response thereto, and controlling the head mounted display with the response.

In another embodiment, an apparatus is provided that includes means for establishing a free space input standard in a processor, means for sensing a free space input, and means for communicating the free space input to the processor. The apparatus also includes means for generating in the processor a virtual surface constrained communication and communicating the surface constrained communication to the data entity, such that the data entity executes a response corresponding with the communication, if the free space input satisfies the free space input standard.

In another embodiment, an apparatus is provided that includes a processor and a sensor in communication with the processor. The apparatus includes a free space input standard instantiated on the processor, and a free space input comparer instantiated on the processor and adapted to compare a free space input against the free space input standard. The apparatus further includes a virtual surface constrained communication generator instantiated on the processor and adapted to generate a surface constrained communication, and a communicator instantiated on the processor and adapted to communicate the surface constrained communication to a data entity, such that the data entity executes a response corresponding with a surface constrained input.

The processor and sensor may be disposed on a head mounted display. The sensor may include a depth imager.

BRIEF DESCRIPTION OF THE SEVERAL VIEWS OF THE DRAWINGS

Like reference numbers generally indicate corresponding elements in the figures.

FIG. 28 shows a block diagram of a processing system that may implement operations of.

DETAILED DESCRIPTION OF THE INVENTION

Various embodiments of the disclosure address the use of free space inputs to invoke surface constrained inputs, for example the use of three dimensional gestures in space to in some fashion cause the execution of a command otherwise associated with a touch screen input. It may therefore be illuminating to consider certain properties of surface constrained inputs, using as an example a "right swipe" input for a touch screen. A right swipe applied as input to certain touch screens and/or devices controlled by touch screens (such as smart phones, tablet computers, etc.) may, for example, move displayed content to the right, "flip the page" on an e-book, or perform other functions.

Figure 1A:
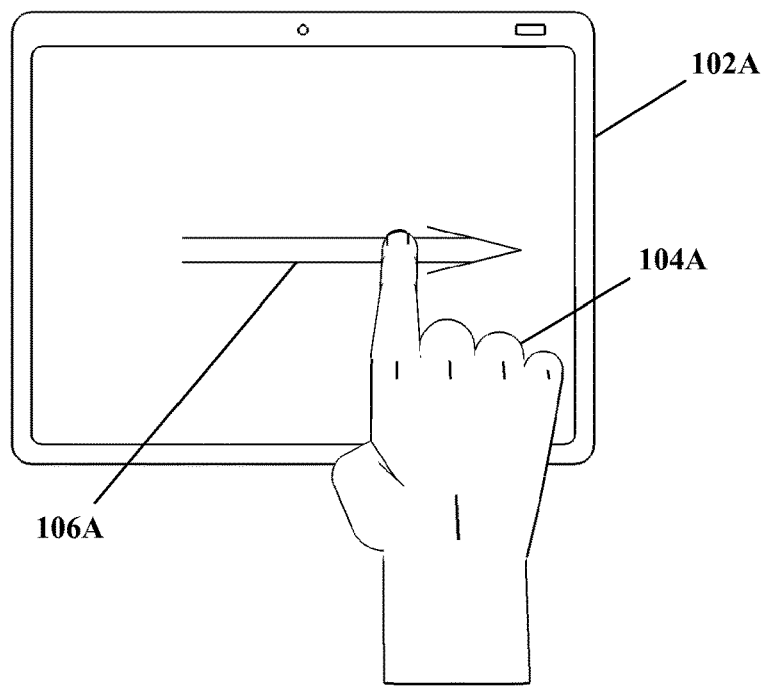
FIG. 1A and FIG. 1B show examples of touch screen input in the form of a right swipe, in top and perspective views respectively.

With reference to FIG. 1A, therein is shown a top down view of input being delivered through a touch screen, in the form of a right swipe. As may be seen, for a right swipe, the hand 104A is moved from left to right as shown by motion arrow 106A (shown here for clarity, not necessarily visible in practice) while the hand 104A is in contact with the touch screen 102A. As illustrated in the arrangement of FIG. 1A the touch screen 102A is part of a tablet computer, but this is an example only.

Figure 1B:
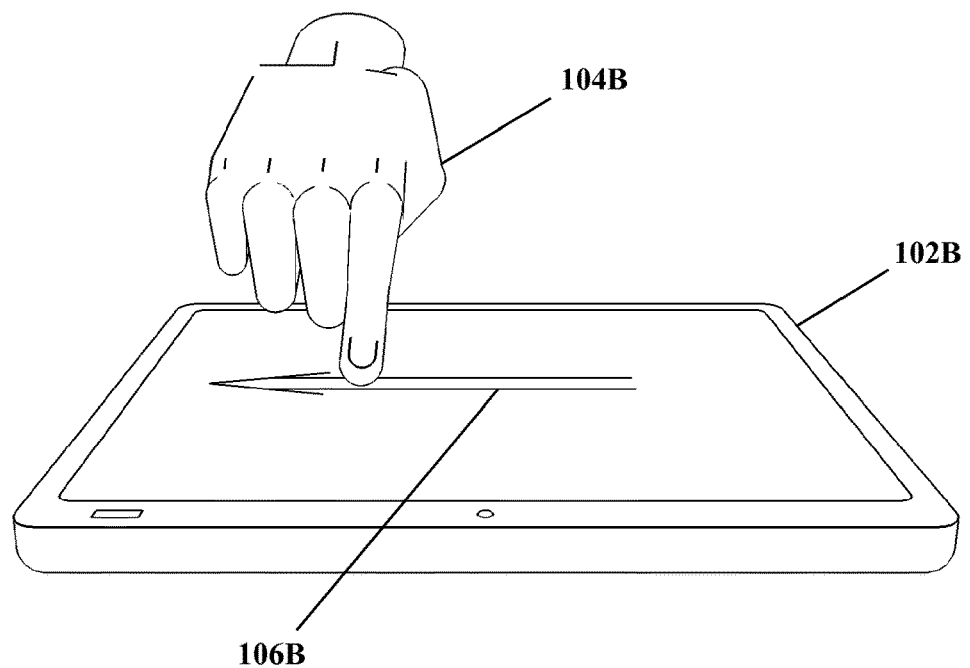

Now with reference to FIG. 1B, another view of a similar right swipe is again shown, in this illustration a perspective view from slightly above and in front of the touch screen 102B. Again, as may be seen the hand 104B is in contact with the touch screen 102B (more specifically, the extended index fingertip thereof is in contact with the touch screen 102B), and moves from left to right (as seen by a viewer; right to left from the perspective shown) as indicated by motion arrow 106B.

Considered purely as a motion, a right swipe may appear to be simple in nature: motion from left to right. However, in practice an input as delivered via a touch screen interface is not necessarily merely motion. Operating systems and other programs or executable instructions supporting touch screens typically address touch screen input as several distinct events. FIG. 2A through FIG. 2D present an example breakdown of certain events that may be present in a right swipe. However, it should be understood that the events shown in FIG. 2A through FIG. 2D may not necessarily be exhaustive, and additional and/or different events may be considered for certain touch screen interfaces. Furthermore, a right swipe is only one of many potential inputs, and other inputs also may consider other events.

Figure 2A:
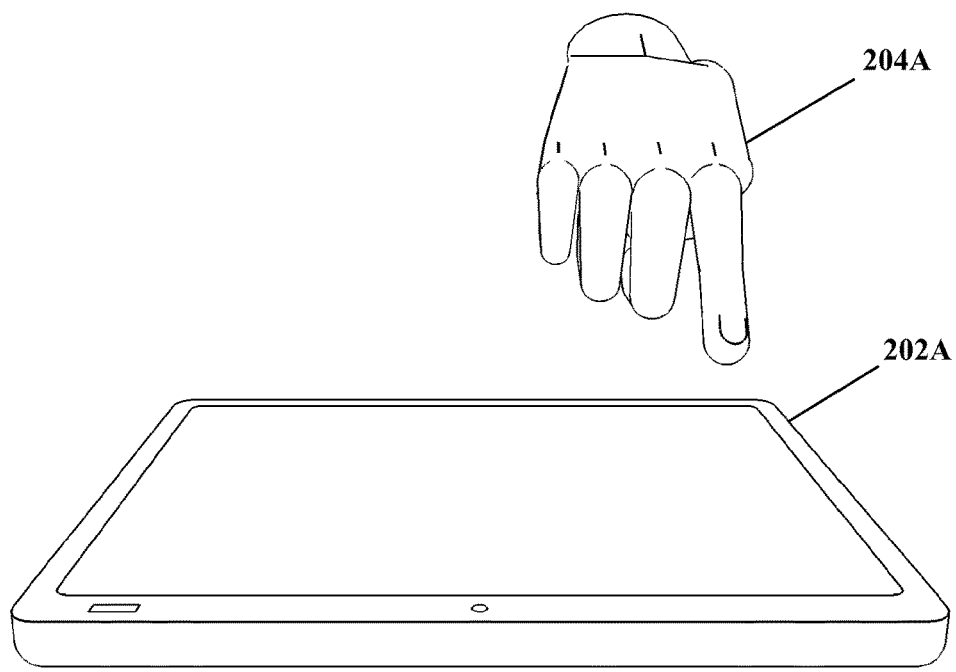
FIG. 2A through FIG. 2D show individual events in touch screen input, in perspective view.

Now with reference to FIG. 2A, therein is shown another perspective view of a touch screen 202A. The arrangement of FIG. 2A represents an initial condition before the right swipe is input into the touch screen. A hand 204A is poised above the touch screen 202A; at the time shown, no contact has been made between hand 204A and touch screen 202A.

Figure 2B:
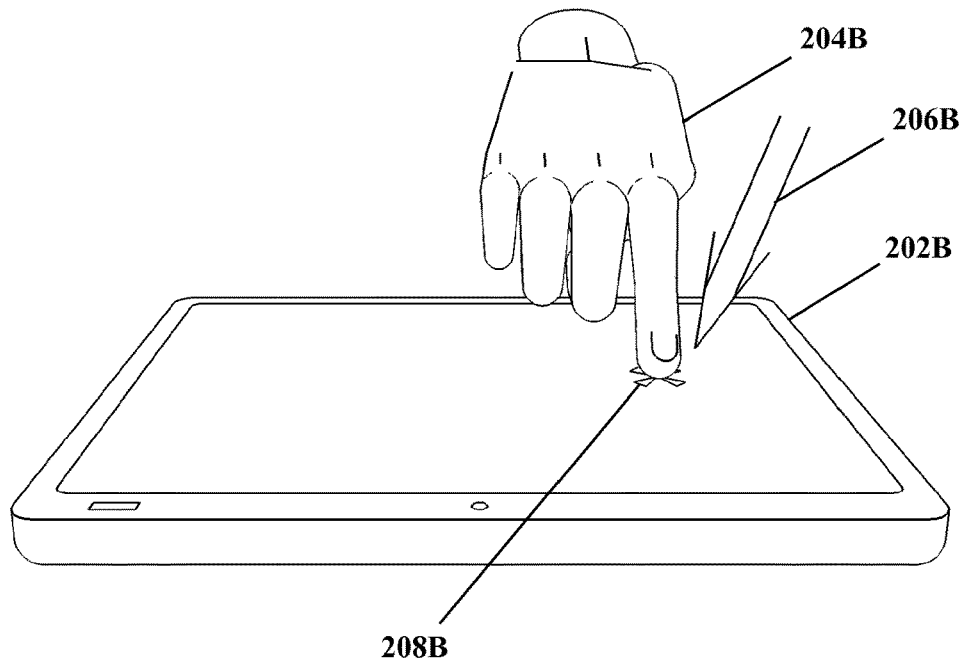

Continuing in FIG. 2B, as may be seen from a comparison with FIG. 2A the hand 204B has descended toward the touch screen 202B, such that the hand 204B is in contact with the touch screen 202B. The downward motion also may be understood from the motion arrow 206B. Also shown in FIG. 2B is a contact marker 208B indicating a point of contact between the hand 204B and the touch screen 202B. As of yet, no left to right motion has occurred by the hand 204B across the surface of the touch screen 202B.

The contact marker 208B is shown to emphasize that contact is indeed present between hand 204B and touch screen 202B. (The contact marker 208B is illustrative, and may not be visible in practice.) Contact typically may be of considerable significance in touch screen input, not merely as a way to track motion across the surface of a touch screen 202B but as an input event in itself. This significance is addressed in more detail with regard to the remainder of FIG. 2.

Figure 2C:
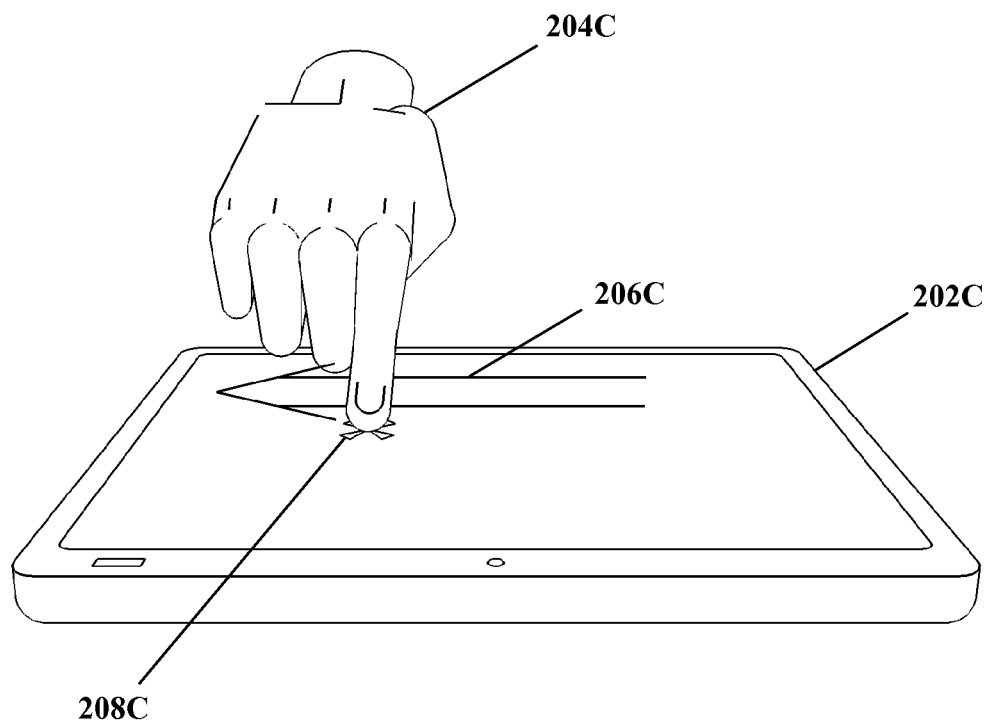

Now with reference to FIG. 2C, as may be seen from a comparison with FIG. 2B the hand 204C has moved from left to right (as seen by a viewer) across the surface of the touch screen 202C, while in contact therewith. The left to right motion also may be understood from the motion arrow 206C. As may be seen and as emphasized with contact marker 208C, the hand 204C remains in contact with the touch screen 202C, and remained in contact with the touch screen 202C throughout the motion shown by motion arrow 206C.

Figure 2D:
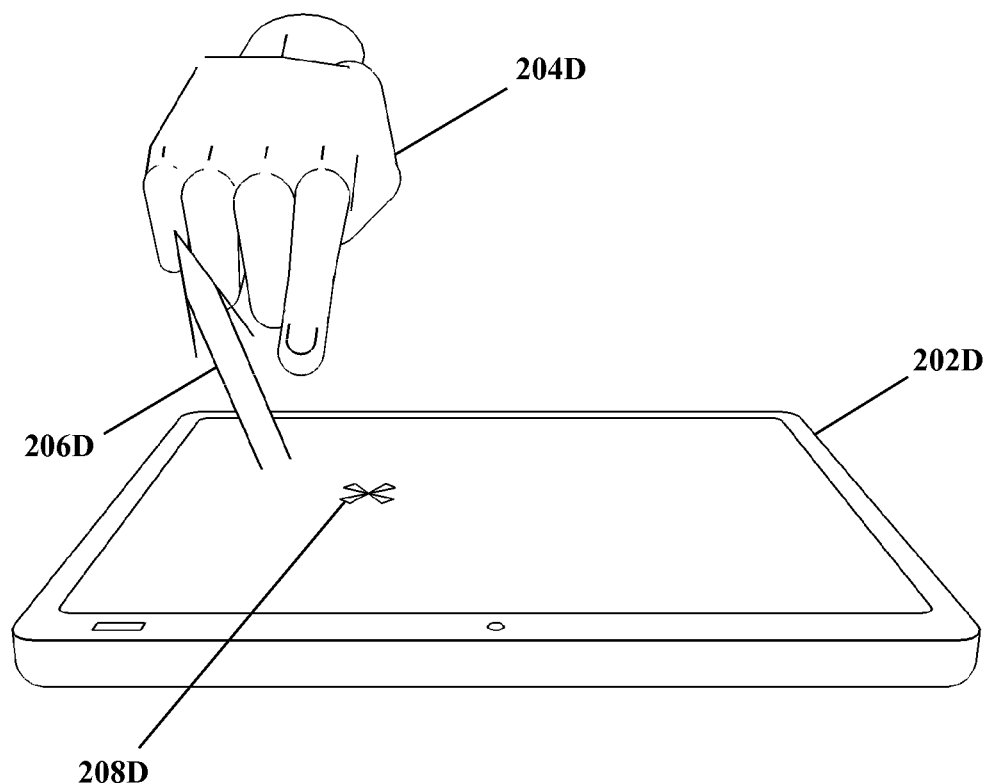

Continuing in FIG. 2D, as may be seen from a comparison with FIG. 2C the hand 204D has moved upward from the surface of the touch screen 202D, so that the hand 204D is no longer in contact with the touch screen 202D. The upward motion also may be understood from the motion arrow 206D. A contact marker 208D showing the last point of contact between hand 204D and touch screen 202D is also shown for illustrative purposes, although such contact is no longer ongoing.

Although the term "right swipe" explicitly refers only to a rightward motion, in practice a right swipe may in fact constitute multiple events. For example, as shown collectively in FIG. 2A through FIG. 2D, a right swipe may be conceptualized as incorporating e.g.: a touchdown event representing the hand 204B making contact with the touch screen 202B at a contact point 208B as shown in FIG. 2B; a swipe event representing the swipe motion proper wherein the hand 204C moves across the touch screen 202C while remaining in contact with the touch screen 202C at contact marker 208C as shown in FIG. 2C; and a liftoff event representing the hand 204D leaving contact with the touch screen 202D from a former contact point 208D.

Although the arrangements in FIG. 2A through FIG. 2D are an example only, typically touch screens may in fact utilize similar multiple-event arrangements in receiving input. That is, a touch screen may require both a touchdown event and a swipe event (and/or a liftoff event, etc.). Such events may be sensed independently, and processed distinctly by a processor (and/or an operating system or other program instantiated thereon), such that the swipe event alone may not be accepted as a swipe input if the touchdown event, the liftoff event, or both are absent (or not properly associated with the swipe in some manner).

Thus even though the swipe motion itself might be considered to "define" a swipe in conversational terms, in terms of implementation delivering a swipe input may require one or more additional events such as touchdown and/or liftoff events. Typically this may be a practical consideration; in order to reliably discern a swipe from other inputs, noise, etc., it may be useful to require a well-defined beginning (touchdown) and/or a well-defined end (liftoff) for the swipe.

As noted, various embodiments address the use of free space inputs to invoke surface constrained inputs; to continue the example of FIG. 2A through FIG. 2D, this may include using a three dimensional hand swiping gesture to cause a processor, processor controlled device, system, etc., to execute a function associated by that processor with a swipe input to a touch screen.

At least certain advantages of such an arrangement may be to relate to enabling the application of already-existing hardware, software, expertise, etc. for touch screens and other surface constrained input interfaces to new devices, interfaces, methods of input and control, etc.

Consider for example an electronic device already adapted to accept input from a touch screen, such as a smart phone. Such a device may operate at least in part through the use of an operating system instantiated onto a processor thereof, such as the Android OS. In the case of Android as a concrete example, support already exists therein for recognizing touch screen inputs such as swipes, for sensing the events that make up gestures (e.g. touchdown, swipe, etc. for a right swipe as described above), and for invoking various commands and/or other functions within a device running Android in response to such touch screen inputs.

Similarly, given the existence of an electronic device adapted to accept input from a touch screen, a substantial body of additional programs, plug-ins, data files, etc. other than an operating system also may be available for use with such a device. Again to consider Android as a concrete example, this may include media players, games, messaging applications, video conferencing programs, etc.

Typically, operating systems and/or other programs adapted for use with a device or system accepting touch screen input may include therein capabilities to recognize, receive, respond to, etc., such touch screen input. However, such operating systems and/or other programs typically may not be adapted to accept input using new approaches, such as gestures in free space.

In colloquial terms, an existing smart phone may not respond to hand gestures. This may be true even if the smart phone in principle has suitable sensors, such as a camera, for sensing hand gesture input. Even with such sensors, the smart phone (or other device or system) may for example lack an ability to discern such gestures as well-defined input, and/or suitable instructions for responding to such gestures even if recognized.

Various embodiments support enabling at least the ability to address the two aforementioned issues: discerning free space gestures, and communicating such gestures so as to be usable as input. Although these do not necessarily represent the only functions or advantages, both are addressed as examples in greater detail subsequently herein.

In addressing such matters to enable touch screen input devices and systems to accept free space gestures, various advantages follow. For example, writing a new operating system for electronic devices that accepts free space gesture input, and/or modifying an operating system sufficiently as to enable free space gesture input, may represent a non-trivial problem. Creating and/or making major changes to operating systems typically is notorious for being expensive, time consuming, and fraught with potential bugs. Similarly, writing or adapting individual programs to accept free space input also may be problematic. Various embodiments enable the use of existing code, operating systems, programs, libraries, plug-ins, etc., as well as existing hardware, with free space input. This may represent a potential savings in time, effort, money, etc., and also facilitates ongoing use of a large body of existing software (i.e. "backward compatibility").

Furthermore, if free space gestures are used that in some fashion resemble or otherwise correspond with familiar touch screen inputs, users may more readily adapt to using free space gestures. As a more concrete example, if a left to right swipe gesture in free space is made to represent a left to right swipe on a touch screen, with similar or equivalent physical motions and/or similar or equivalent system responses thereto, then users may more readily adapt to the use of free space gestures as inputs. From the point of view of a user, he or she may be "doing the same thing" (at least as far as that user is concerned) to control a device or system with free space gestures as to control a device or system with touch screen inputs. Although in fact the methods for handling input may be very different for free space gestures than for touch screen inputs, if there is apparent similarity as far as the user is considered then user barriers to adopting free space gesture input may be reduced.

As noted, various embodiments provide functions including but not necessarily limited to enabling free space gestures to be discerned, and existing functions to be invoked in response thereto. The former function now will be addressed; the latter will be addressed in more detail subsequently herein.

As described previously with regard to FIG. 2A through FIG. 2D, surface constrained input approaches such as touch screens may, and typically do, rely on sensing events that correspond with actual contact between a finger and a physical touch pad surface. Recognizing a right swipe thus may include registering a touchdown event and a motion in contact with a surface (and may include other events such as registering a liftoff, etc.). For free space inputs such as hand postures and gestures, such physical surface typically is absent. Thus, recognizing a free space right swipe gesture as an input corresponding with a touch screen right swipe gesture may be problematic, since certain events—notably those involving physical contact—do not and typically cannot occur in a free space gesture.

More colloquially, this issue may be considered as a question: how does one replace a touch screen swipe with an apparently similar free space swipe when there is no touch screen to touch?

Several examples of approaches are now illustrated and described herein for discerning free space gesture inputs as may serve as analogs to touch screen inputs. It is emphasized that these are examples only. Although the right swipe input used as an example thus far is likewise presented as an example here, inputs are not limited only to a right swipe, a swipe, or any other particular gesture or input. In addition, approaches other than those illustrated and described herein may be equally suitable. Furthermore, although it may be advantageous in at least some instances to utilize free space gestures that bear visual similarity to surface constrained inputs (e.g. a free space swipe gesture to a touch screen swipe), this is not required; free space gestures need not be identical to, or necessarily even similar to, any surface constrained input.

Figure 3:
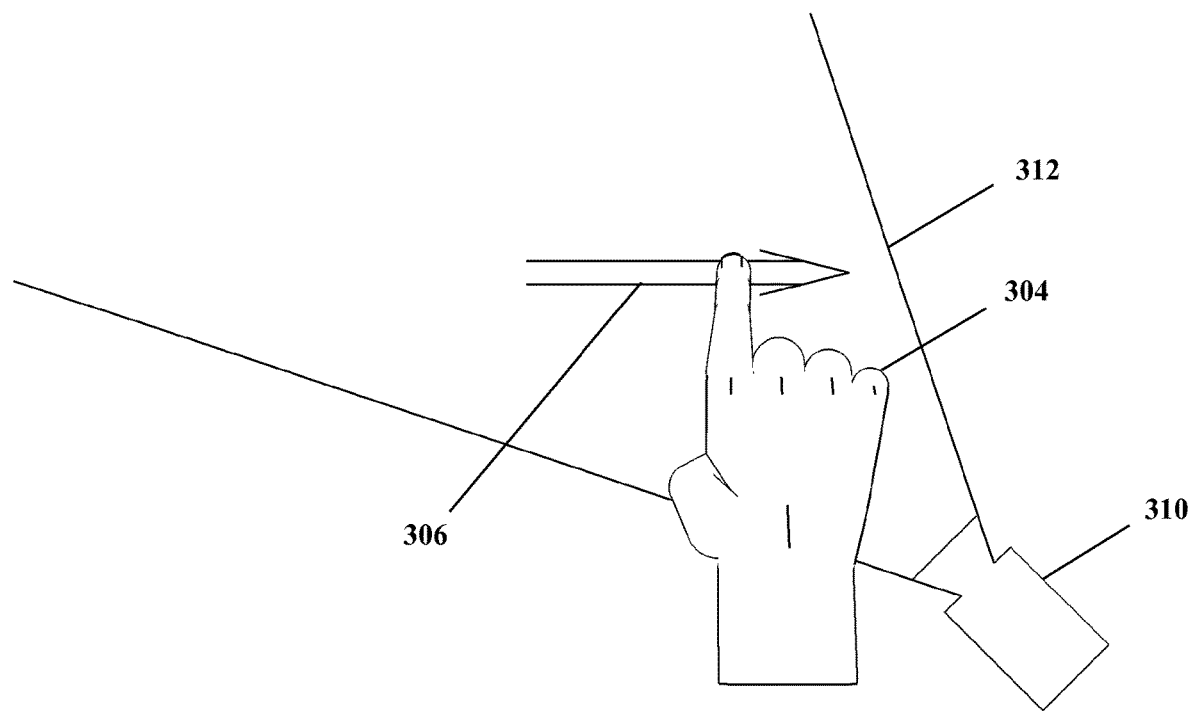
FIG. 3A shows an example arrangement for free space input, in top view.

Now with reference to FIG. 3, while touch screen and other surface constrained inputs may rely on rigidly-defined geometry to support inputs, for free space gestures there may not necessarily be any such geometry present. For example, in the arrangement of FIG. 3 a hand 304 is present, having carried out a left to right motion as indicated by motion arrow 306. Where a touch screen might sense such motion through physical contact with a surface, FIG. 3 also shows an imager 310 having a field of view 312 that encompasses at least a portion of the hand 304 and the motion thereof 306.

Figure 4A:
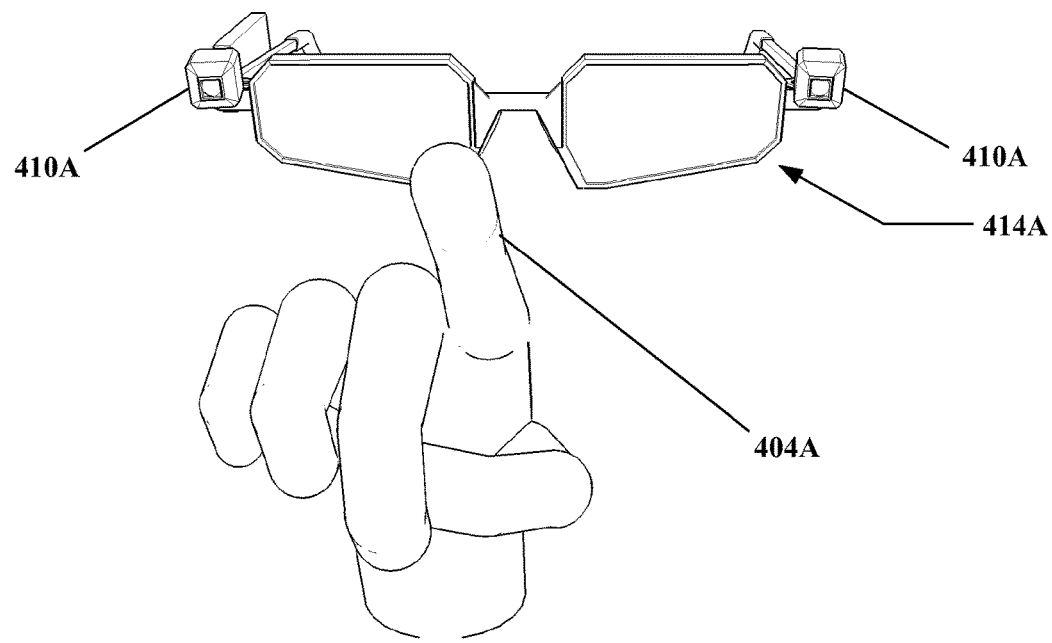
FIG. 4A and FIG. 4B show another example arrangement for free space input according to, in front and back perspective views respectively.

Turning to FIG. 4A, where FIG. 3 may be considered somewhat abstract (e.g. in showing a simple, disconnected camera outline), FIG. 4A shows a perspective view of an arrangement of an apparatus 414A in the form of a head mounted display, as resembling a pair of glasses. As may be seen, the apparatus 414A includes thereon two imagers 410A, such as to sense a hand 404A and motions thereof. (Although typically while in use the head mounted display 414A may be worn by a person, the head, face, etc. thereof may not necessarily participate directly in gesture input, sensing of same, processing and execution of commands, etc., and so is omitted for simplicity. It is emphasized that even though a hand 404A is shown in FIG. 404A, and hands also are shown and referred to elsewhere herein for purposes of clarity, neither hands nor users as a whole are necessarily to be considered part of embodiments in themselves.)

Figure 4B:
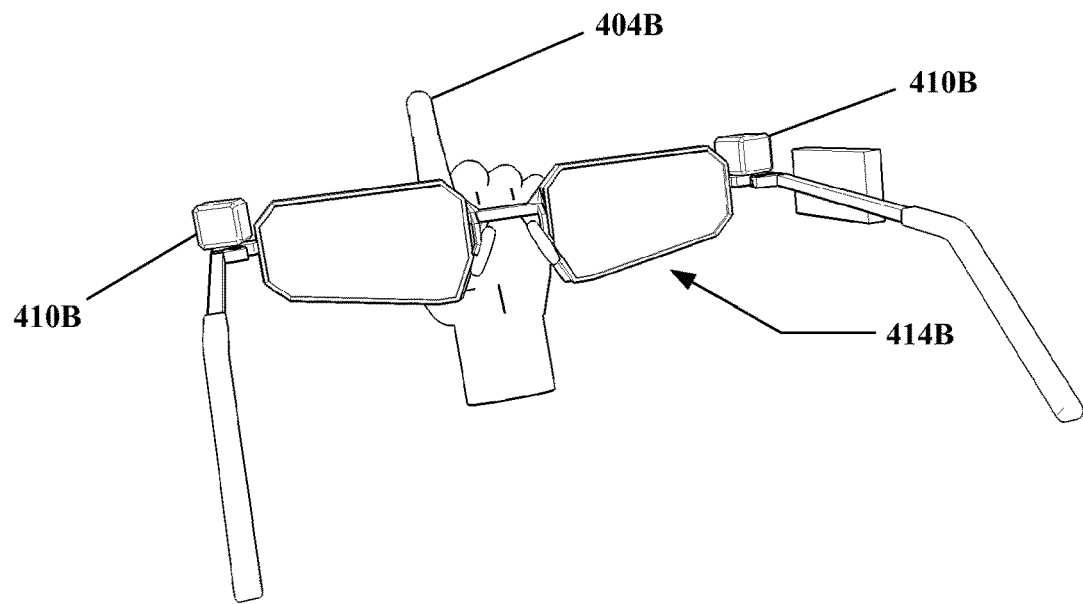

FIG. 4B shows a similar arrangement to FIG. 4A, illustrated from a different viewing perspective such as might more closely resemble that of a viewer, i.e. the apparatus 414B is shown from behind with imagers 410B disposed thereon, and positioned such that the imagers 410B may sense a hand 404B and/or motions thereof.

Figure 5:
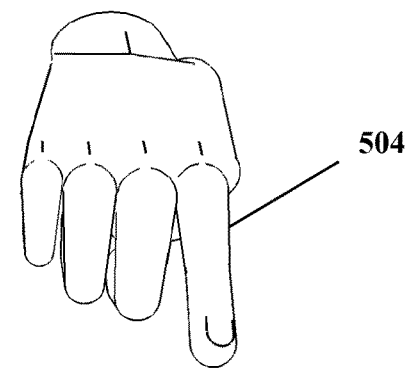
FIG. 5 shows an example initial hand position for free space input, in perspective view.

With reference now to FIG. 5, therein is shown a hand 504 in free space. The arrangement of FIG. 5 may be considered to represent a starting position for certain free space gesture inputs shown and described hereafter. In addition, the arrangement shown in FIG. 5 may be considered as being illustrative of an issue already described: namely, for free space gestures utilizing physical contact with a touch screen or similar to recognize events and/or inputs may be problematic when no such surface may be present.

Considering FIG. 6 through FIG. 10D collectively, therein are shown several arrangements for in free space gestures inputs comparable with surface constrained inputs. Unless otherwise specified, gestures shown in FIG. 6 through FIG. 10D may be considered to show configurations after or during gestures, gestures therein having initiated with a configuration similar to that shown in FIG. 5.

Figure 6:
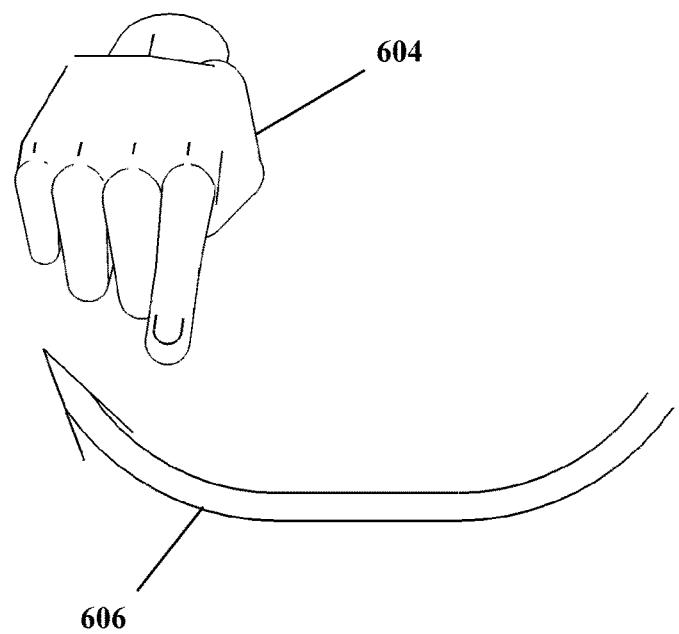
FIG. 6 shows an example arrangement for free space input for invoking surface constrained input, with continuous implicit form.
Figure 7:
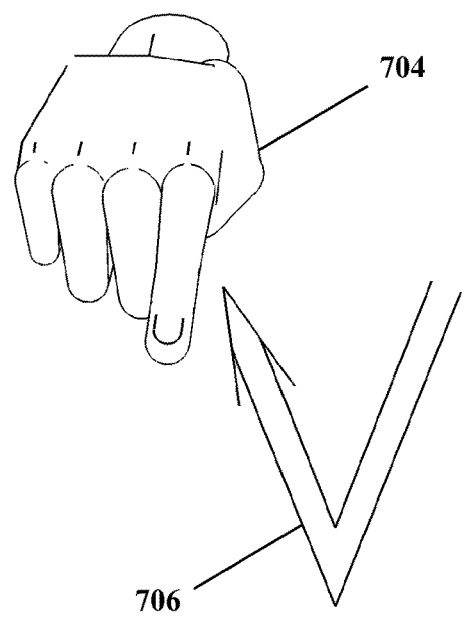
FIG. 7 shows an example arrangement for free space input, illustrating an example of an excluded phenomenon as may be considered in a standard.

Turning to FIG. 6, a hand 604 is shown therein having executed a gesture as shown by motion marker 606. As may be seen from motion marker 606, the motion of the hand 604 (from an initial configuration similar to that in FIG. 5) was initially downward and left to right (as seen by the person making the motion), then left to right while level, then upward while continuing left to right. FIG. 6 represents the motion of the hand 604 as substantially a single continuum, as may be understood from the single continuous motion marker 606.

It may be noted that the arrangement shown in FIG. 6 reflects one of the issues that various embodiments address: namely, a lack of well-defined "landmarks" in a free space gesture, as compared with more concrete physical contact events (e.g. touchdown) available for surface constrained inputs. Various embodiments may address this lack, while still enabling input through the use of free space gestures at least somewhat comparable to touch screen inputs, in a number of ways.

A number of variations on characterizing, interpreting, distinguishing, etc. various free space inputs are described herein. For purposes of identification, the arrangement shown in FIG. 6 may be considered to represent a "continuous implicit" approach. That is, the features by which a free space gesture (or other input) are discerned, and by which that free space gesture is distinguished from other input gestures, are addressed considering the motion as a continuous entity. (As opposed to be considered in parts, as described subsequently herein.) With regard to "implicit", for an arrangement wherein a free space gesture is made to be analogous to a surface constrained input, the presence of certain events associated with that surface constrained input—such as touchdown on a surface, swipe along the surface, and liftoff from the surface for a touch screen—are in some sense implicit. That is, those events may not exist in concrete form (for example because there is no surface to touch), and may have no explicit substitutes. For the arrangement shown in FIG. 6, for example, motion may be understood as a swipe due to the parameters of the motion itself, and/or similar factors, even without there necessarily being an analog either executed or sensed to specifically represent for a touchdown, etc. The motions themselves define the swipe, thus in some sense events such as touchdown may be considered to be implied. However, this is a descriptive and explanatory example only, and the term "continuous implicit" should not be taken as limiting.

For the arrangement of FIG. 6, wherein a free space gesture is presented as a single substantially continuous motion, a standard for determining whether that motion is to be considered as an input analogous to a touch screen swipe may be defined by properties of the motion itself. For example, a free space motion may be considered to represent a swipe gesture only if the left to right motion is substantially continuous, e.g. without pause, motion from right to left, etc. There may be requirement for an initial downward motion, a requirement for a terminal upward motion, and/or a requirement for substantially no vertical motion for some intermediate portion of the motion. A range of accelerations may be specified. Any or all such defining requirements might be part of a standard for which the arrangement of FIG. 6 may be considered an example.

The embodiments are not particularly limited with regard to what features of free space manipulation may be required, excluded, and or otherwise considered in discerning gestures, postures, and/or other input. Although relatively simple characteristics (speed, direction, acceleration, etc.) have been noted thus far, other and/or more complex factors may be considered.

For example, human motion typically is preferentially within, and in some instances may be physically limited to, certain arcs and other paths. This may result from a number of factors, such as joint anatomy. As a simple example, and still considering a left to right swipe, a gesture carried out by moving the hand at the wrist may differ in path, speed, range of motion, etc. from a gesture carried out by moving the arm at the elbow. Such differences may be relied upon to distinguish one gesture from another, to determine whether a gesture is being intentionally delivered as opposed to being incidental motion, and so forth. Free space input standards may consider such factors (though this is an example only, and is not required.)

In addition, standards may include negative as well as positive factors, that is, prohibitions as well as requirements. For example, factors that exclude certain motions from being interpreted as certain free space gesture inputs also may be part of standards therefor. As a more concrete example, consider two gestures: a swipe and a tap.

FIG. 6 as already noted illustrates an example of a free space swipe gesture. Now with reference to FIG. 7, therein is shown an example of a free space tap gesture. In certain cases a tap may be considered to be a substantially vertical motion, e.g. a downward motion, with a sudden stop and/or a sudden reverse motion. However, in the tap shown in FIG. 7 the hand 704 may be seen to have moved additionally from left to right (as seen by the viewer) according to the motion arrow 706.

It is noted that, in practice, free space gestures may tend to "drift" in their motions. That is, persons executing gestures in free space may not exercise the same degree of precision, control, repeatability, etc. as in inputs delivered on a touch screen. It may be speculated that such drift may be due at least in part to the absence of a well-defined physical object with which the user interacts. A physical interface device such as a touch screen may provide tactile feedback (e.g. a surface upon which to tap), a visible and specific target with which to interact, etc. A lack of such foci may contribute to what may be considered a certain "sloppiness" in delivering gestural inputs. The arrangement shown in FIG. 7 may be an example of such, wherein a user intends to delivers a tap input but does not restrict the left to right motion of his or her hand 704 while doing so.

Regardless of cause, such drift, sloppiness, etc. may serve to obfuscate gestural inputs. Through a comparison of FIG. 6 and FIG. 7, it may be observed that in both examples the hands 604 and 704 therein execute left to right motions combined with an initial downward motion and a terminal upward motion. A standard for a free space input based on such a sequence of left to right, upward, and downward motions may be unable to distinguish between a swipe as in FIG. 6 and a tap as in FIG. 7.

However, as noted, a standard for a free space input may incorporate exclusions as well as positive requirements. For example, a tap typically may include a "bounce", a rapid stop and/or reversal of downward motion to upward motion. A standard for a swipe may be defined so as to exclude such a bounce, e.g. by excluding sudden stops in vertical motion, rapid reversals in vertical velocity, excessive vertical acceleration (corresponding with such rapid reversals), or by other considerations.

Figure 8:
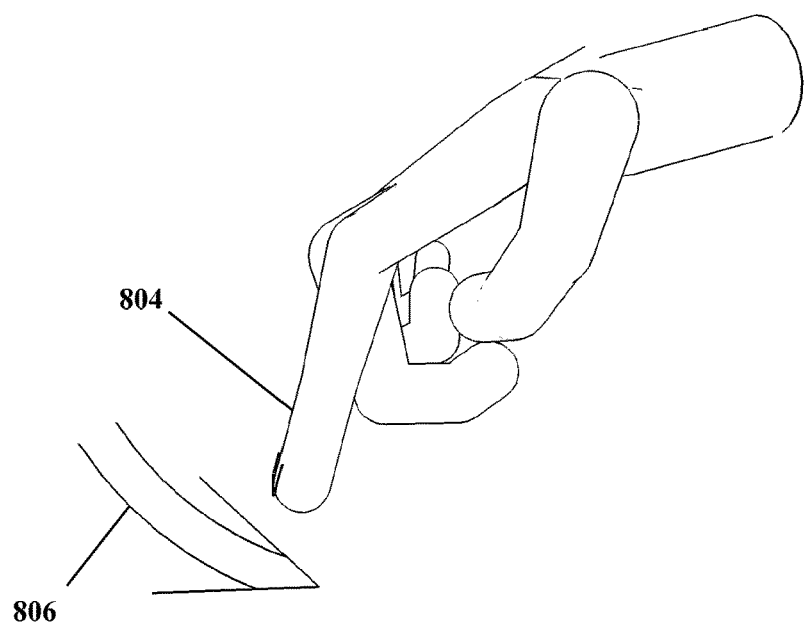
FIG. 8 shows another example arrangement for free space input, illustrating another example of an excluded phenomenon as may be considered in a standard.

Similarly, with regard now to FIG. 8, therein is shown a side view of another potential form of free space tap input. Therein, a hand 804 is shown, with the extended index finger thereof having moved along a downward arc as indicated by motion arrow 806. Such motion as shown in FIG. 8 may be typical of certain taps, but may not typically be associated with swipes. Thus, a standard for a free space swipe input may exclude and/or limit a degree of motion of the first joint of an index finger; thus if such motion is present, as in FIG. 8, the motion may be considered to not be a swipe. (Conversely, such motion may be considered as a necessary or optional feature for a standard defining a free space tap gesture.)

More broadly, absolute motions and/or positions (and/or features thereof such as velocity, acceleration, and so forth), anatomical motions and/or positions (e.g. for various joints), etc. may be considered either as positive factors required to be present by a standard, and/or as negative factors required to be absent by a standard.

Furthermore, considerations such as where, when, and/or how a motion or other factor is exhibited also may be part of standards for free space input. As an example, for ergonomic reasons a swipe gesture typically may be carried out with the fingers of the hand pointing generally away from the user's body, rather than with the fingers pointing inward toward the user's body. A free space swipe standard thus may exclude arrangements with fingers pointing inward may for at least certain embodiments, e.g. considering such motions to be errors or "noise", irrelevant gestures from another person, deliberate interference, etc.

Further with regard to noise, standards also may consider degrees of various factors. For example, even if a free space swipe standard were to exclude vertical motion in a middle portion thereof (such as to avoid misinterpreting a sloppy tap gesture as a swipe), that exclusion may include some degree of permissible vertical motion. That it, it may be anticipated that a certain amount of vertical motion may be present incidentally, due to imperfect motor control of the person making the gesture, imperfect positional sensing of the hand (e.g. errors or variations introduced in a sensor or a processor), and so forth. Thus although vertical motion may be nominally excluded from the free space swipe standard (or along some portion thereof), such exclusion is not necessarily required to be absolute. In colloquial terms, standards may include "wiggle room", with regard to positive and/or negative factors thereof.

Figure 9:
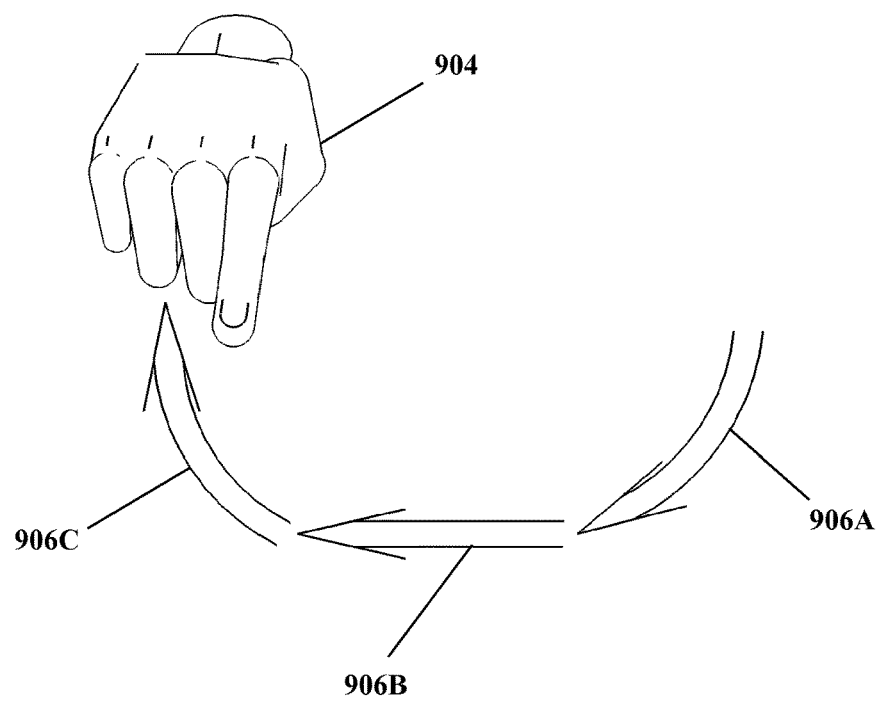
FIG. 9 shows an example arrangement for free space input for invoking surface constrained input, with discrete implicit form.

Turning now to FIG. 9, as noted standards may apply different requirements and/or exclusions to different portions of a given input, for example a swipe gesture may permit vertical motion at the beginning and end thereof but not in the middle. To facilitate such variations of standards over time, distance, and so forth, for at least certain embodiments it may be useful to break up standards, and thus to break up consideration of inputs, into distinct blocks. FIG. 9 shows such an arrangement. In FIG. 9, a hand 904 is shown having carried out a series of motions represented by motion arrows 906A, 906B, and 906C. As may be observed through comparison with FIG. 6, the combination of motions represented by motion arrows 906A, 906B, and 906C in FIG. 9 is at least somewhat similar to the motion represented in FIG. 6 by motion marker 606.

However, in the arrangement of FIG. 9 the overall motion has been subdivided: a motion 906A downward and to the right (as seen by the user), a sequential motion 906B to the right while remaining level, and another sequential motion 906C upward and to the right. In the example of FIG. 9, the motions may be broken down by certain features thereof: vertical downward motion in 906A, lack of vertical motion in 906B, and vertical upward motion in 906C, for example.

Such a breakdown is permitted within the scope of various embodiments. A standard may be broken down into two or more sub-standards, e.g. for the arrangement of FIG. 9 one substandard each for the portions represented by motion arrows 906A, 906B, and 906C. The sub-standards may even be considered as self-contained entities in their own rights. For example, certain embodiments may consider each of the motion arrows 906A, 906B, and 906C to represent a single "state", e.g. a downward motion with certain parameters, a level motion with other parameters, and an upward motion with yet other parameters.

While such a breakdown of free space inputs into states may in some instances be merely a logical or analytical approach, in at least certain embodiments defining free space gestural motions in terms of states may feature in the implementation of the invention itself. For example, a collection of states, rules for arranging states, and so forth may be implemented as a form of programming convention. Thus, a standard for a particular free space gesture might be a series of states, e.g. if states were to be identified by capital letters a gesture then may be signified with ACBA to represent a particular four state sequence made up of A, B, and C states. (Other conventions might be utilized for states to be carried out in parallel, e.g. multi-finger gestures, two handed gestures, etc.)

As a more concrete example, if state A is a downward motion, state B is a rapid reverse, and state C is an upward motion, a tap gesture may be ABC, and a double tap ABCABC. It is emphasized that states are not necessarily unique to one gesture; states A and C from the tap/double tap example (downward and upward motions respectively) may also be used as part of a swipe gesture, e.g. ADC where D is a horizontal motion (left to right, right to left, etc.).

Indeed, a group of states may in certain embodiments be analogous to a "language". If each state represents (as shown in FIG. 9) a discretely defined motion, configuration, and/or other input element (such as a pause without motion, a vocal input, the noise of a finger snap or a finger contacting a surface, a key press, etc.), then a relatively small group of states may be used to define an extremely large group of gestures. For example, given a set of 25 states arranged in three state gestures more than 15,000 gestures are mathematically possible. For a given number of states, as the number of states per gesture increases (for example, from 3 states in the above example to 4) the number of mathematically possible gestures also increases, and the number of gestures also may increase if the number of states per gesture is not fixed (e.g. a gesture includes at least 1 state and not more than 6).

In practice not all such gestures may be convenient for the user, may not be readily distinguished by available sensors, etc., so not all mathematically possible gestures for a given set of states may be used (nor are all possible gestures required to be used, even for those embodiments that do utilize a state language, which also is not required). However, even 1% of the approximately 15,000 gestures in the example above would represent about 150 gestures. Thus, a relatively small number of states nevertheless may support an extensive and/or diverse group of potential gesture inputs.

Use of states to build up a language of gestures in such manner may exhibit certain advantages, for example in terms of efficiency. In the example above, 150 unique gestures may be assembled from only 25 states. Thus, rather than defining, coding, debugging, etc. 150 different gestures, it may be suitable to define, code, debug, etc. only 25 states. This smaller number of states than gestures may in at least certain instances represent a smaller cost in resources. In addition, a gesture made up of multiple states typically may be longer and/or more complex than each of the individual states making up that gesture; thus, defining, coding, debugging, etc. each individual state may be less resource intensive than defining, coding, debugging, etc. each complete gesture, potentially providing additional savings in resources (e.g. time, money, processing power, memory, etc.).

However, the use of a state language, like the use of states and/or other discrete gesture elements, is an example only, and is not required. Other arrangements may be equally suitable.

As noted previously with regard to FIG. 2A through FIG. 2D, touch screen inputs may in certain cases be interpreted in some instances as a series of events, such as touchdown, swipe, and liftoff. Although the arrangement shown in FIG. 9 may be interpreted as representing three free space states that correspond one-for-one with the three touch screen events of FIG. 2A through FIG. 2D, this is an example only. One-for-one correspondence with touch screen events is not required, nor are touch screen events (where used) even necessarily considered in establishing free space standards (though such consideration and one-for-one correspondence also are not excluded).

In contrast with the arrangement shown for example in FIG. 6, which may be described for comparison purposes as a "continuous implicit" approach, the arrangement in FIG. 9 may be referred to as a "discrete implicit" approach. While the free space swipe gesture shown in FIG. 9 is now broken into and/or considered as three states rather than as a single continuous motion, a free space gesture invoking a surface constrained response according to FIG. 9 still may not include explicit equivalents of events such as a touchdown to a surface; such factors still may be described as being inferred, e.g. from the motions 906A, 906B, and 906C.

Figure 10:
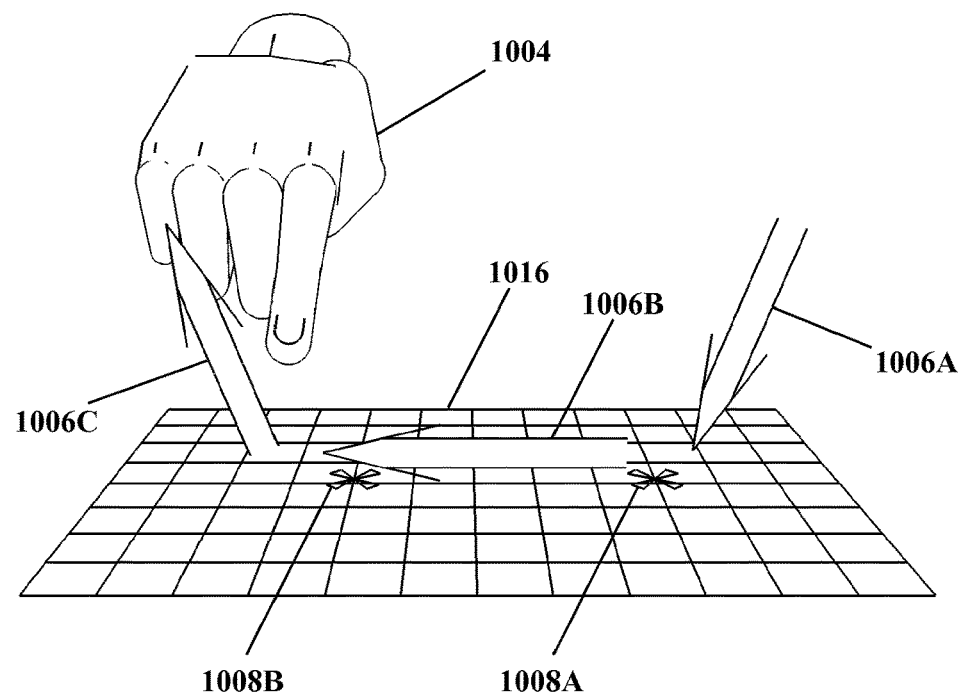
FIG. 10 shows an arrangement for free space input for invoking surface constrained input, with passive explicit form and incorporating a bounding surface.

Turning now to FIG. 10, some embodiments may include bounding for free space gestures. In the arrangement shown in FIG. 10, a hand 1004 has delivered a free space swipe input, with motion shown by motion arrows 1006A, 1006B, and 1006C (potentially but not necessarily representing individual states making up the full motion). In addition, as may be seen, a boundary 1016 is shown in FIG. 10, in the form of a rectangular plane (shown cross-hatched for visibility).

In the example of FIG. 10, the boundary 1016 serves as substitute for a physical surface such as a touch pad. With the boundary 1016 defined, contact with that boundary 1016 also may be defined. For example, an analog to touchdown (shown in FIG. 10 by marker 1008A) may be considered to take place when the hand 1004 touches, passes through, approaches within some minimum distance of, etc. the boundary 1016. Likewise, an analog to liftoff (shown in FIG. 10 by marker 1008B) may be considered to take place when the hand 1004 discontinues contact with, exits, moves away from, etc. the boundary 1016, and continued contact, proximity, etc. between hand 1004 and boundary 1016 may be considered as motion along a surface, and so forth.

Inclusion of a boundary such as that in FIG. 10 may be useful in at least certain embodiments. For example, by defining a surface or other geometry—even that geometry may have no physical substance—certain definitions may be improved and/or made more convenient. With the presence of a boundary 1016 surface, a free space swipe standard may be defined such that the user's hand 1004 must contact that boundary 1016 surface, for example, and any motion that does not include appropriate contact between the hand 1004 and the boundary 1016 surface may be ignored as not constituting a free space swipe. This may for example aid in discerning input gestures from noise, differentiating similar gestures from one another, and so forth.

In addition, if the boundary 1016 is made visible to the user—for example being displayed as an augmented reality entity on a head mounted display—the boundary 1016 may assist the user in delivering free space gestures, for instance serving as a visible guide as to where and/or how such gestures are to be executed in order to be accepted as input.

Figure 11A:
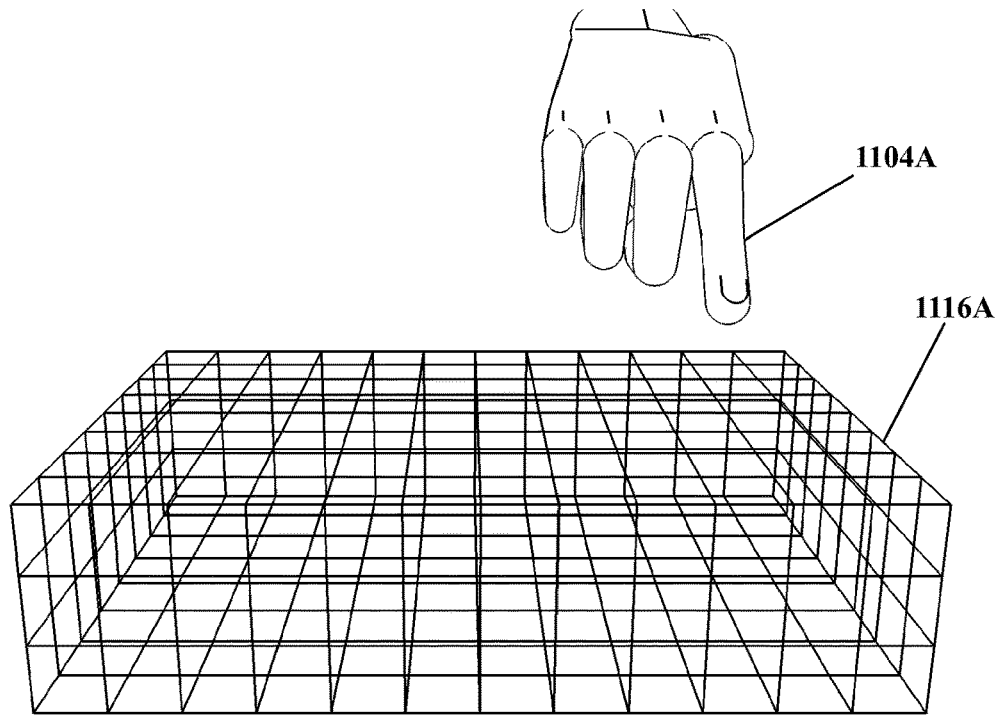
FIG. 11A through FIG. 11D show an arrangement for free space input for invoking surface constrained input, with passive explicit form and incorporating a bounding volume.

Moving on to FIG. 11A, therein is shown a first part of another example arrangement for discerning a free space swipe gesture according to various embodiments, again incorporating a boundary 1116A therein, with a hand 1104A in an initial position above the boundary 1116A. However, as may be seen, the boundary 1116A in FIG. 11A is not planar as in FIG. 10, but rather encompasses a volume. The boundary may be defined either volumetrically (i.e. the entire volume is the boundary) or as an enclosing surface; for purposes of explanation herein either interpretation may be made with respect to FIG. 11A.

Figure 11B:
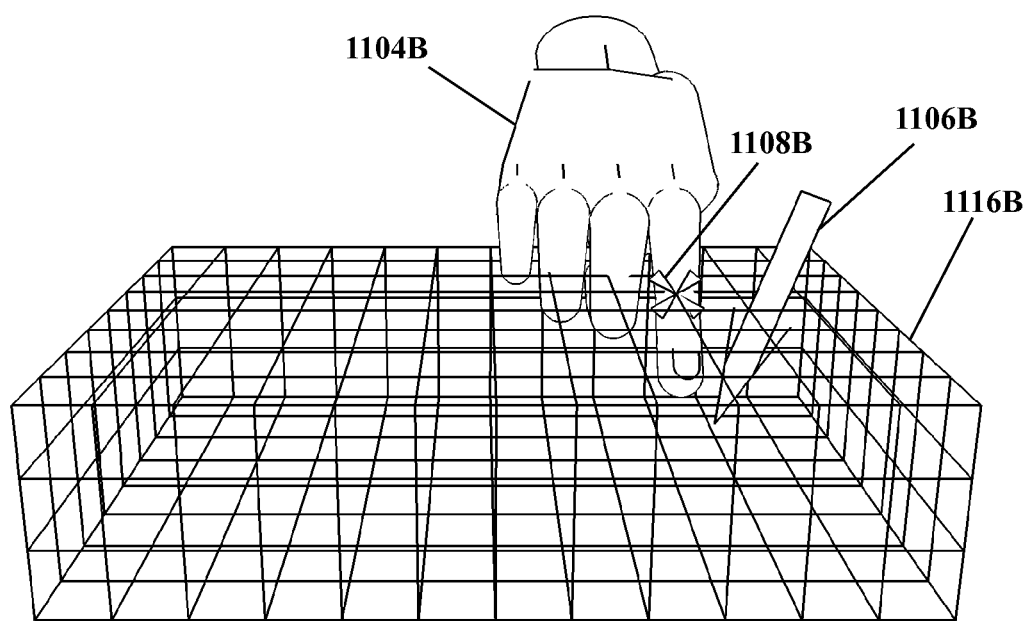

In FIG. 11B, as may be seen the hand 1104B has descended into the boundary 1116B, indicated by motion arrow 1106B. A contact marker 1108B also is shown, where the index finger of the hand 1104B intersects the surface of the boundary 1116B. The arrangement shown is an example; for other embodiments, the entire portion of the hand 1104B within the boundary 1116B may be considered to make contact with the boundary (such that contact is not a point), the contact point may be considered to be at and move with the tip of the index finger of the hand 1104B (or some other feature), etc., and other arrangements also may be equally suitable.

Figure 11C:
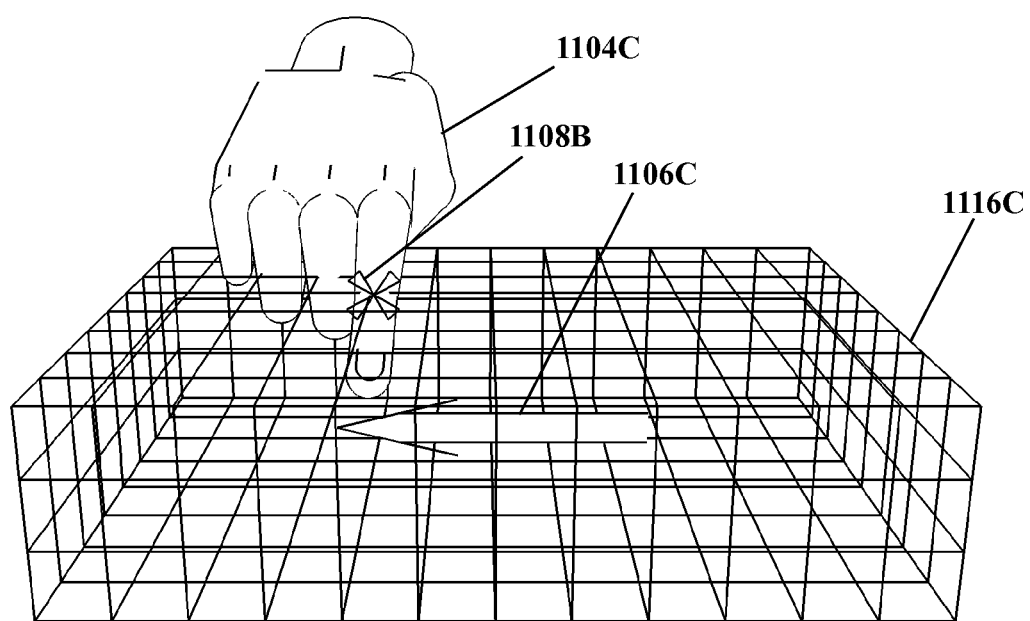

Continuing in FIG. 11C, as may be seen from motion arrow 1106C the hand 1104C has moved to the right (as seen by the viewer) while maintaining a contact point 1108C with the boundary 1116C. Likewise in FIG. 11D as seen from the motion arrow 1106D the hand 1104D has moved to the right and upward, leaving contact with the boundary 1116D at contact marker 1108D.

Thus as may be seen from FIG. 10 and FIG. 11A through FIG. 11D, a boundary is not limited to one particular form. Although only two forms are shown, other embodiments may vary considerably, incorporating boundaries including but not limited to curved surfaces and volumes, multiple surfaces, and other arrangements.

In addition, for certain embodiments it may be useful to arrange a boundary so as to at least substantially align with some or all of a physical object, such as a table, desk, window, clipboard, etc. For example, aligning a boundary with a physical-world desktop may provide tactile feedback, i.e. the user may feel a physical contact between fingertips and desktop at least somewhat analogous to a contact between fingertips and a touch pad, even though no physical touch pad may be present. It is noted that the degree of alignment between a boundary and a physical object is not required to be perfect or even near-perfect. For example, to continue the example of a boundary aligned with a desktop, a misalignment of several millimeters, or even a centimeter or more, still may facilitate the user's tactile interpretation of "using a touch screen" (even if no physical touch screen is present). Whether the user notices or not does not necessarily limit the degree of alignment; even if misalignment is detectable to a user, the tactile feedback or other advantages may be enabled nonetheless. No strict measured, mathematical, or logical limit of alignment is necessarily imposed for various embodiments, so long as functionality is maintained.

Indeed, for at least some embodiments a misalignment (whether deliberate or incidental) may be useful in itself. To continue the above example, a misalignment such that the boundary is some distance above the desktop may enable a user to hold his or her fingertips above the desktop so as to carry out "hover" actions (e.g. as may be analogous to a "mouse-over" for a computer mouse). However, these are examples only, and other arrangements may be equally suitable.

Figure 11D:
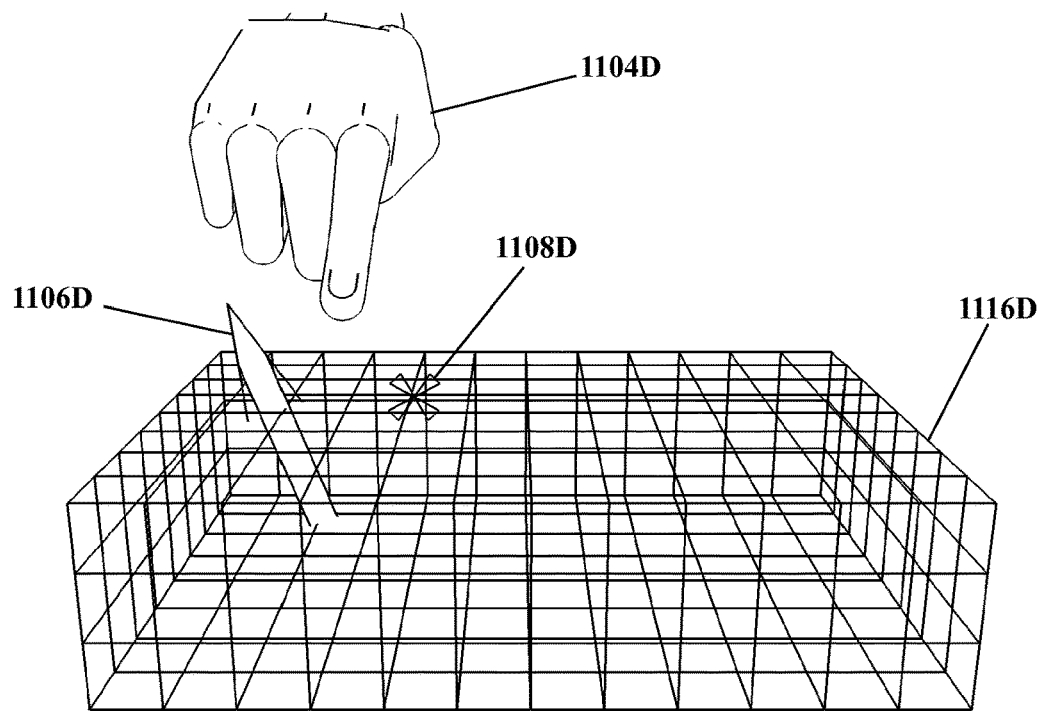

The arrangements shown in FIG. 10 through FIG. 11D may be referred to as "passive explicit". That is, an explicit analog to a touch down event and similar events may be provided, for example by defining a boundary and considering contact with that boundary as representing a touchdown. Such an arrangement may also be considered passive, in that the user himself or herself is not necessarily required to "do anything" to indicate contact or an equivalent thereof. Rather, the user simply carries out free space inputs, and contact with the boundary is made (or is not).

Now with reference to FIG. 12A through FIG. 12D, a free space standard according to may include some indication identifying (for example) a hand motion as a gesture. In the example shown, the indication is an explicit additional hand posture, specifically an extended little finger.

Figure 12A:
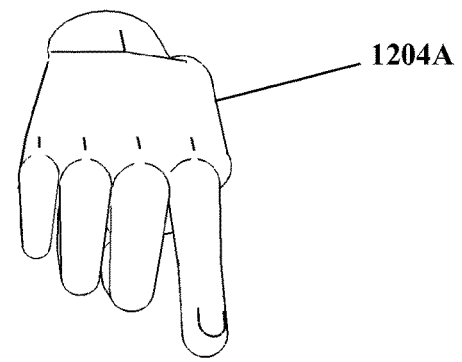
FIG. 12A through FIG. 12D show an arrangement for free space input for invoking surface constrained input, with active explicit form.
Figure 12B:
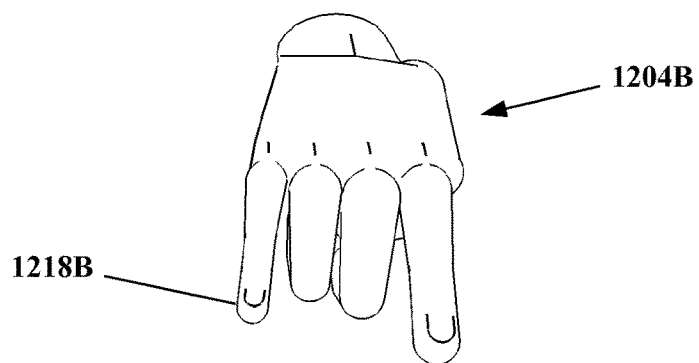

In FIG. 12A, a hand 1204A is visible, prior to executing a free space swipe gesture. It is noted that although the index finger thereof is extended, the little finger thereof is not. Moving on to FIG. 12B, the hand 1204B is again shown, still in an initial position, but the little finger thereof is now extended; in this example, the little finger is extended as an indication 1218B of gestural input. That is, the extended little finger signifies (e.g. to a processor evaluating sensor data) that motions carried out should be considered to have some property, such as being read as a swipe, as another gesture, as one of a group of gestures, etc. (though in the example shown the motions represent a swipe).

Figure 12C:
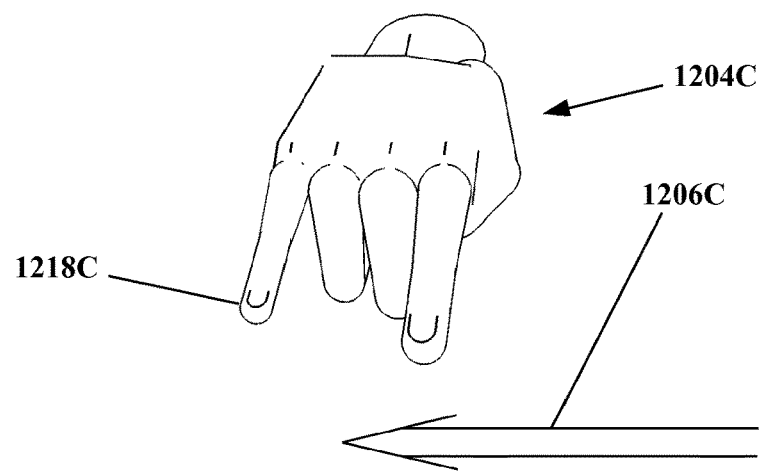
Figure 12D:
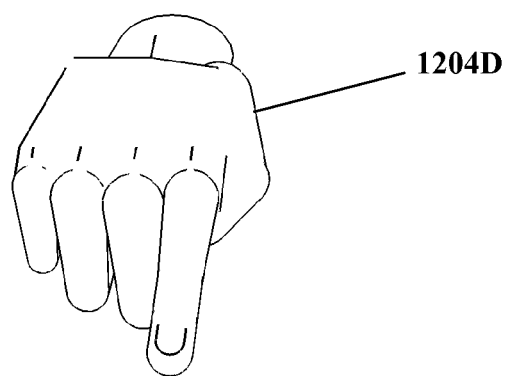

In FIG. 12C, the hand 1204C may be seen to have moved from left to right (as viewed by the person controlling the hand 1204C), as indicated by motion arrow 1206C, with the little finger still extended as an indication 1218C. In FIG. 12D, with the motion complete, the little finger has again been curled.

Thus in the arrangement of FIG. 12A through FIG. 12D, the extended little finger may serve as an indication relevant to an input standard. The precise meaning of the indication may vary; even within the example shown, the indication may refer specifically to a swipe input, more generally to an input that should be taken as touching a virtual surface, as an input to be considered only by certain programs or under certain circumstances, etc. Likewise, although FIG. 12A through FIG. 12D show an extended little finger, other indications may be equally suitable. For example, a swipe gesture standard may require that the index finger be extended, while a tap gesture standard requires that both the index and middle fingers be extended together, so as to facilitate distinguishing swipe inputs from tap inputs. Indications are not limited only to hand or finger positions, and the range of potential indications within the scope of various embodiments is potentially quite large.

Typically, though not necessarily, an indication may be at least substantially contemporary with a motion so as to represent a gesture collectively. To continue the example in FIG. 12A through FIG. 12D, the extended little finger—the indication—is present (that is, the finger is extended) throughout the hand motion, so as to identify the hand motion as a gesture for input purposes. Thus, the indication in FIG. 12A through FIG. 12D may be said to be contemporary with the motion.

However, as may be seen from FIG. 12A and FIG. 12D the indication (extended little finger) also is present even when the hand is not moving. As may be understood from FIG. 12A and FIG. 12D, it is not required that the indication be fully contemporary with a motion (or other input); that is, the indication may precede and/or follow the motion, and/or the motion may precede and/or follow the indication. Thus, an arrangement wherein a little finger is extended and then curled again still may serve as an indication, e.g. that the next hand motion is to be considered as gesture input. In addition, although it may be convenient for at least some embodiments to utilize an indication that is partly or entirely contemporary with a motion, this is an example only, and other arrangements may be equally suitable.

The arrangements shown in in FIG. 12A through FIG. 12D may be referred to as "active explicit". Again, an explicit analog to a touch down event and similar events may be provided, for example in the form of an indication such as a hand posture. That indication is actively provided, for example through the user extending a finger, otherwise altering a hand posture, etc.

Thus, collectively four broad categories of approaches according to various embodiments have been described, so as to support free space input for surface constrained control. Put in somewhat colloquial terms, these four approaches—continuous implicit, discrete implicit, passive explicit, and active explicit—serve as tools for addressing differences between free space inputs and surface constrained inputs. Thus, through the use of one or more such approaches according to various embodiments, information sufficient to discern and distinguish equivalents of touch screen inputs may be obtained from free space inputs, and free space gestures therefor may for at least certain purposes replace or "stand in for" touch screen inputs. Such arrangement enables, or at least contributes to enabling, control of devices, systems, etc. that accept touch screen inputs through the use of free space gestures.

Although four such example approaches have been described, the approaches are not necessarily limited only to these four, and other arrangements for discerning and/or distinguishing free space inputs so as to enable invoking surface constrained inputs may be equally suitable. In addition, the approaches shown are not necessarily exclusive; for example, certain free space gestures may be addressed using a continuous implicit approach while others (even for the same device, system, etc.) may be addressed using a discrete implicit approach. Likewise, certain free space gestures may be addressed using either or both of two or more approaches, e.g. either crossing a planar boundary or executing a hand posture indication may be acceptable for a given embodiment.

It is noted that in at least certain examples presented herein, each free space input—such as a right swipe gesture—may be referred to as corresponding to a surface constrained input, and/or to a response, singular. However, this is done for simplicity. Embodiments do not require a one to one correspondence between free space inputs, surface constrained inputs, and/or responses. For example, two or more free space gestures may invoke a single surface constrained input response, and other arrangements also may be equally suitable.

Figure 13:
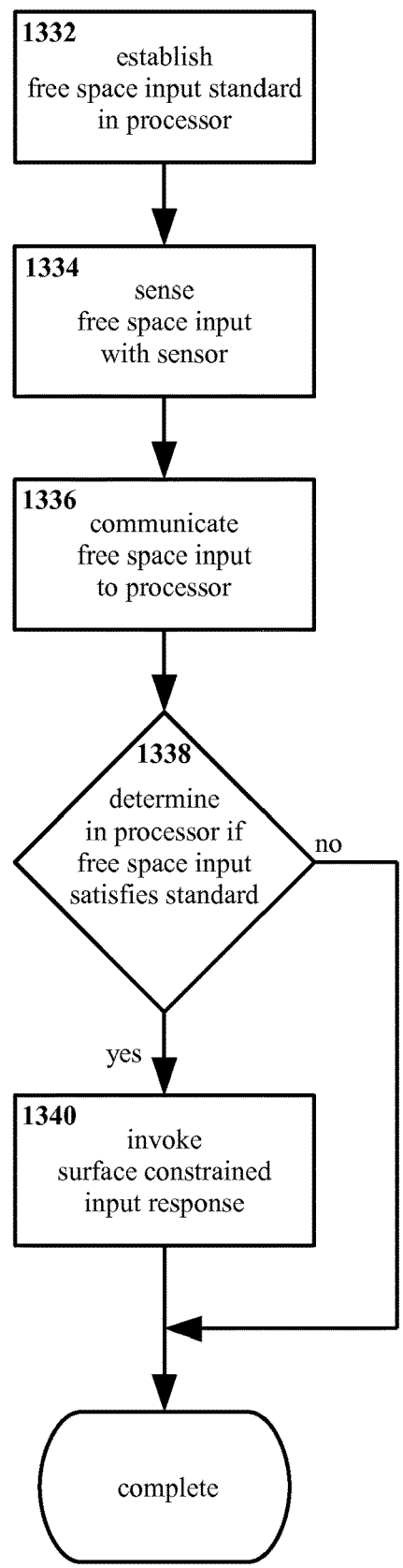
FIG. 13 shows an example method for applying free space input for surface constrained control, in flow chart form.

Now with reference to FIG. 13, an example method for applying free space input for surface constrained control is shown therein. As noted previously, various embodiments support enabling discerning and/or distinguishing free space gestures, and communicating such gestures so as to be usable as input. Both are presented in broad terms in FIG. 13; the former has been described in some detail already, and additional information will be presented later herein. The latter also will be described in more detail later herein.

In FIG. 13, a free space input standard is established 1332 in a processor. As has been previously described, a free space input standard defines what does and/or does not constitute a particular free space input for a given embodiment. For example, a free space swipe gesture may include motion of a hand or other end effector along certain paths, within a specified range of speeds and accelerations, in a certain configuration (e.g. index finger extended, others curled), while excluding other factors such as motion in the first joint of the index finger. The free space input standard is not limited with regard to what may be required, excluded, or otherwise specified thereby.

Typically, though not necessarily, the free space input standard may to at least some degree correspond with a surface constrained input such as a touch screen input, e.g. a free space swipe may have similar motions as, visually resemble, evoke, etc. a touch screen swipe.

It is noted that to "establish" something may, depending on particulars, refer to either or both the creation of something new (e.g. establishing a business, wherein a new business is created) and the determination of a condition that already exists (e.g. establishing the whereabouts of a person, wherein the location of a person who is already present at that location is discovered, received from another source, etc.). Similarly, establishing a free space input standard may encompass several potential approaches, including but not limited to the following.

Establishing a free space input standard on a processor may include instantiating the free space input standard onto the processor from some source, for example a data store such as a hard drive or solid state drive, through a communicator such as a wired or wireless modem, etc. Establishing a free space input standard also may include creating the free space input standard within the processor, for example computationally through the use of executable instructions thereon. Embodiments are not limited insofar as how a free space input standard may be established. It is required only that a free space input standard that is functional is in some fashion made available. Other arrangements than those described may be equally suitable. Also, where used with regard to other steps herein, establishing should be similarly be interpreted in a broad sense.

Similarly, embodiments are not limited with regard to the nature of the free space input standard. Typically the free space input standard may be a collection of data and/or executable instructions instantiated on the processor, such as a file or program or some portion thereof. However, this is an example only, and other arrangements may be equally suitable.

Embodiments also are not particularly limited with regard to the processor on which the free space input standard is established. A range of general-purpose, special-purpose, and embedded systems may be suitable for use as a processor. Moreover, it may be equally suitable for the processor to include two or more physical or logical processors and/or processor components, or to be a "virtual" processor. Other arrangements also may be equally suitable.

The previously noted function of enabling discerning and/or distinguishing free space gestures may in some sense be considered to be summarized in step 1332. While determining whether a particular phenomenon (gesture, posture, etc.) represents a free space input—that is, whether the free space input standard is satisfied—is addressed subsequently in FIG. 13, the input may be in some sense defined or created in step 1332. Thus, certain discussions above with regard to FIG. 5 through FIG. 12D may be considered as being particularly relevant to step 1332.

Continuing in FIG. 13, free space input is sensed 1334 with a sensor. Embodiments are not limited with regard to what sensor or sensors are used for sensing 1334 the free space input, nor with regard to how the free space input may be sensed 1334. Typically though not necessarily, some form of imager such as a camera, depth camera, etc. may be utilized to capture one or more images and/or video segments, such that position, motion, and so forth as may be indicative of free space input may be determined therefrom. Use of cameras, including but not limited to CMOS and CCD cameras, may be suitable for certain embodiments, but other arrangements may be equally suitable. Furthermore, although step 1334 refers to a singular sensor, the use of multiple sensors, whether similar or different, operating independently or in concert (such as a stereo pair of imagers), may be equally suitable.

The free space input is communicated 1336 to the processor. Embodiments are not limited with regard to the content and/or form of the communication, e.g. images, video, numerical data, etc. Embodiments also are not limited with regard to how the free space input may be communicated. Typically though not necessarily, a sensor may be disposed in the same device or system as the processor, and communication may be through a wired link. However, other arrangements, including but not limited to wireless communication (whether or not the sensor and processor are in the same device or system, or are close or at great distance) may be equally suitable.

A determination 1338 is made in the processor as to whether the free space input (as sensed in step 1334 and communicated to the processor in step 1336) satisfies the standard therefor (as established in step 1332). Typically though not necessarily this determination may have the form of a comparison carried out by executable instructions instantiated on the processor, but other arrangements may be equally suitable.

If the determination 1338 is positive—if the free space input satisfies the standard therefor—then the method continues with step 1340. If the determination 1338 is negative—if the free space input does not satisfy the standard therefor—then step 1340 is skipped.

Continuing in step 1340, a surface constrained input response is invoked. That is, some function, action, etc. that typically may be associated with a surface constrained input such as a touch screen input is caused to be carried out. This may be considered in some sense to represent the previously noted function of communicating and/or interpreting free space gestures so as to be usable as surface constrained input. Approaches therefor are described in greater detail subsequently herein. However, it is noted that embodiments are not particularly limited with regard to how a surface constrained input response may be invoked. Suitable approaches may include, but are not limited to, "spoofing" or generating virtual or "counterfeit" signals representative of real world touch screen input, producing virtual signals confirming that a touch screen input has been received, and directly activating or carrying out commands associated with touch screen input.

Although FIG. 13 shows the method as being complete after step 1340 for purposes of simplicity, in practice a method may repeat, for example returning to step 1334 in a loop so as to sense free space input in an ongoing fashion.

Figure 14:
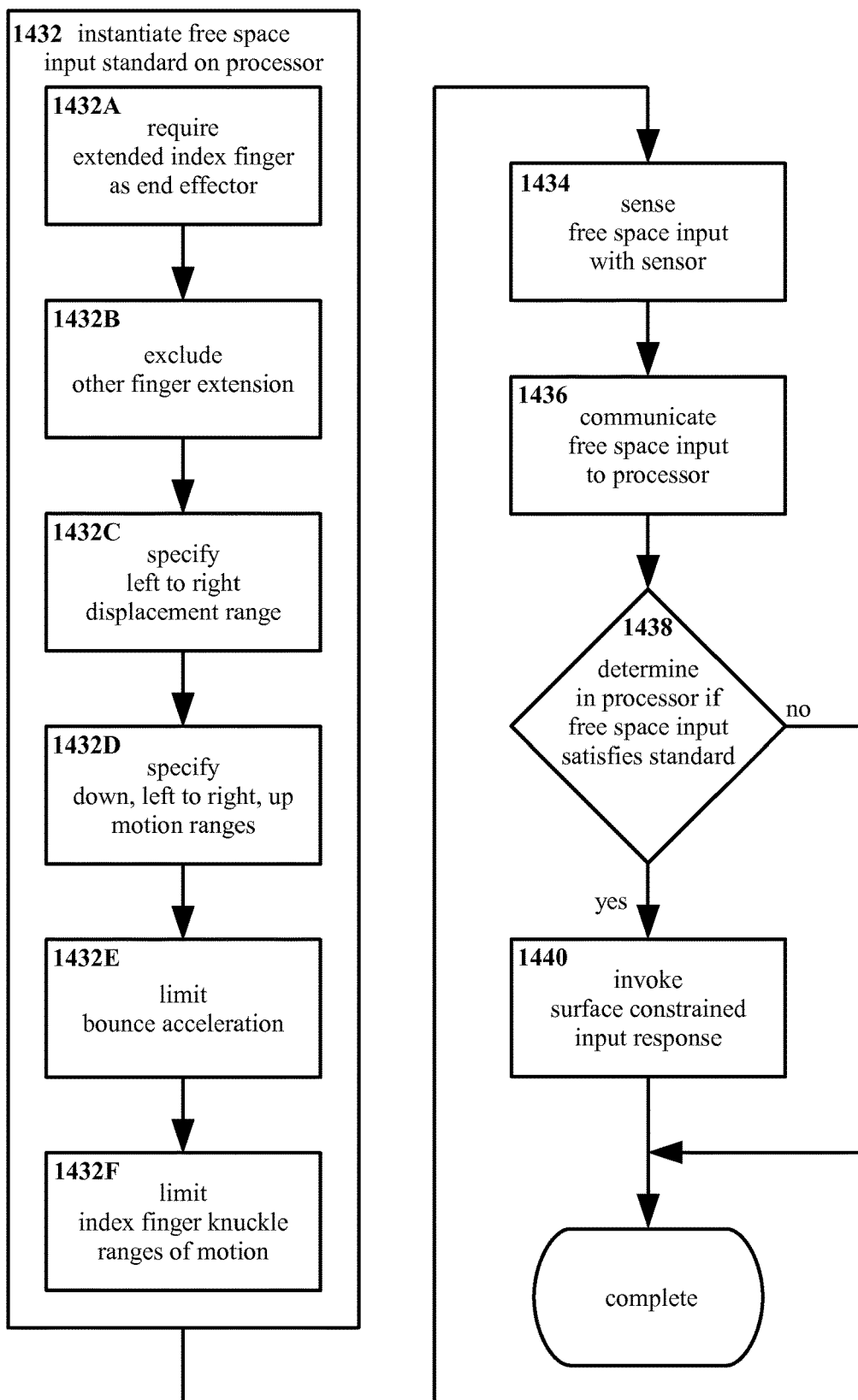
FIG. 14 shows another example method for applying free space input for surface constrained control, with a continuous implicit approach, in flow chart form.

Now with reference to FIG. 14, therein is shown another example method according for applying free space input for surface constrained control. The arrangement shown in FIG. 14 more specifically addresses an example utilizing a continuous implicit approach (as previously illustrated and described herein).

In FIG. 14, a free space input standard is instantiated 1432 in a processor, for example by loading the free space input standard onto the processor from a data store such as a solid state drive; such instantiation may be considered to be an example of establishing the standard as described previously with regard to FIG. 13 and elsewhere herein.

Instantiating 1432 the free space standard may be considered as several sub steps, and/or to exhibit several features, identified in FIG. 14 as 1432A through 1432F. The specifics thereof are an example only, and more particularly present an example of a continuous implicit approach, i.e. wherein free space input is defined as (and/or subsequently treated as) a single substantially continuous motion, without necessarily including an explicit "stand in" for features as may be associated with a touch screen input (or other surface constrained input) such touchdown, etc.

For purposes of example, the free space input standard instantiated 1432 on the processor in FIG. 14 (and likewise FIG. 15, FIG. 17, and FIG. 18) is presented as a right swipe motion in free space, e.g. similar to certain other free space inputs previously described and shown herein. Embodiments are not limited only to right swipes, and other arrangements may be suitable.

In the example arrangement of FIG. 14, the free space input standard as instantiated 1432 on the processor includes therein requiring 1432A that an extended index finger serve as an end effector for delivering the free space input. Thus, for the specific example of FIG. 14, use of a stylus or other end effector may not be recognized as satisfying the free space input standard, and thus even an input otherwise satisfying the free space input standard may not be accepted if not delivered with an extended index finger.

Embodiments are not limited by the manner in which the free space input may be defined so as to limit inputs only to those delivered with an extended index finger as an end effector. For at least certain embodiments, it may be useful to obtain one or more images or video clips and identify the presence (or absence) of an extended index finger therein through image recognition. Outlines of fingers and/or hands, models of hands (e.g. articulated models including "joints", rigid "bones", etc.) and so forth may be utilized as part of image recognition and/or independently. Motion tracking of potential end effectors through multiple images and/or video may be considered. Stereo sensing, time-of-flight sensing, focal depth sensing, and/or other approaches incorporating depth and/or distance as a third dimension also may be considered. These are examples only, and other arrangements also may be equally suitable. Although many approaches may be utilized to determine whether a free space input is delivered, or is not delivered, by an index finger or other particular end effector, embodiments are not limited with regard to what particular approach(es) may be so utilized.

More broadly, although sub step 1432A may be implemented in a variety of manners, embodiments are not limited to how step 1432A is implemented Likewise, steps 1432B through 1432F and other steps in FIG. 14 and elsewhere are presented as examples, and should not be considered to limit embodiments to any particular manner for the execution and/or implementation thereof, unless otherwise specified herein.

Continuing in FIG. 14, the free space input standard as instantiated 1432 on the processor includes therein excluding 1432B the extension of other fingers. That is, if a finger other than the index finger is extended, the free space input standard may not be satisfied, such that even an input otherwise satisfying the free space input standard may not be accepted if delivered with a finger other than the index finger extended.

Considered together, 1432A and 1432B may be understood as requiring that the index finger and only the index finger must be extended to input a free space input satisfying the free space input standard. As noted, the example of FIG. 14 refers to a right swipe free space input. Together, 1432A and 1432B may for example be useful in identifying hand motions as being free space input (e.g. by being done with the index finger extended) and/or in distinguishing a right swipe input from other free space inputs (e.g. some other gesture delivered with two fingers) and/or incidental motions.

The free space input standard also specifies 1432C a left to right displacement range. That is, an overall change in displacement of the index finger from left to right must be within a specified range, e.g. below some maximum and above some minimum. Such a range may be useful in defining a right swipe and/or distinguishing from other inputs and/or incidental motions, e.g. since a right swipe may in at least certain circumstances be presumed to exhibit some minimum and/or maximum "size" in terms of overall right to left motion.

The free space input standard further specifies 1432D that motion (e.g. of the extended index finger) must exhibit downward motion, left to right motion, and upward motion, consecutively, and within specified ranges (e.g. minimum and maximum motions, within some range of a particular path shape, etc.). Such specification 1432D may be useful for example in distinguishing a particular motion, in the example of FIG. 14 a right sweep, through anticipated characteristic motions thereof.

Still with reference to FIG. 14, the free space input standard limits 1432E bounce acceleration. As previously noted, certain free space inputs such as a tap may under at least some circumstances bear some resemblance to a right swipe. More broadly, free space inputs may in some manner resemble one another particularly if those inputs diverge and/or degenerate from an ideal form (for example if a user becomes "sloppy" in delivering inputs). As also noted previously, in at least certain circumstances individual features, in this example bounce acceleration, may be utilized to distinguish potentially similar appearing free space inputs even with some degree of degeneration. For example, a tap may include an acceleration profile that may be referred to as a bounce—a downward motion that is rapidly reversed to an upward motion—while a swipe may not include such acceleration. Thus by limiting 1432E bounce acceleration to some maximum, taps (including but not limited to degenerate taps that include some left to right motion so as to resemble right swipes) may be excluded; in different terms, a swipe may be discerned from among possible non-swipe input and/or incidental motions through consideration of acceleration.

It is noted that for certain embodiments it may be useful to entirely exclude bounce acceleration, or other potentially distinguishing motions, accelerations, other features, etc. However, although such absolute exclusion is not prohibited, in at least some embodiments it may be useful to permit at least some degree of such distinguishing features, at least sufficient to accommodate certain forms of noise. For example, human hand motion may be imperfect (e.g. exhibiting tremors, motion from wind, variations in motion due to clothing restrictions or injuries, etc.), sensing of motion by sensors may be imperfect, processor interpretation of motion based on sensor input may be imperfect, and so forth.

Such limit may be considered as representing (and may, in certain embodiments, be implemented with) a form of "low pass filter" for motion. For example, motion below a certain speed, and/or or below a certain displacement, a certain acceleration, etc. may be filtered out from consideration. Such an arrangement may eliminate small "wavers" or other incidental motions in a fingertip, for example. The low pass filter (if any) may be implemented within the sensor, within the processor, etc., and so may not in a very strict sense be part of the free space input standard itself. However, in functional terms, applying a low pass filter for motion to eliminate incidental wavering of a fingertip, a low pass filter for acceleration to eliminate minor accelerations too small to represent part of a tap gesture (as in the example above), and so forth may serve similarly to including limits on motion and/or bounce acceleration (and/or other features).

Continuing in FIG. 14, the free space input standard limits 1432F the range of motion of the finger knuckles. As previously noted, certain other inputs and/or incidental motions besides right swipes may include knuckle motion, e.g. a tap or touch may be implemented by moving the index finger at the proximal knuckle thereof. As with bounce acceleration limited 1432E above, limiting 1432F knuckle motion may be useful for example in discerning swipe input and/or excluding other inputs and/or non-input motions.

Collectively, 1432A through 1432F may be considered to represent a free space input standard as instantiated 1432 on a processor. Although the free space input standard is shown in FIG. 14 as including multiple independent factors (e.g. 1432A through 1432F) of various sorts (requirements, ranges, exclusions, etc.), embodiments are not limited only to defining a free space input in such fashion, nor to the various example factors 1432A through 1432F shown therein.

For example, a requirement that there be no stops and/or pauses in motion during the gesture may be suitable, e.g. so as to avoid confusing two consecutive gestures with a pause therebetween for one longer gesture Likewise, requiring motions to fall within anatomically and/or behaviorally preferred motion arcs may be suitable. Human motions typically may follow certain arcs and/or other paths, due to factors such as the physical structure of human joints, cultural preferences in motions, individual habit, and so forth. In considering only inputs following such parameters, non-input motions may potentially be excluded from consideration as possible gestures, for example.

In addition, although for simplicity the various factors referred to in sub steps 1432A through 1432F are described as fixed, embodiments are not limited only to free space input standards (or portions thereof) that are fixed. Standards may be variable based on user selections, may be adaptive so as to respond and/or adjust to varying conditions and/or changes in gestures being applied, and/or may change in other manners.

Other arrangements also may be equally suitable.

Still with reference to FIG. 14, free space input is sensed 1434 with a sensor. The free space input is communicated 1436 to the processor. A determination 1438 is made in the processor as to whether the free space input satisfies the standard therefor. If the determination 1438 is positive—if the free space input satisfies the standard therefor—then the method continues with step 1440. If the determination 1438 is negative—if the free space input does not satisfy the standard therefor—then step 1440 is skipped. Continuing in step 1440, a surface constrained input response is invoked.

Figure 15A:
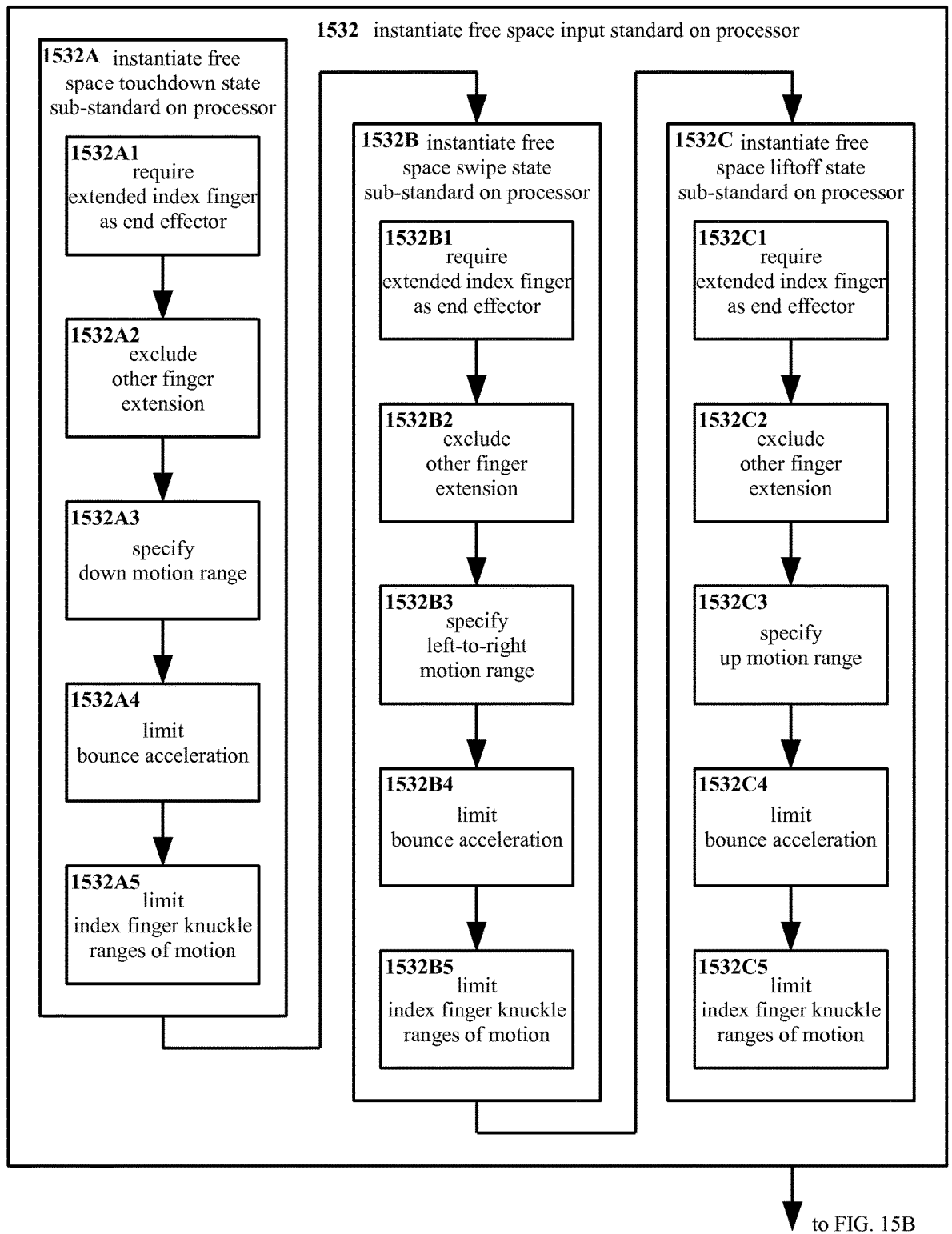
FIG. 15A and FIG. 15B show another example method for applying free space input for surface constrained control, with a discrete implicit approach, in flow chart form.
Figure 15B:
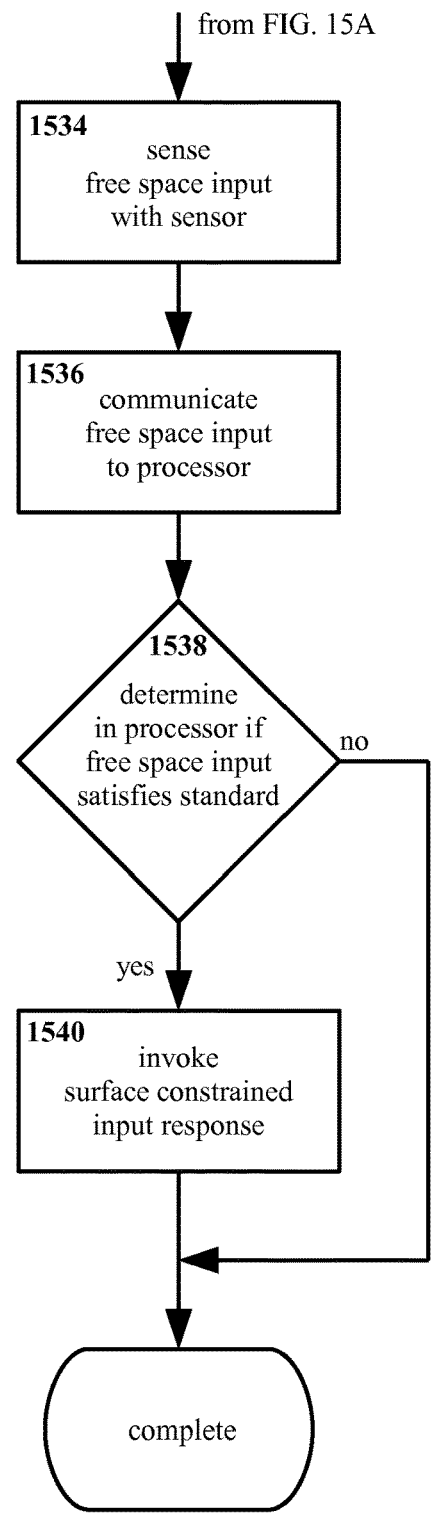

Now with regard to FIG. 15A and FIG. 15B, therein is shown another example method for applying free space input for surface constrained control. The arrangement shown in FIG. 15 and FIG. 15B more specifically addresses an example utilizing a discrete implicit approach (as previously illustrated and described herein).

In FIG. 15A, a free space input standard is instantiated 1532 in a processor, for example by loading the free space input standard onto the processor from a data store such as a solid state drive; such instantiation may be considered to be an example of establishing the standard as described previously herein.

As noted, the arrangement in FIG. 15A addresses a discrete implicit approach, i.e. an approach considered in two or more distinct parts. For purposes of the example in FIG. 15A, the free space swipe input is considered in three parts: touchdown, swipe, and liftoff. The free space input standard thus likewise is considered in three parts, and instantiating 1532 the free space standard onto the processor similarly may be considered as three discrete (though at least potentially related) sub steps. For purposes of illustration, those three sub steps are referred to in FIG. 15A as instantiating 1532A a free space touchdown state sub-standard onto the processor, instantiating 1532B a free space swipe state sub-standard onto the processor, and instantiating 1532C a free space liftoff state sub-standard onto the processor.

In turn, each of the sub-standards instantiated on the processor in steps 1532A, 1532B, and 1532C may be considered as several sub steps.

With regard to sub step 1532A, instantiating a free space touchdown state sub-standard onto the processor includes therein requiring 1532A1 that an extended index finger serve as an end effector for delivering the free space input, and excludes 1532A2 the extension of other fingers.

The free space touchdown state sub-standard also specifies 1532A3 a downward motion within a range (e.g. some minimum and/or maximum distance of downward motion for the extended index finger).

Still with reference to FIG. 15A, the free space touchdown state sub-standard limits 1532A4 bounce acceleration, and also limits 1532A5 the range of motion of the finger knuckles.

Collectively, 1532A1 through 1532A5 may be considered to represent a free space state sub-standard (more particularly for a touchdown state) as instantiated 1532A on a processor. Although as noted already the free space touchdown state sub-standard is shown in FIG. 15A as including multiple independent factors (e.g. 1532A1 through 1532A5) of various sorts (requirements, ranges, exclusions, etc.), embodiments are not limited only to defining a free space input in such fashion, nor to the various example factors 1532A1 through 1532A5 shown therein. Other arrangements may be equally suitable.

At this point it may be useful to note a contrast between the arrangements of FIG. 14 and FIG. 15A. Where the arrangement of FIG. 14 specified an overall left to right motion range (1432C) and a sequence of downward, left to right, and upward motion considered as a single continuous input, the arrangement in FIG. 15A addresses each of three motions (downward, left to right, upward) as individual states. Thus, although the sub steps in 1532A (and likewise in 1532B and 1532C below) differ somewhat, the overall motion and input may be similar. Even though the overall actions taken by a user to generate an input (the swipe motions) may be similar or even identical for the arrangements shown in FIG. 14 and FIG. 15A, the manner in which those actions are interpreted may vary from one embodiment to another. More concretely with regard to FIG. 14 and FIG. 15A, the arrangement of FIG. 14 considers a free space input standard in terms of a continuous motion, while the arrangement of FIG. 15A considers a free space input standard in terms of three distinct states.

Continuing in FIG. 15A (and still with regard to step 1532 thereof), with regard to sub step 1532B, instantiating a free space touchdown state sub-standard onto the processor includes therein requiring 1532B1 that an extended index finger serve as an end effector for delivering the free space input, and excludes 1532B2 the extension of other fingers.

The free space touchdown state sub-standard also specifies 1532B3 a left to right motion within a range, limits 1532B4 bounce acceleration, and also limits 1532B5 the range of motion of the finger knuckles.

Still with regard to step 1532 in FIG. 15A, with regard to sub step 1532C instantiating a free space touchdown state sub-standard onto the processor includes therein requiring 1532C1 that an extended index finger serve as an end effector for delivering the free space input, and excludes 1532C2 the extension of other fingers. The free space touchdown state sub-standard also specifies 1532C3 an upward motion within a range, limits 1532C4 bounce acceleration, and also limits 1532C5 the range of motion of the finger knuckles.

Thus as shown in FIG. 15A, instantiating 1532 the free space input standard may be viewed as instantiating 1532A, 1532B, and 1532C three free space state sub-standards for three distinct states.

As also may be seen in FIG. 15A, sub-standards as instantiated 1532A, 1532B, and 1532C bear at least some similarity to one another. For example, 1532A, 1532B, and 1532C all require an extended index finger, limit bounce acceleration, etc. This may be useful for at least certain embodiments, for example as a matter of consistency of input. However, it is an example only, and different states (or other discrete portions of input standards and/or input) are not required to include parallel sub steps, or otherwise to resemble one another, and other arrangements may be equally suitable.

Now with reference to FIG. 15B, free space input is sensed 1534 with a sensor. The free space input is communicated 1536 to the processor. A determination 1538 is made in the processor as to whether the free space input satisfies the standard therefor. If the determination 1538 is positive then the method continues with step 1540, while if the determination 1538 is negative step 1540 is skipped. Continuing in step 1540, a surface constrained input response is invoked.

Figure 16:
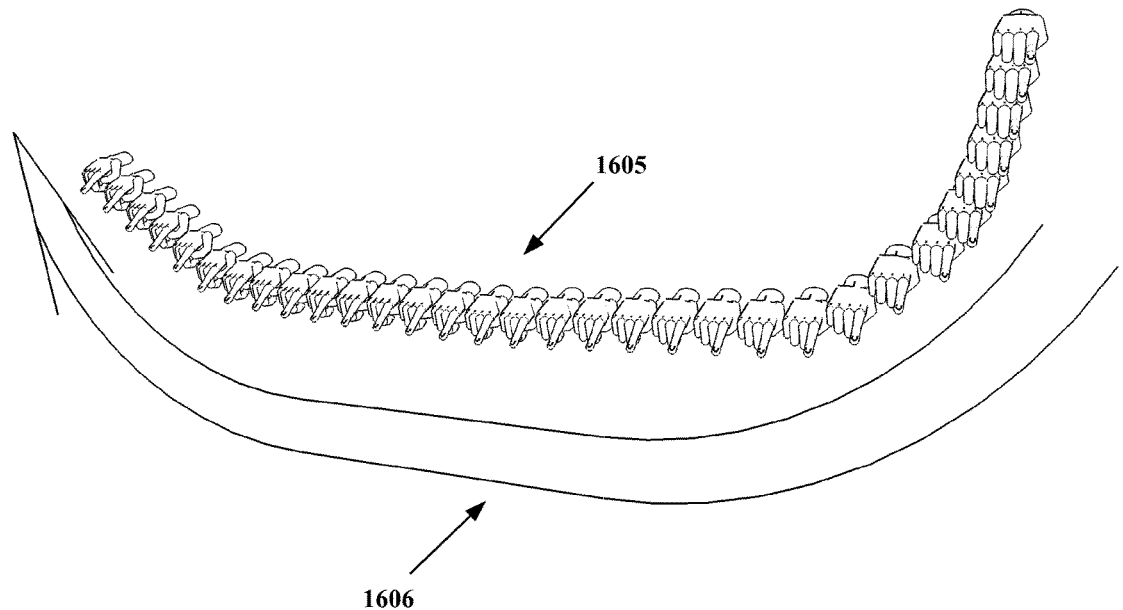
FIG. 16 shows an example arrangement for sensing free space input, with a continuous implicit approach, in perspective view.

Turning now to FIG. 16, with regard to FIG. 14 and FIG. 15 free space input standards, features thereof, state sub-standards and features thereof, etc. are described. In the examples of FIG. 14 and FIG. 15 such features as an extended index finger, particular motions and/or ranges of motion, limited accelerations, etc. are referred to. FIG. 16 illustrates an example of how input may be sensed and/or how a determination may be made as to whether such features are met (e.g. as in steps 1534 and 1538 in FIG. 15B).

In FIG. 16, a sequence 1605 of hand representations is shown, along with a motion arrow 1606 indication direction of motion. The arrangement of FIG. 16 may be taken to indicate the position and configuration of a hand (or other end effector) as that hand moves through space and/or changes in configuration over time, with each individual hand in the sequence 1605 representing the hand at a moment in time. (For simplicity, the hand configuration, e.g. the positions of the fingers with respect to the hand, etc. is not shown to vary in FIG. 16. In practice variation may occur, and embodiments are not limited only to arrangements where such change in configuration is absent.)

A sequence 1605 such as that shown in FIG. 16 may be acquired in various ways, for example by capturing a series of images over time, such that each hand in the sequence 1605 as shown would represent the hand position and/or configuration in an individual image, that image further representing a moment in time. Typically though not necessarily, such a sequence 1605 may be acquired with an RGB camera, depth camera, or other sensor, with images and/or data from those images then being communicated to and/or evaluated in a processor. However, it is noted that the arrangement in FIG. 16 is illustrative only; such a visual arrangement may or may not be present at any point in any particular embodiment. Images may be considered individually, for example, without being arranged as shown in FIG. 16. Alternately, a wireframe, skeleton, joint model, etc. or some other construct (potentially though not necessarily derived from images) may be utilized in addition to or in place of images. As yet another option, consideration may not be graphical at all, instead being numerical or taking some other form.

Regardless of how such a sequence 1605 is acquired and/or considered, it may be understood that such a sequence 1605 as shown in FIG. 16 may be evaluated to determine positions, ranges of motions, velocities, accelerations, variations in joint position, etc., such as those features referred to previously with respect to steps 1432 in FIGS. 14 and 1532 in FIG. 15, respectively (though not limited only to such features).

In the arrangement shown in FIG. 16, the motion represented therein is considered collectively as a single input, e.g. with a continuous implicit approach (as may be seen from the single motion arrow 1606). However, turning now to FIG. 17 consideration of a sequence 1706 also may be considered as multiple motions, inputs, states, etc., as represented for example by motion arrows 1706A, 1706B, and 1706C. For an arrangement such as that in FIG. 17, motion arrow 1706A may represent a touchdown state as exhibited by some or all of the sequence 1705, motion arrow 1706B may represent a swipe state as exhibited by some or all of the sequence 1705, and motion arrow 1706C may represent a liftoff state as exhibited by some or all of the sequence 1705. The arrangement in FIG. 17 thus may be considered to represent a discrete implicit approach.

It is noted that the sequence 1705 need not necessarily be itself subdivided in order to discern states that may represent only some portion of the sequence 1705. That is, the entire sequence 1705 may be evaluated when discerning each state (touchdown, swipe, and liftoff), or only some portion may be evaluated for each state (e.g. roughly the third on the right of the page for the touchdown, and so forth).

Figure 17:
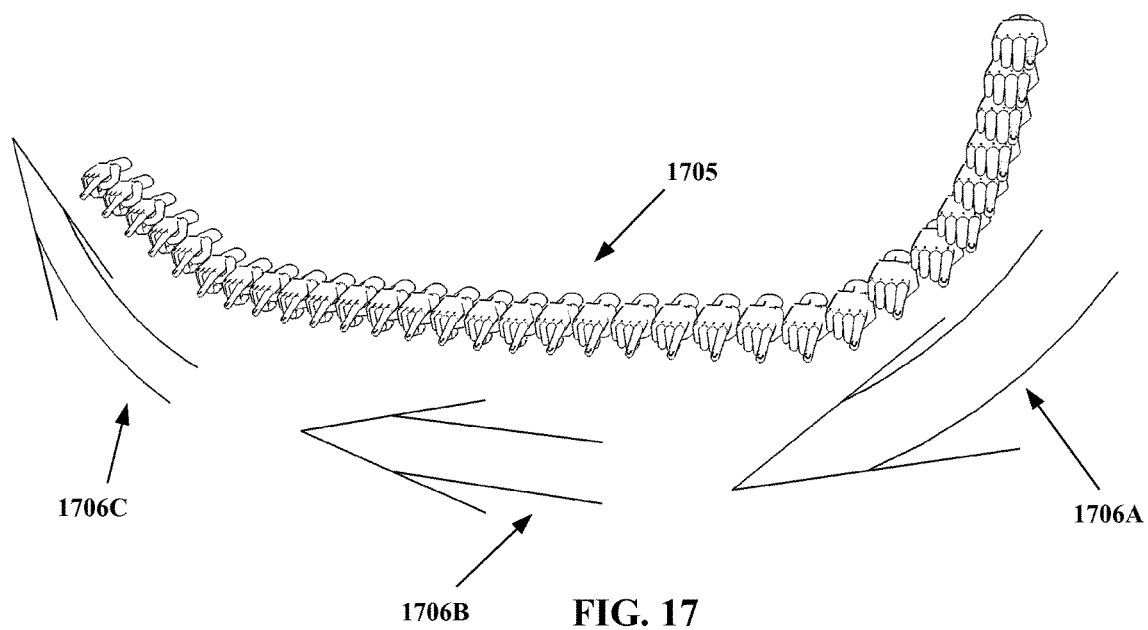
FIG. 17 shows another example arrangement for sensing free space input, with a discrete implicit approach, in perspective view

Similar arrangements may be understood from FIG. 16 and FIG. 17 as being applicable to passive explicit, active explicit, and/or other approaches. A passive explicit arrangement may be similar to that shown in FIG. 16 and/or FIG. 17 (since a boundary may exist only as a virtual or informational construct, such a boundary may not be visible), while an active explicit arrangement may additionally include for example extension of a little finger or some other indication (as already shown in FIG. 12A through FIG. 12D).

Figure 18:
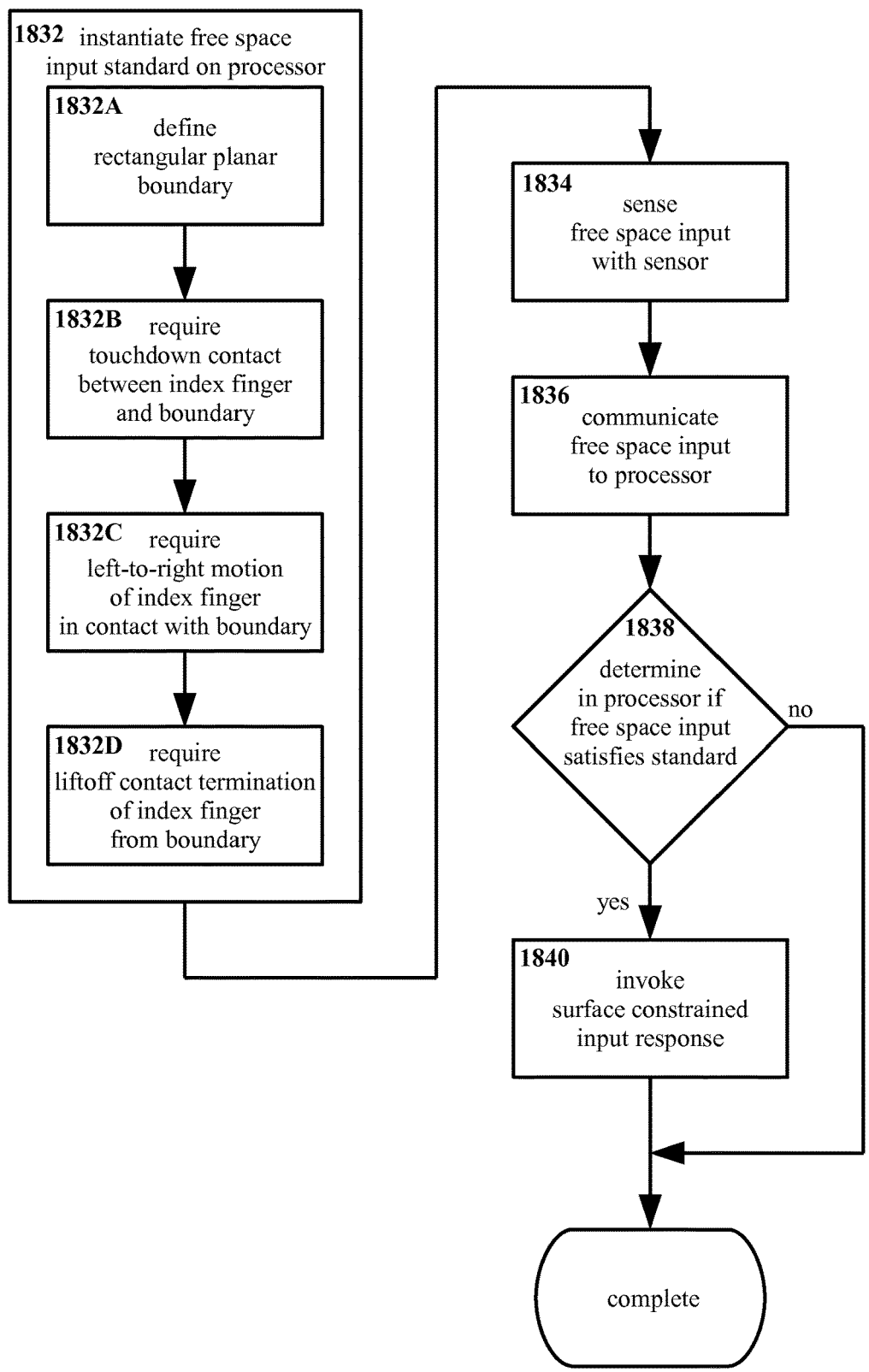
FIG. 18 shows another example method for applying free space input for surface constrained control, with a passive explicit approach, in flow chart form.

Moving now to FIG. 18, therein is shown another example method for applying free space input for surface constrained control, addressing a passive explicit approach (as previously illustrated and described herein).

In FIG. 18, a free space input standard is instantiated 1832 in a processor.

Instantiating 1832 the free space standard onto the processor may be considered as several sub steps. A limited planar boundary is defined 1832A. The boundary serves as an explicit "stand in" for a touch screen or other constraining surface, such that a user may deliver input in free space without such a constraining surface, and without necessarily actively modifying such inputs (hence, "passive"). The boundary typically though not necessarily may be an insubstantial construct defined in space (e.g. by the processor), such as a virtual reality construct, an augmented reality construct, etc. that may be displayed to a person or persons who may deliver free space input therewith. However, the boundary is not required to be displayed, and constructs defined in space without being visible (e.g. a mathematically defined region in space specified within the processor without being outputted visually) may be equally suitable.

For purposes of FIG. 18, the boundary is rectangular and planar (i.e. substantially two dimensional), such as the boundary previously shown in FIG. 10. Such a boundary may be convenient, for example as being similar to a physical touch screen with which users may be familiar. However, a rectangular planar boundary is an example only, and other arrangements may be equally suitable. As shown and described previously with respect to FIG. 10 and FIG. 11A through FIG. 11D, the boundary may take various forms, including but not limited to a plane or flat surface, the surface and/or volume of a rectangular solid, a sphere or portion thereof, some other curved surface, an arbitrary surface or volume, etc.

Continuing in FIG. 18, instantiating a free space input standard onto the processor includes requiring 1832B a touchdown between an extended index finger and the boundary. That is, an extended index finger must contact (or for an insubstantial boundary, coincide with and/or pass through) the boundary. This may be understood as an explicit free space analog of a touch screen touchdown event.

Instantiating a free space input standard onto the processor also includes requiring 1832C a left to right motion of the index finger while in contact with the boundary, and requiring 1832D a liftoff terminating contact between the index finger and the boundary. These likewise may be understood as explicit free space analogs of a touch screen swipe event and a touch screen liftoff event, respectively.

Moving on in FIG. 18, a free space input is sensed 1834 with a sensor. It is noted that although the sensor may sense motions, positions, etc., the sensor may or may not sense the boundary. If, for example, the boundary exists partially or entirely as a construct within the processor, then it may not even be necessary to sense the boundary, as the position, extent, etc. thereof would already be "known" by the processor. Regardless, sensory information of some sort typically may be sensed 1834 by a sensor, including but not limited to position, motion, and configuration of a hand or other end effector with respect to the boundary.

The free space input is communicated 1836 to the processor. A determination 1838 is made in the processor as to whether the free space input satisfies the standard therefor. If the determination 1838 is positive then the method continues with step 1840, while if the determination 1838 is negative step 1840 is skipped. Continuing in step 1840, a surface constrained input response is invoked.

Figure 19:
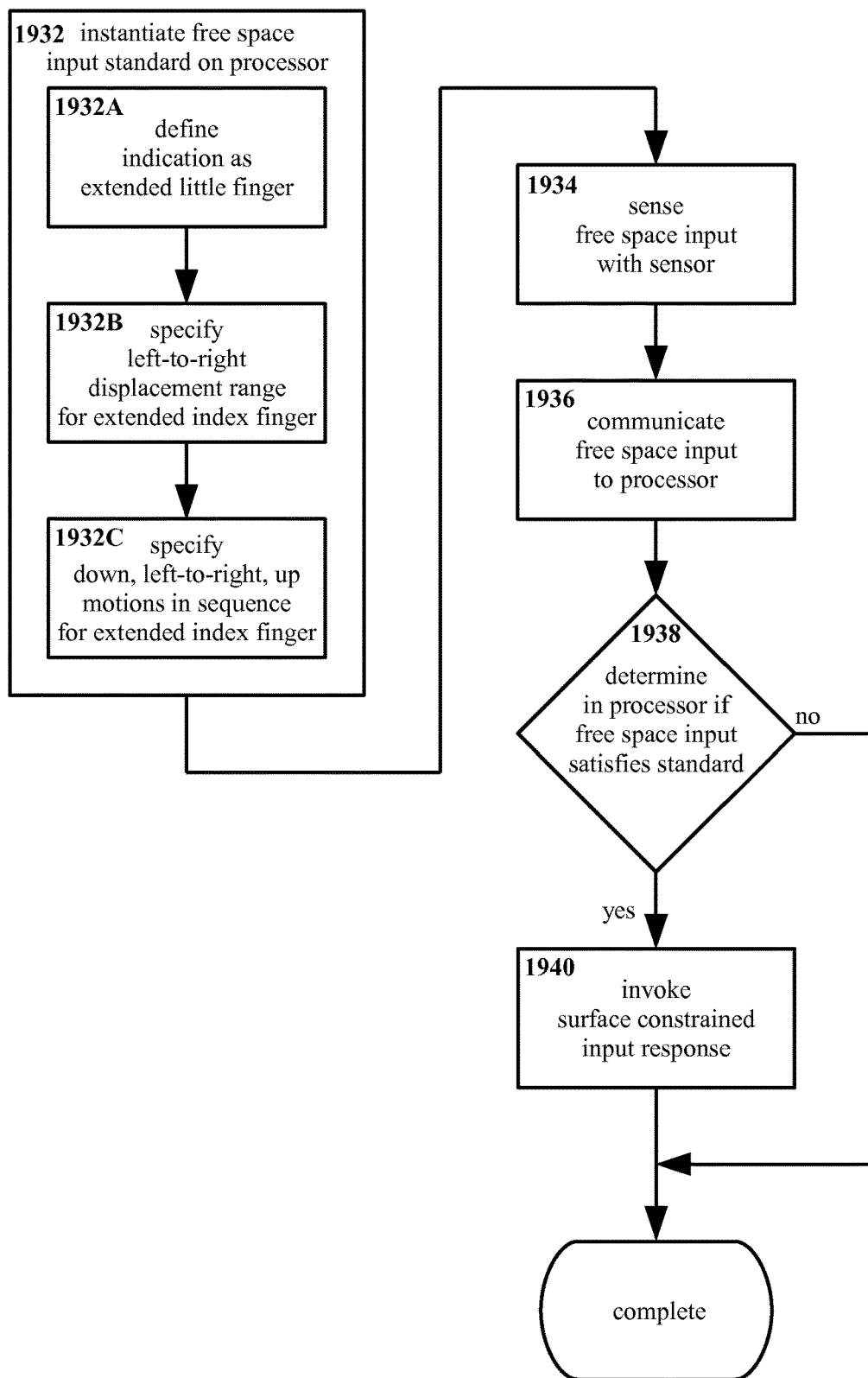
FIG. 19 shows another example method for applying free space input for surface constrained control, with an active explicit approach, in flow chart form.

Now with regard to FIG. 19, therein is shown another example method for applying free space input for surface constrained control, addressing an active explicit approach (as previously illustrated and described herein).

In FIG. 19, a free space input standard is instantiated 1932 in a processor.

Instantiating 1932 the free space standard onto the processor may be considered as several sub steps. An indication is defined 1932A. The indication serves to distinguish a free space input from other free space inputs and/or from non-input such as incidental gestures. For the example arrangement in FIG. 19, the indication is defined 1932A as including an extended little finger. The indication itself may not necessarily deliver the input (gesture, etc.), but may be considered as enabling the input. That is, the free space input may be a gesture delivered with an extended index finger, and the index finger may be monitored for that gesture (e.g. sensing position, motion, acceleration, etc. thereof), but that gesture nevertheless may not be accepted as input unless the indication is present (or at least may not be accepted as a particular input, e.g. not being accepted as a swipe but potentially being accepted as a tap). Thus the input and the indication may be distinct from one another (though this is not necessarily required for all embodiments).

Instantiating 1932 the free space standard onto the processor also includes specifying 1932B a left to right displacement range of an extended index finger. For example, the extended index finger may be required to have moved at least some minimum total distance left to right, without having moved more than some maximum total distance left to right, etc. Also, as noted the input (in this case a swipe gesture) in the example of FIG. 19 may be delivered by an index finger, even if enabled by an indication in the form of an extended little finger.

Instantiating 1932 the free space standard onto the processor also includes specifying 1932B a left to right displacement range of an extended index finger. For example, the extended index finger may be required to move at least some minimum distance left to right, without moving more than some maximum distance left to right, etc. Also, as noted the input (in this case a swipe gesture) in the example of FIG. 19 may be delivered by an index finger, even if enabled by an indication in the form of an extended little finger.

Instantiating 1932 the free space standard onto the processor further includes specifying 1932C downward, left to right, and upward motions in sequence. As described previously herein with regard to other examples, these motions may be specified in terms of displacement, speed, direction, some envelope or range of position over time, etc., and other arrangements also may be equally suitable.

A free space input is sensed 1934 with a sensor. The free space input is communicated 1936 to the processor. A determination 1938 is made in the processor as to whether the free space input satisfies the standard therefor. If the determination 1938 is positive then the method continues with step 1940, while if the determination 1938 is negative step 1940 is skipped. Continuing in step 1940, a surface constrained input response is invoked.

With regard to FIG. 14, FIG. 15A and FIG. 15B, FIG. 18, and FIG. 19 collectively, although four approaches are shown therein embodiments are not limited only to such approaches. For example, although a discrete/continuous distinction is presented in detail only implicit approaches such as those shown in FIG. 14, FIG. 15A, and FIG. 15B, the notion of discrete and/or continuous approaches also may be applied for example to explicit approaches such as those shown in FIG. 18 and FIG. 19. Any combination of passive/active, explicit implicit, and/or continuous/discrete arrangements, as well as others, may be suitable for use with various embodiments.

Thus far, attention has been directed towards discerning free space gestures, for example in defining free space input and/or standards therefor so as to enable conveniently adapting existing gestures for touch screens to use as free space gesture input. As previously noted herein, enabling such adaptation through discerning free space gestures represents one feature of various embodiments.

However, as also noted, embodiments are not limited only thereto. One additional feature (though not necessarily the only such) may include communicating gestural and/or other free space input in such fashion that such free space input is usable for systems configured for touch screen or other surface constrained input. Put differently, if a touch screen response is to be invoked in a system already configured for touch screen input, how may that response be invoked with a free space gesture. This feature is now addressed in more detail.

Figure 20:
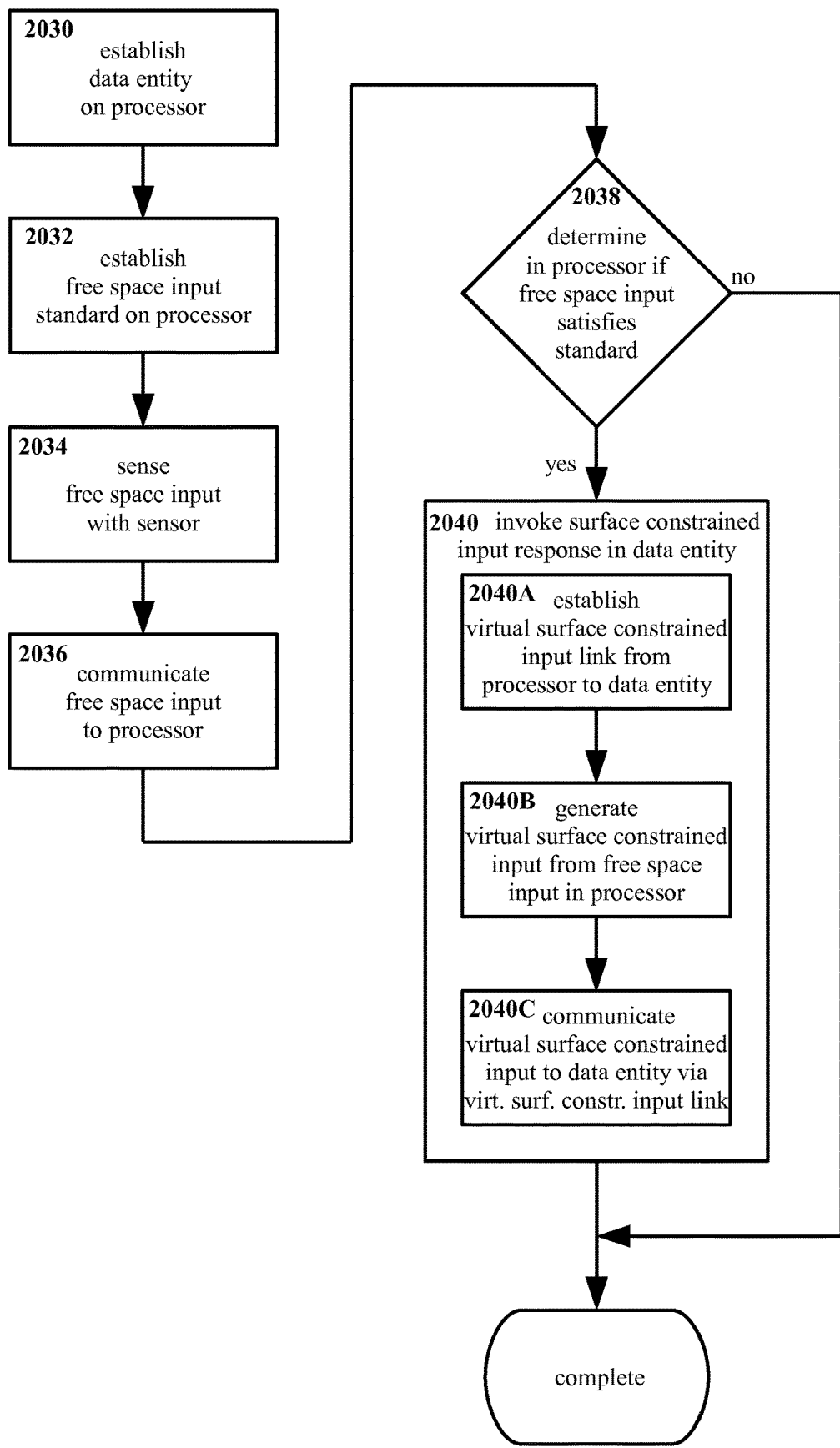
FIG. 20 shows an example method according to for applying free space input for surface constrained control, invoking a response through virtual input, in flow chart form.

With reference now to FIG. 20, therein is shown another example method for applying free space input for surface constrained control, utilizing an approach for invoking responses by delivering virtual or "counterfeit" input.

In the example arrangement of FIG. 20, a data entity is establishing 2030 on a processor. The data entity is adapted for invoking responses to inputs delivered thereto. For example, for a portable electronic device, the data entity may be an operating system. In such a device, the data entity may be adapted to receive input from a surface constrained input system and execute some response in reaction thereto. As a more concrete example, a smart phone or head mounted display may have an operating system such as Android instantiated thereon, with the operating system being adapted to accept touch screen inputs and to execute responses when touch screen inputs are delivered to the device.

However, it is emphasized that neither a touch screen nor another surface constrained input system is required to be present. A capacity for recognizing input as from a touch screen may be present in the data entity, but an actual touch screen may or may not be present. Indeed, one useful feature of various embodiments (though not necessarily the only such) may be to enable utilization of that capacity for recognizing surface constrained input, while delivering free space input.

Embodiments are not limited with regard to the nature of the data entity. Typically though not necessarily, the data entity may be an assemblage of data and/or executable instructions instantiated on the processor, such as a computer program. Although at certain points herein an operating system is presented as an example data entity, other arrangements may be equally suitable.

In addition, the step of establishing 2030 the data entity may be optional for at least certain embodiments, and may or may not be considered a part of a method. Although establishing 2030 the data entity is shown in FIG. 20 for completeness, typically a suitable data entity may already be instantiated on a processor, such as the aforementioned example of an operating system a portable electronic device. More colloquially, the operating system (or other data entity) may be "pre-existing", and may not need to be established.

As noted previously herein, an advantage of various embodiments may be enabling the use of existing infrastructure (devices, operating systems, software, etc.) already adapted to accept touch screen and/or other surface constrained inputs with free space inputs such as gestures. By enabling such use of existing infrastructure, new devices, systems, etc. may be made to be backward compatible, the need to create new devices, operating systems, software, etc. may be diminished, and so forth. As a more particular example, a head mounted display may be controlled with free space gestures, while utilizing smart phone processors, Android or another mobile device operating system, running programs written to utilize smart phone processors and/or Android or another mobile device operating system, utilizing libraries similarly written, and so forth. In some sense, various embodiments may be implemented "on top of" hardware, software, etc. that may not in itself be adapted for free space gesture input.

Still with reference to FIG. 20, a free space input standard is established 2032 on the processor. A free space input is sensed 2034 with a sensor.

The free space input is communicated 2036 to the processor. It is noted that although the data entity was established 2030 on the processor, the free space input is not necessarily communicated to the data entity (and typically is not, though other arrangements may be suitable). As may be understood, different data entities, executable instructions, programs, etc. may be disposed on a single processor without necessarily being in communication with one another.

A determination 2038 is made in the processor as to whether the free space input satisfies the standard therefor. If the determination 2038 is positive then the method continues with step 2040, while if the determination 2038 is negative step 2040 is skipped.

Continuing in step 2040, a surface constrained input response is invoked. That is, a response that may normally follow from a surface constrained input is made to follow from the satisfaction of the free space input standard. As a more concrete example, an action that is a response to a touch screen input is made to happen in response to a free space input.

Embodiments are not limited with regard to how the surface constrained input may be invoked 2040. Previous examples herein have not addressed the matter in detail, and a variety of approaches may be equally suitable. However, it may be illuminating to present several examples of approaches for invoking surface constrained input responses; this is presented in more detail with regard to FIG. 21, FIG. 22, and FIG. 23.

For example, as shown in the example of FIG. 20 the surface constrained input response may be invoked 2040 within and/or by addressing the data entity. As noted previously, the data entity may for example be an operating system. An operating system in a portable electronic device having a touch screen may include therein various responses corresponding with different touch screen inputs, for example, along with executable instructions, data, and/or other "machinery" adapted to recognize the touch screen inputs and carry out the appropriate responses thereto.

In such an arrangement, as shown in FIG. 20 the step of invoking 2040 a surface constrained input response in the data entity may include establishing 2040A a virtual surface constrained input link from the processor to the data entity. That is, some arrangement is made such that the data entity may be communicated with, in such fashion that the data entity recognizes the communication as being surface constrained input, even if the communication is virtual surface constrained input. More colloquially, a virtual or "counterfeit" connection corresponding to an input system, and/or a virtual input system itself, is placed in communication with the data entity.

It is noted that strictly speaking, because the data entity is already on the processor (as established in step 2030), the link from processor to data entity 2040A may be considered to be a link from the processor to the processor; the link does not necessarily represent a physical connection. Rather, the link may take the form of communication protocols, data formatting, activation of a port or a communication path already present with the data entity, etc. Various embodiments do not necessarily require the creation of a new physical connection (though such also is not prohibited); rather, the link may be established 2040A along existing physical communication paths within the processor, utilizing existing executable instructions within the data entity (or some other data entity), etc.

Still with reference to FIG. 20, a virtual surface constrained input is generated 2040B in the processor, based on the free space input. That is, in the example of FIG. 20 a virtual input is generated that mimics real surface constrained input. As a more concrete example, a virtual right swipe gesture that at least somewhat resembles input that may be generated and/or delivered from an actual touch screen is generated in the processor.

The virtual surface constrained input is generated 2040B from the free space input, at least in that the virtual surface constrained input that is generated corresponds with the response that is to be invoked by the free space input as defined by the free space input standard. That is, if the free space input standard defines a right swipe (in whatever particulars), then the virtual surface constrained input will be generated so as to be accepted by the data entity as a right swipe, with the data entity then carrying out a response corresponding to a right swipe input via a surface constrained input system.

Typically though not necessarily, the virtual surface constrained input may have a form and/or a content at least somewhat similar to practical surface constrained input. For example, a practical touch screen may generate touch screen data having a series of x and y coordinates over time, representing the point(s) at which one or more fingers makes contact with the touch screen. A practical touch screen may also generate other data, such as pressure applied, etc. Some arrangement of x and y coordinates and pressure over time as generated from the practical touch screen thus may represent a right swipe, or other gesture input. Similarly, virtual touch screen input may be generated to include x and y coordinates and pressure over time as may resemble practical touch screen data for a touchdown and swipe (although for the virtual touch screen input no touchdown and swipe may have actually occurred).

In other words, the virtual x and y coordinates and pressure values over time may at least substantially correspond with x and y coordinates and pressure values over time as may be generated by a practical touch screen during a touchdown and swipe thereon. Exact correspondence may not be required, nor will the degree of correspondence necessarily even be high; so long as the virtual touch screen input is accepted, correspondence may be sufficient. If low correspondence is sufficient for virtual touch screen input to be accepted (i.e. the virtual data is crude in form, lacking in some content, otherwise does not much "look like the real thing", etc.), low correspondence still may be sufficient.

However, in certain embodiments, the virtual surface constrained input may be generated 2040B with some degree of fidelity and/or variability with respect to free space input. For example, a broad or fast free space swipe may generate 2040B a broad or fast virtual surface constrained swipe. For such an arrangement, each instance of virtual surface constrained input may be unique, and/or may correspond to the particulars of the free space input from which that virtual surface constrained input is generated 2040B.

However, in other embodiments the virtual surface constrained input may be generated 2040B as predetermined and/or fixed. That is, any free space swipe gesture that satisfies the standard therefor (as in step 2038) may result in generation of a single, standard virtual surface constrained swipe gesture, regardless of the particulars of the free space swipe gesture. A fast free space swipe would in such case result in generation of the same surface constrained swipe as would a slow free space swipe. In colloquial terms the virtual surface constrained input may be considered to be "canned", or identical for all swipe inputs.

Other options may be equally suitable, including but not limited to a hybrid approach. For example, the virtual surface constrained input may be generated 2040B from the free space input in a variable fashion, but with restrictions placed thereupon. For example, motions may be compressed, truncated, etc. so that even if a swipe gesture were broader than may be physically possible with e.g. a smart phone touch screen, the virtual swipe input may be reduced in dimension so as to avoid an "error" response, etc.

Furthermore, in at least certain embodiments generating virtual surface constrained input 2040B from the free space input may be sufficient as to render certain other steps unnecessary. For example, if the generated virtual surface constrained input is sufficiently realistic and/or "convincing" to the data entity, then the determination 2038 already described may be omitted. That is, if virtual touch screen gestures are generated 2040B with sufficient fidelity, the data entity itself may sufficiently address the matter of whether an input has or has not been delivered; the virtual touch screen inputs may be evaluated by the data entity (e.g. through existing means for evaluating actual touch screen inputs), without necessarily requiring the actual free space inputs to be evaluated.

Likewise, if the determination 2038 may be omitted, then instantiating 2032 a free space swipe standard onto the processor also may be omitted; if no determination is made against the standard, the standard itself may be unnecessary.

Continuing in FIG. 20, the virtual surface constrained input is communicated 2040C to the data entity by way of the virtual surface constrained input link.

Thus, a response to surface constrained input is invoked 2040. At least some part of carrying out the response may be considered, for at least some embodiments, to take place in the data entity. For example, if the data entity is an operating system on a portable electronic device, that operating system may already have (as noted above) the "machinery" in place to carry out a response to a right swipe, a tap, a pinch, etc. It is emphasized that although various embodiments may communicate with a data entity in such fashion, so as to invoke some function of that data entity to be carried out, that data entity (operating system, program, other data entity, etc.) is not necessarily part of various embodiments themselves (although arrangements wherein the data entity is part of an embodiment also are not excluded).

In addition, it is noted that in invoking a response, various embodiments may provide for controlling systems, hardware, etc. In some embodiments, for example, a smart phone with a touch screen, running an operating system and programs thereon with no native capability for sensing and/or responding to free space gestures, may be controlled by the use of free space gestures.

Figure 21:
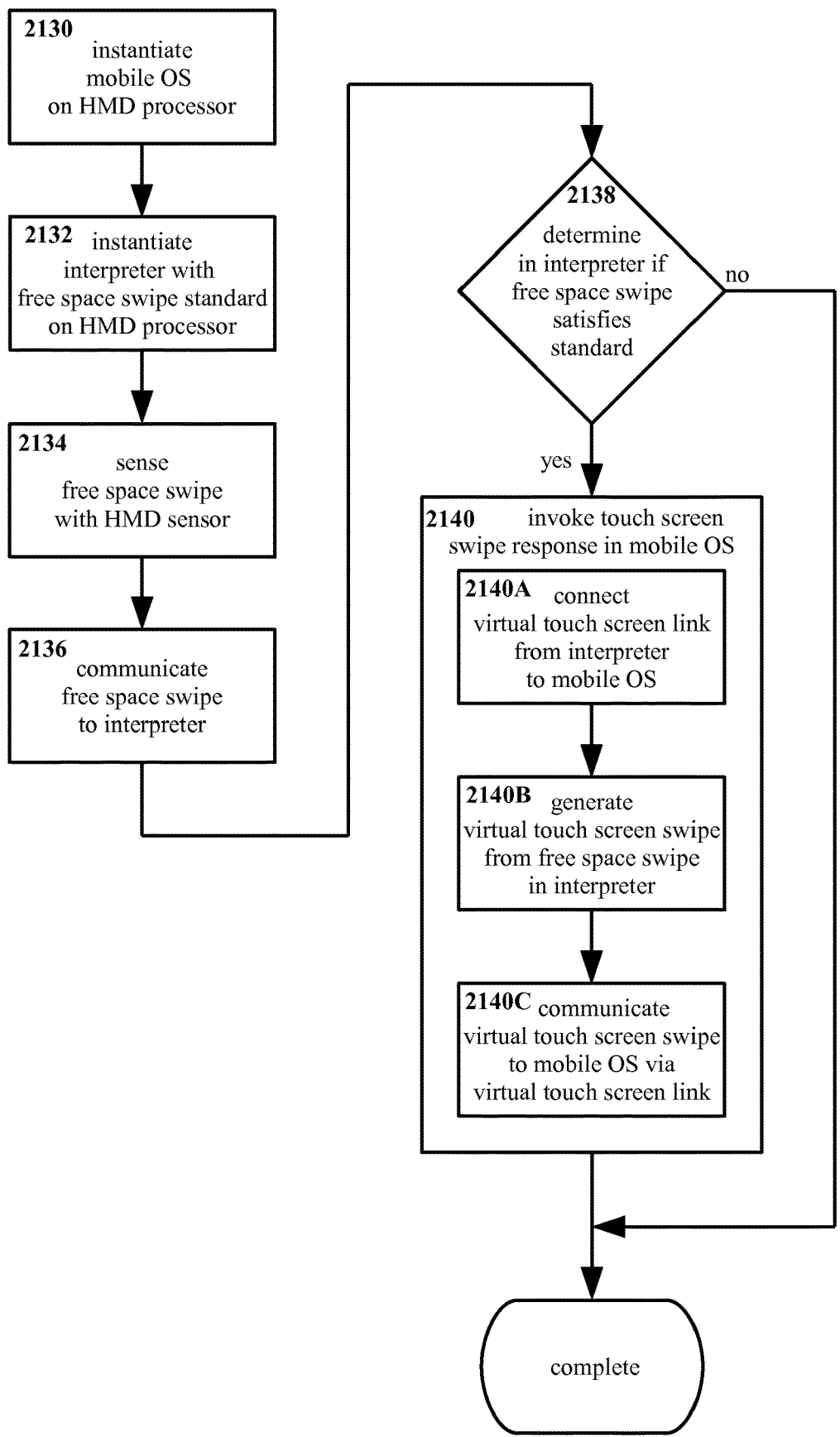
FIG. 21 shows another example method according to for applying free space input for surface constrained control, invoking a response through virtual input to a head mounted display, in flow chart form.

Now with reference to FIG. 21, therein is shown another example method for applying free space input for surface constrained control, again utilizing an approach for invoking responses by delivering virtual or "counterfeit" input. The arrangement in FIG. 21 may be at least somewhat similar to that previously shown and described with regard to FIG. 20. However, for purposes of clarity the arrangement of FIG. 21 shows a more concrete example, with regard to a portable electronic device and more particularly to a head mounted display (HMD) with a mobile operating system (OS) running thereon, e.g. Android, iOS, Windows Phone, etc.

In the example arrangement of FIG. 21, a mobile operating system is instantiated 2130 on the processor of a head mounted display. The mobile operating system is adapted for invoking responses to touch screen inputs delivered thereto. An actual touch screen system may or may not be present in the head mounted display; so long as the mobile operating system accepts and/or recognizes touch screen inputs, a touch screen is permitted but is not required.

As noted with regard to FIG. 20, the step of instantiating 2130 the mobile operating system onto the processor of the head mounted display may be optional for at least certain embodiments, and may or may not be considered a part of a method.

Continuing in FIG. 21, an interpreter is instantiated 2132 on the processor of the head mounted display. The interpreter includes therein a free space swipe standard, that is, a standard for determining whether a free space swipe gesture has been delivered or not.

The interpreter represents one possible, but not required, approach to carrying out certain steps. It may be convenient in certain instances to integrate standards for one or more free space inputs, executable instructions for determining whether an input satisfies such a standard, communicating with the operating system, etc. into a substantially unified assembly. More colloquially, some or all functions of various embodiments may be incorporated into a program as may be conveniently loaded onto a processor in a head mounted display or other portable electronic device so as to enable control of that device through free space gestures. Such a program may be considered as interpreting a new "input language" (free space gestures) and producing effects of an input language that already exists in full or in part (a mobile operating system with touch screen input capability). Correspondingly, such a program is referred to herein as an interpreter.

For purposes of example, the method shown in FIG. 21 includes such an interpreter. (Certain subsequent figures likewise may reference the concept of an interpreter, as well.) However, both the use of an interpreter and the arrangements shown for an interpreter are examples only, and other arrangements may be equally suitable.

Still with regard to FIG. 21, a free space swipe is sensed 2134 with a sensor on the head mounted display. Typically though not necessarily, the sensor may be a camera, depth camera, or similar, though other arrangements may be equally suitable.

The free space swipe input is communicated 2136 from the sensor to the interpreter. A determination 2138 is made in the interpreter as to whether the free space swipe satisfies the standard therefor. If the determination 2138 is positive then the method continues with step 2140, while if the determination 2138 is negative step 2140 is skipped.

Continuing in step 2140, a touch screen swipe response is invoked in the mobile operating system. In the arrangement shown in FIG. 21, a virtual touch screen link is connected 2140A from the interpreter to the mobile operating system. Typically though not necessarily, the mobile operating system may include therein some protocol for identifying and communicating with a physical touch screen. In connecting a virtual touch screen link from the interpreter to the mobile operating system, this protocol of the mobile operating system may be addressed such that the mobile operating system recognizes the interpreter (or some portion thereof) as being a physical touch screen, and recognizes at least some information sent from the interpreter as being touch screen input from a physical touch screen. In more colloquial terms, the interpreter informs the mobile operating system that "I am a touch screen", and arranges to send touch screen data to mobile operating system. This despite the interpreter typically not in fact being an actual touch screen, but rather presenting a virtual version thereof (and corresponding virtual data).

In other words, it may be considered that in some sense the interpreter "spoofs" the mobile operating system, by connecting a counterfeit (i.e. virtual) touch screen to the mobile operating system for sending counterfeit (i.e. virtual) touch screen inputs thereto.

Still with reference to FIG. 21, a virtual surface touch screen swipe is generated 2140B in the interpreter, based on the free space swipe. That is, a virtual input is generated 2140B that mimics a real swipe as from a real touch screen. As noted previously with regard to FIG. 20, the virtual touch screen swipe may be generated 2140B so as to be unique for each free space swipe, standardized for all free space swipes, some hybrid thereof, etc.

The virtual touch screen swipe is communicated 2140C to the mobile operating system by way of the virtual touch screen link. Although FIG. 2 shows the method as being complete after 2140C—at which point the touch screen swipe response has been invoked 2140 within the mobile OS—actions carried out by the mobile operating system, the head mounted display, etc. in executing the relevant response may continue, potentially for an indefinite period. For example, even though as shown in FIG. 21 the method therein is complete once the touch screen swipe response is invoked 2140, the effect of that invocation—for example, controlling the head mounted display in some fashion, such as by moving displayed content from left to right, calling up a menu, or some other function (which may include, though is not required to include, physical responses to the head mounted display and/or some other hardware and/or system in communication therewith), etc.—may take place and/or endure after the steps as shown in FIG. 21 are nominally complete.

In particular with regard to step 2140B, it is noted that in certain operating systems, programs, and/or other data entities, an approach referred to as "syntactical sugar" may be utilized thereby. Syntactical sugar represents an arrangement wherein certain inputs and/or other data may be defined in a standardized manner, and/or wherein such features as recognition of inputs, communication of such inputs, responses to such inputs, and so forth likewise may be standardized. As a more concrete example, in a mobile operating system adapted to receive touch screen input, the requirements for an input to be accepted as a right swipe, processing of inputs that are or are suspected to be a right swipe, and a command or other response to be executed when a right swipe input is received, may be integrated as an assembly of data and/or executable instructions. More colloquially, a "building block" of code (also referred to as the aforementioned syntactical sugar) may exist for a right swipe, such that when creating a program that is to respond to a right swipe that building block of code may be simply added as a whole. The use of syntactical sugar may be considered to be a work saving approach: the need to define a swipe, write code to detect and identify a swipe, and so forth for each individual program thus may be eliminated, standards for coding programs potentially may be simplified, etc.

However, the use of syntactical sugar in such fashion may, for at least some embodiments, facilitate implementation.

For example, consider a mobile operating system for electronic devices, such as Android, iOS, Windows Phone, etc. Such an operating system may function in part to mediate and support the use of various programs, libraries, etc. that also run on a processor within a portable electronic device. The range of potential programs and other software that an operating system may address is potentially quite large, and likewise a given operating system may be used on a wide variety of different electronic devices. For simplicity, it may be useful to standardize at least certain functions, such as touch screen gestural inputs (among many potential others), so that such gestural inputs are consistent across various programs and/or devices. More colloquially, it may be useful to for "a right swipe to be a right swipe" for at least some if not all programs, devices, etc.

Syntactical sugar may be useful for pursuing such standardization. If, for example, a touch screen right swipe block is included in and/or made available for an operating system, implementing the use of a right swipe as a touch screen input may simply utilize that block rather than coding input standards, decision making, command calls, etc. from scratch.

Where syntactical sugar and/or some other standardization approach is present, use may be made thereof for at least certain embodiments. To continue the example above, if a consistent implementation of a touch screen right swipe is used with some or all electronic devices running an operating system, and/or some or programs running on those electronic devices, then it may be useful to configure executable instructions (and/or some other approach) for generating 2140B a virtual touch screen swipe based on that consistent implementation. If a wide range of devices and/or software handle touch screen inputs in the same fashion, even potentially to the extent of using the same or similar code (i.e. syntactical sugar), then the process for invoking touch screen inputs may be simplified.

Thus, syntactical sugar may represent an opportunity for facilitating implementation in a practical and/or efficient manner. A set of executable instructions adapted to generate 2140B virtual touch screen swipes may be written to correspond with the syntactical sugar for touch screen right swipes, and so it may be anticipated that the virtual touch screen swipes produced thereby may be reliably accepted as actual touch screen swipes by a range of operating systems, programs, electronic devices, etc., so that any corresponding responses thereto also may be reliably carried out.

It is noted that syntactical sugar is not necessarily part of various embodiments, and neither syntactical sugar nor any other approach for standardizing inputs and/or other functions in operating systems and/or for electronic devices necessarily is done by, motivated by, or required for, the use of various embodiments. Rather, such standardization may already exist in at least certain operating systems, programs, electronic devices, etc., and various embodiments may take advantage of such for carrying out certain functions.

However, even if syntactical sugar is not used in operating systems, electronic devices, software, etc., embodiments nevertheless may still be utilized with such operating systems, electronic devices, software, etc. Absent syntactical sugar and/or other standardization, a more sophisticated set of executable instructions (or other approach) may be utilized for generating 2140B virtual touch screen swipes that may be accepted as being actual touch screen swipes, for example, so as to provide virtual touch screen swipes sufficiently realistic to meet the standards of a range of programs, electronic devices, etc.

The consideration of syntactical sugar in certain embodiments may be in some sense analogous to consideration of standardized protocols for communication between actual touch screens and processors in touch screen devices. Such standard communication protocols may exist, for example to facilitate compatibility between various touch screens and various devices. Such touch screen communication standards may not have been created for or included with various embodiments, may not be part of various embodiments, and are not required to be present for all embodiments, nevertheless various embodiments may make use of such communication standards (for example) in connecting 2140A the virtual touch screen link and/or communicating 2140C virtual touch screen swipes.

Likewise, syntactical sugar may not have been created for or included with various embodiments, may not be part of various embodiments, and is not required to be present for all embodiments, nevertheless various embodiments may make use of syntactical sugar in generating 2140B virtual touch screen swipes (and likewise other virtual input). The potential use of syntactical sugar is noted herein as a particular example for how certain functions may be implemented in practice, but embodiments are not limited thereto.

With regard to FIG. 21, and to step 2140 therein, the example arrangement shown therein invokes 2140 a touch screen swipe response by, in effect, submitted counterfeit touch screen inputs to a mobile operating system. Such an arrangement may be useful for at least certain embodiments, for instance because a mobile operating system adapted to be utilized with touch screen devices may already accept touch screen input. That is, protocols for configuring touch screen input may exist in the mobile operating system, pathways for communicating touch screen input likewise may exist, etc., and the mobile operating system may "expect" such touch screen input (so that anti-virus software, error trapping routines, and so forth may be unlikely to consider virtual touch screen input as spurious data, an attack, etc.). Colloquially, a touch screen device already may be set up to receive touch screen input, so that sending counterfeit (virtual) touch screen input may be facilitated.

However, embodiments are not limited only to invoking responses through the use of virtual touch screen input, and other arrangements may be equally suitable.

Figure 22:
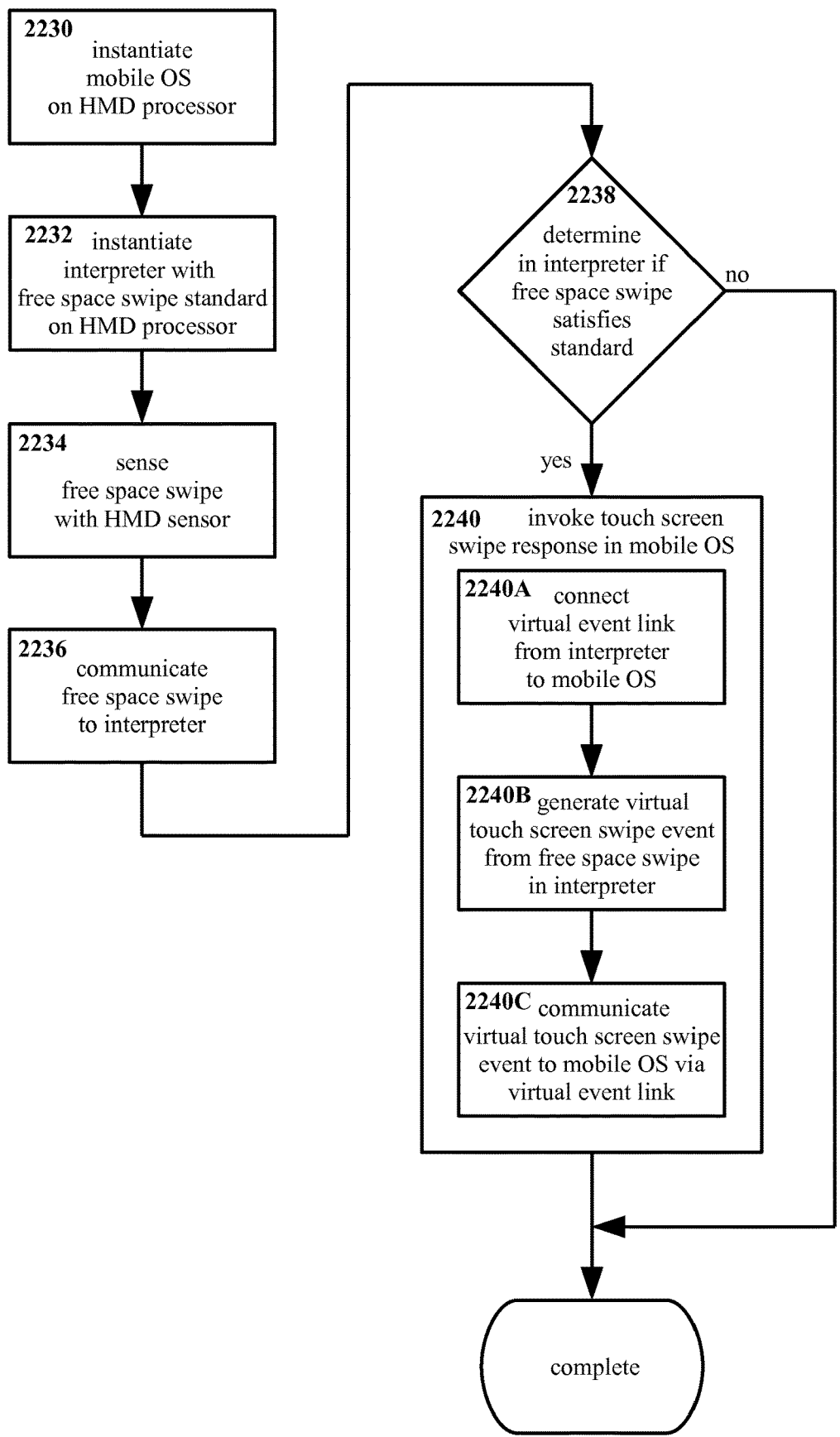
FIG. 22 shows an example method according to for applying free space input for surface constrained control, invoking a response through virtual events to a head mounted display, in flow chart form.

For example, now with reference to FIG. 22, therein is shown another example method for applying free space input for surface constrained control. However, where the arrangement of FIG. 21 invokes responses through the use of virtual touch screen input, the example of FIG. 22 invokes responses through the use of virtual touch screen events.

In the example arrangement of FIG. 22, a mobile operating system is instantiated 2230 on the processor of a head mounted display. The mobile operating system is adapted for invoking responses to touch screen inputs delivered thereto.

An interpreter is instantiated 2232 on the processor of the head mounted display. The interpreter includes therein a free space swipe standard, that is, a standard for determining whether a free space swipe gesture has been delivered or not.

A free space swipe is sensed 2234 with a sensor on the head mounted display. The free space swipe input is communicated 2236 from the sensor to the interpreter. A determination 2238 is made in the interpreter as to whether the free space swipe satisfies the standard therefor. If the determination 2238 is positive then the method continues with step 2240, while if the determination 2238 is negative step 2240 is skipped.

Continuing in step 2240, a touch screen swipe response is invoked in the mobile operating system.

With regard to the term "event" as used with respect to 2240, typically though not necessarily, the mobile operating system may include therein some internal arrangement for tracking events, such as events associated with touch screen input. If touch screen input is received in the mobile operating system and is determined to represent (for example) a swipe, the touch screen input itself (e.g. detailed information regarding where and when touchdown occurred, the path of contact during the swipe, the speed of motion, etc.) may not be forwarded within the operating system. Rather, an event may take place within the operating system, and that event then forwarded. For example, if a touch screen swipe input is received in an operating system from a touch screen, a flag may be set, some form of logical state may be set such as "swipe=TRUE", etc., as an indication that a swipe input has been received.

In the arrangement shown in FIG. 22, a virtual event link is connected 2240A from the interpreter to the mobile operating system. This may for example represent identifying a portion of the operating system where the event is recorded (if any), executable instructions within the operating system that control whether the event is determined to have occurred, etc.

Still with reference to FIG. 22, a virtual touch screen swipe event is generated 2240B in the interpreter, corresponding to an event as may take place within the operating system if a real virtual touch screen swipe had been delivered to and accepted by the operating system. That is, a virtual event is generated 2240B in the interpreter that mimics a real event that would take place within the mobile operating system.

The virtual touch screen swipe event is communicated 2240C to the mobile operating system by way of the virtual event link. At this point, as far as the mobile operating system is concerned a touch screen swipe has taken place, and a corresponding response may be carried out by the mobile operating system.

In some sense, the approach shown in FIG. 22 may be considered as being an "end run" around the touch screen system. Touch screen input data, whether real or virtual, may or may not be delivered to the operating system; receipt and/or consideration of touch screen data, real or virtual, is irrelevant. Rather, the part of the operating system that "knows" or "decides" whether a touch screen swipe has taken place is made to accept that a touch screen swipe has indeed taken place. If touch screen input were considered to be a recording of some person scoring in a game, the event may be analogous to the point(s) received. Where the arrangement in FIG. 21 produces a counterfeit analogous to the recorded play, the arrangement in FIG. 22 alters the score directly.

An arrangement such as that shown in FIG. 22 may be useful for at least certain embodiments. For example, touch screen input may be relatively complex, and may be evaluated according to multiple and potentially sophisticated criteria. Thus, producing virtual touch screen input sufficient to "fool" a mobile operating system may be challenging; if systems are not standardized, e.g. with syntactical sugar as noted previously herein, the particular criteria that the virtual touch screen input must meet may vary from one device, operating system, and/or program to another, again potentially requiring for more sophisticated counterfeiting to produce suitable virtual touch screen input.

By contrast, typically an input even may be relatively simple, potentially even a single bit of data, e.g. "it happened" or "it didn't". Generating 2240B virtual events may be relatively simple for at least certain embodiments. On the other hand, connecting 2240A a virtual event link and/or communicating 2240C a virtual touch screen swipe event may present challenges as well. For example, while a mobile operating system designed to interface with a touch screen may be configured to readily accept touch screen inputs, providing a well-defined path for such inputs to be delivered and so forth, such a mobile operating system may not necessarily be configured to readily accept events from external sources if those events typically are to be generated within the mobile operating system itself.

It should be understood that the approaches suitable for implementing various embodiments may vary depending on the particulars of a given embodiment. In certain instances an arrangement similar to that in FIG. 21 may be suitable, in others an arrangement similar to that in FIG. 22, in yet others still a different arrangement.

Figure 23:
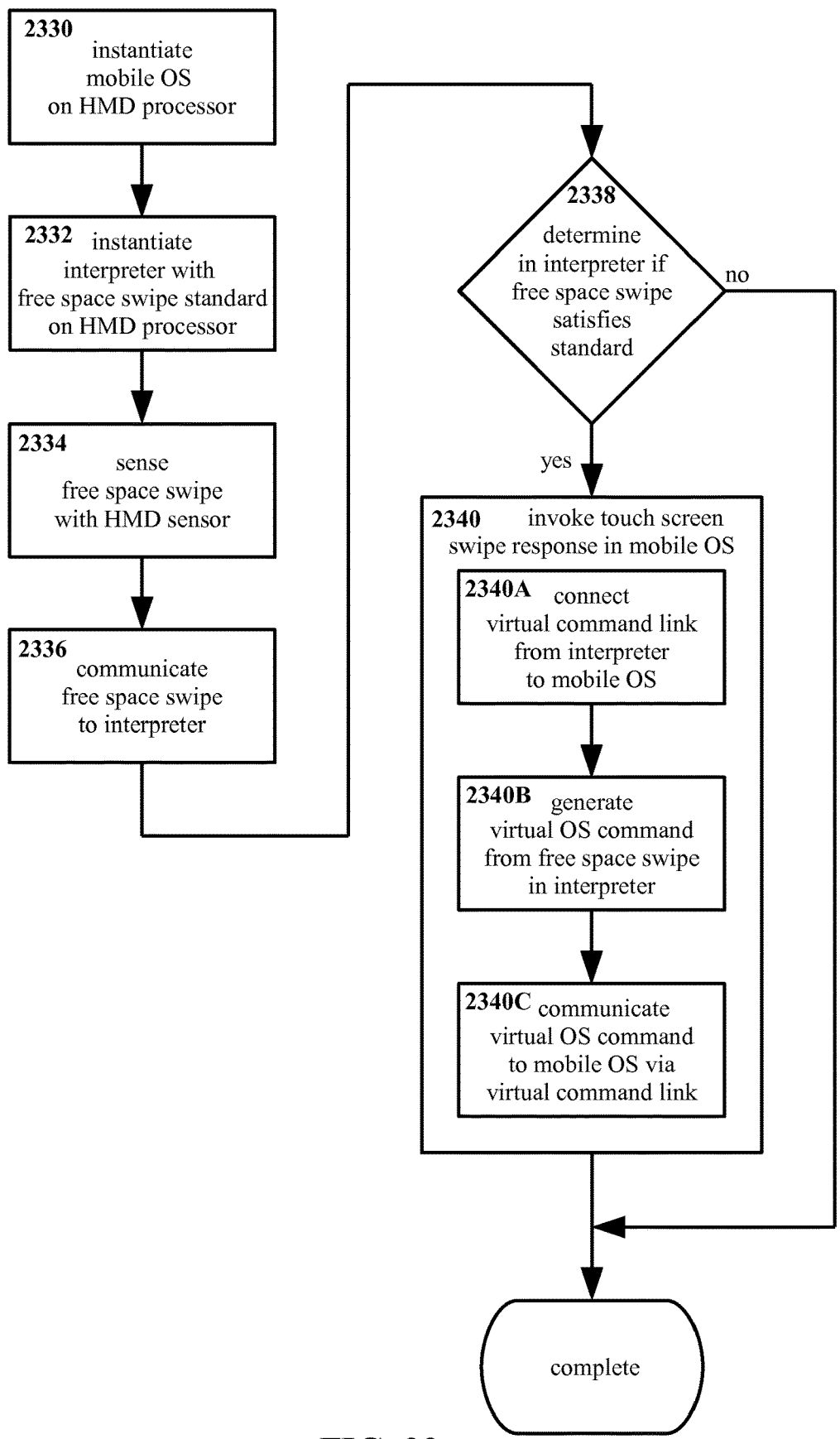
FIG. 23 shows an example method according to for applying free space input for surface constrained control, invoking a response through virtual commands to a head mounted display, in flow chart form.

Now with reference to FIG. 23, therein is shown another example method for applying free space input for surface constrained control. The example of FIG. 23 invokes responses through delivering commands to the mobile operating system.

In the example arrangement of FIG. 23, a mobile operating system is instantiated 2330 on the processor of a head mounted display. The mobile operating system is adapted for invoking responses to touch screen inputs delivered thereto. An interpreter is instantiated 2332 on the processor of the head mounted display. The interpreter includes therein a free space swipe standard. A free space swipe is sensed 2334 with a sensor on the head mounted display. The free space swipe input is communicated 2336 from the sensor to the interpreter. A determination 2338 is made in the interpreter as to whether the free space swipe satisfies the standard therefor. If the determination 2338 is positive then the method continues with step 2340, while if the determination 2338 is negative step 2340 is skipped.

Continuing in step 2340, a touch screen swipe response is invoked in the mobile operating system.

In the arrangement shown in FIG. 23, a virtual command link is connected 2340A from the interpreter to the mobile operating system. This may for example represent identifying a portion of the operating system that generates commands in response to a touch screen input, a portion of the operating system that communicates commands to destinations, etc. Where the arrangement of FIG. 21 delivered virtual touch screen input, and the arrangement of FIG. 22 inserted virtual events, the arrangement of FIG. 23 gives virtual commands to the operating system.

A virtual operating system command is generated 2340B in the interpreter, corresponding to a command as may be generated if a real virtual touch screen swipe had been delivered to and accepted by the operating system. That is, a virtual command is generated 2340B in the interpreter that mimics a real command to the mobile operating system. Typically though not necessarily, the virtual command may be a command for the operating system to carry out the response that is to be invoked, and/or for the operating system to instruct some other entity (such as an application, video driver, etc.) to carry out the response that is to be invoked.

The virtual operating system command is communicated 2340C to the mobile operating system by way of the virtual event link. At this point, with the virtual command given, the corresponding response may be carried out by the mobile operating system.

As the approach shown in FIG. 22 may be considered as being an "end run" around the touch screen system, the approach shown in FIG. 23 may be considered to be an "end run" around most or all of the input and evaluation capabilities of the operating system with regard to touch screen input. Touch screen input data, events relating thereto, etc., whether real or virtual may or may not be delivered. Rather, in the arrangement of FIG. 23 a suitable command may be delivered directly to the operating system, without following the normal process used by the operating system in generating such a command. If touch screen input were considered analogous to a recording of scoring in a game, and an event analogous to the point(s) received, the command may be analogous as declaring victory (or defeat). The arrangement in FIG. 23 directly instructs the operating system to perform some function, through use of a counterfeit command delivered to the operating system.

An arrangement such as that shown in FIG. 23 may be useful for at least certain embodiments. For example, delivering a command may be considered a very direct approach, in that no virtual data may be generated, no virtual events recorded, etc. In effect, the functioning of the operating system itself may be to at least a degree ignored, by simply giving an order rather than by causing the operating to determine that such an order should be given. However, as noted with regard to FIG. 22, a mobile operating system may not necessarily be configured to readily accept internal commands from external sources. Indeed, such function may be considered to be a subversion of the operating system, and may be prevented through measures put in place to defend the operating system (such as anti-virus software).

Although FIG. 21 through FIG. 23 present three examples of approaches as may be used to implement various embodiments, embodiments are not limited only thereto, and other approaches may be equally suitable. For example, for certain embodiments commands might be generated in the interpreter and communicated to applications, drivers, etc. within a head mounted display or other device, cutting out the mobile operating system entirely. In addition, hybrid arrangements, wherein multiple approaches are combined, also may be suitable; the example approaches shown are not necessarily exclusive.

Furthermore, although the examples shown in FIG. 21 through FIG. 23 refer for clarity specifically to a single case, namely a head mounted display with an interpreter and a mobile operating system instantiated onto a processor thereof, embodiments are not limited only to such arrangements. Other devices, systems, approaches, etc. may be equally suitable.

Figure 24A:
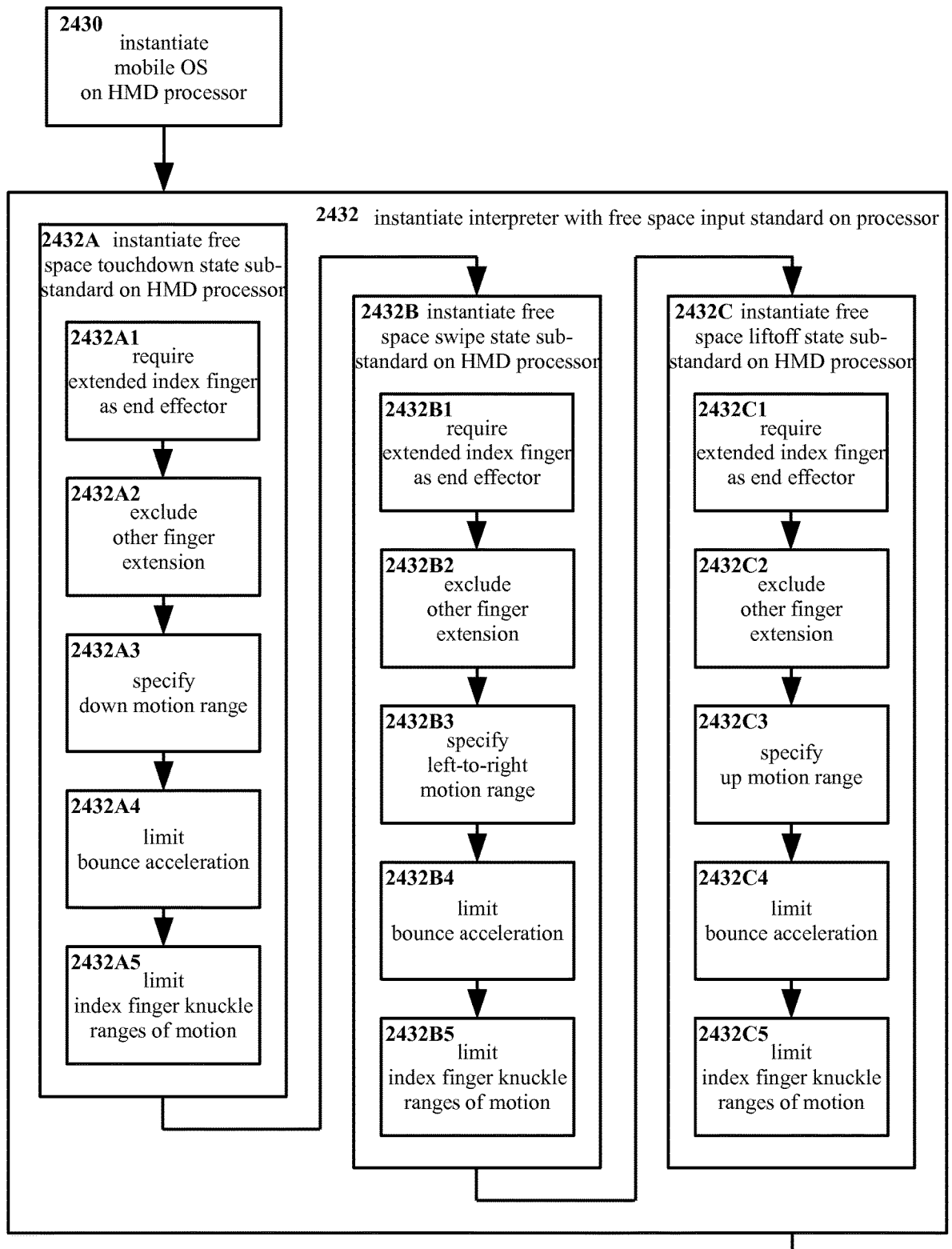
FIG. 24A and FIG. 24B show an example method according to for applying free space input for surface constrained control, with a discrete implicit approach and invoking a response through virtual commands to a head mounted display, in flow chart form.
Figure 24B:
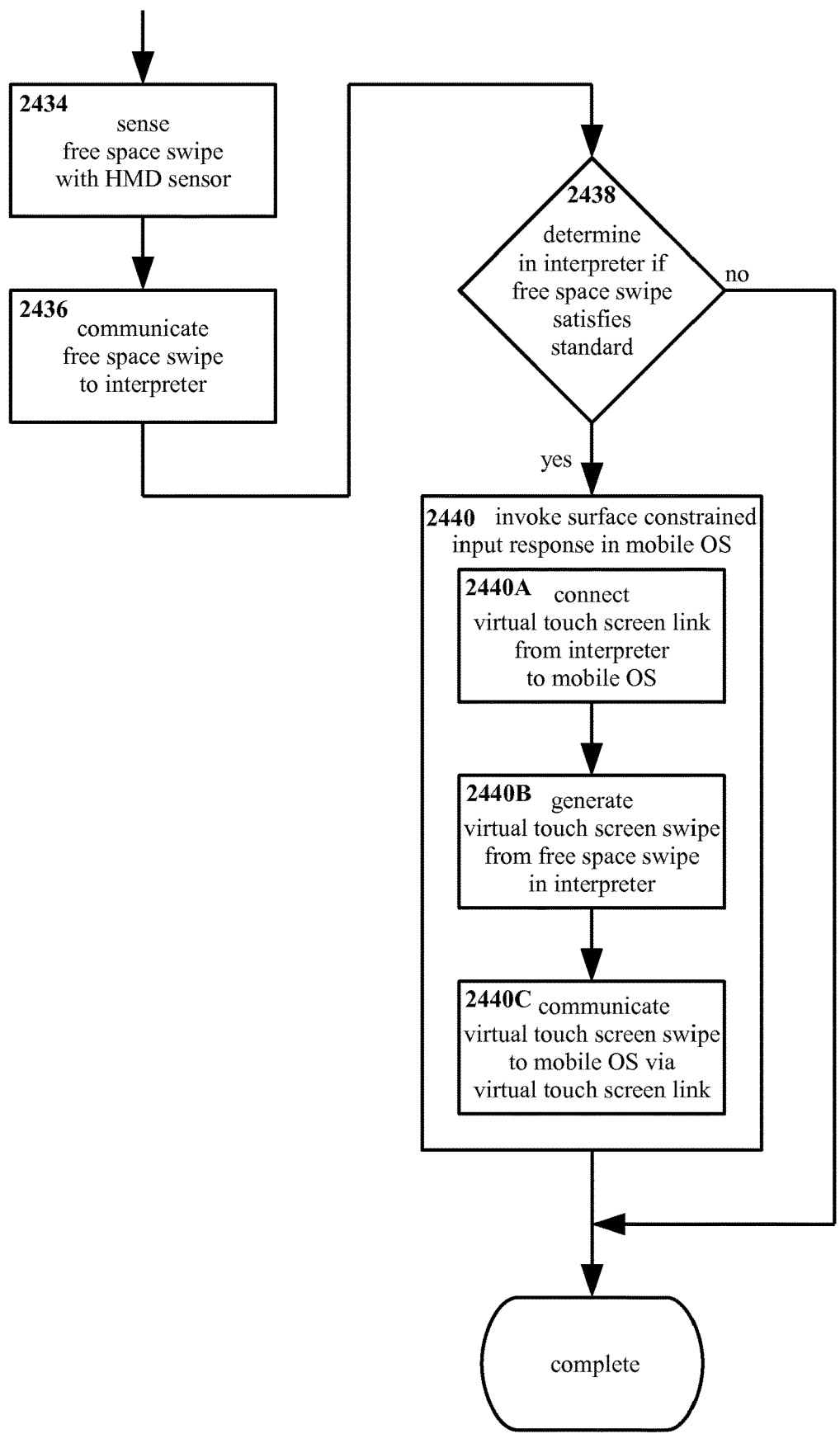

As previously noted, examples are provided herein with regard to at least two notable features: adapting free space inputs as analogs for surface constrained inputs, and invoking responses to free space inputs in systems configured to accept surface constrained inputs. Although for simplicity these two features have been explained separately, combination of such features also may be suitable within various embodiments. An example is shown in FIG. 24A and FIG. 24B. However, it is emphasized that although two such features are shown in detail herein, embodiments are not limited only to the features shown.

With reference to FIG. 24A, a mobile operating system is instantiated 2430 on the processor of a head mounted display. The mobile operating system is adapted for invoking responses to touch screen inputs delivered thereto. An interpreter is instantiated 2432 on the processor of the head mounted display. The interpreter includes therein a free space swipe standard.

With regard to instantiating 2432 the interpreter, and particularly to instantiating the free space input standard thereof, in the example of FIG. 24A a discrete implicit approach (at least somewhat similar to that shown and described with regard to FIG. 15A) is presented. Three sub-standards, for touchdown, swipe, and liftoff states, are instantiated on the processor in steps 2432A, 2432B, and 2432C respectively.

With regard to sub step 2432A, instantiating a free space touchdown state sub-standard onto the processor includes therein requiring 2432A1 that an extended index finger serve as an end effector for delivering the free space input, and excludes 2432A2 the extension of other fingers. The free space touchdown state sub-standard also specifies 2432A3 a downward motion within a range, limits 2432A4 bounce acceleration, and also limits 2432A5 the range of motion of the finger knuckles.

Continuing in FIG. 24A (and still with regard to step 2432 thereof), with regard to sub step 2432B, instantiating a free space touchdown state sub-standard onto the processor includes therein requiring 2432B1 that an extended index finger serve as an end effector for delivering the free space input, and excludes 242B2 the extension of other fingers. The free space touchdown state sub-standard also specifies 2432B3 a left to right motion within a range, limits 2432B4 bounce acceleration, and also limits 2432B5 the range of motion of the finger knuckles.

With regard to sub step 2432C instantiating a free space touchdown state sub-standard onto the processor includes therein requiring 2432C1 that an extended index finger serve as an end effector for delivering the free space input, and excludes 2432C2 the extension of other fingers. The free space touchdown state sub-standard also specifies 2432C3 an upward motion within a range, limits 2432C4 bounce acceleration, and also limits 2432C5 the range of motion of the finger knuckles.

Now with reference to FIG. 24B, a free space swipe is sensed 2434 with a sensor on the head mounted display. The free space swipe input is communicated 2436 from the sensor to the interpreter. A determination 2438 is made in the interpreter as to whether the free space swipe satisfies the standard therefor. If the determination 2438 is positive then the method continues with step 2440, while if the determination 2438 is negative step 2440 is skipped.

Continuing in step 2440, a touch screen swipe response is invoked in the mobile operating system. A virtual touch screen link is connected 2440A from the interpreter to the mobile operating system. A virtual surface touch screen swipe is generated 2440B in the interpreter, based on the free space swipe. The virtual touch screen swipe is communicated 2140C to the mobile operating system by way of the virtual touch screen link.

Figure 25:
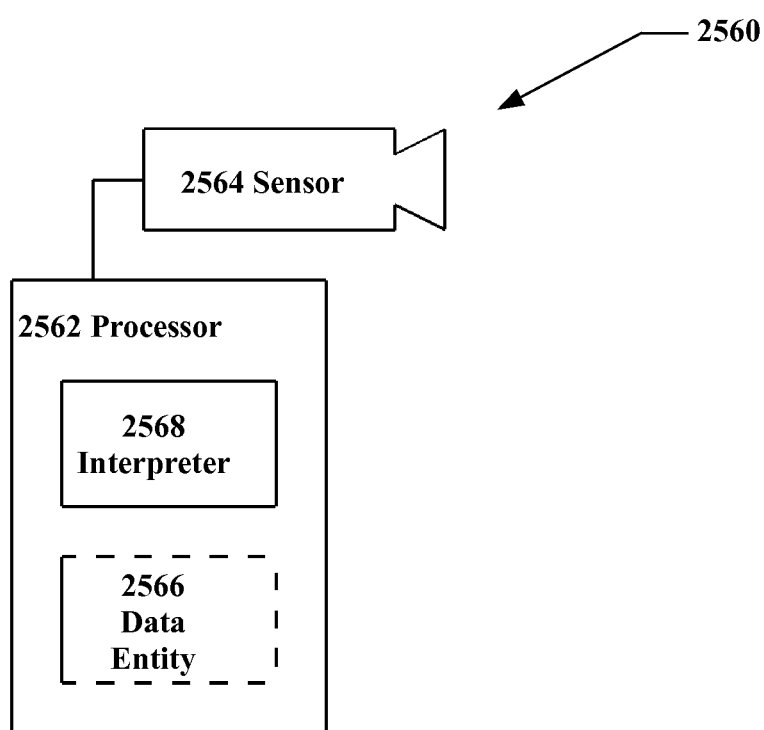
FIG. 25 shows an example embodiment of an apparatus according to, in schematic form.

Now with reference to FIG. 25, therein is shown an example embodiment of an apparatus, in schematic form.

In the example arrangement of FIG. 25, the apparatus 2560 includes a processor 2562, with a sensor 2564 in communication therewith. The processor further includes an interpreter 2568 disposed thereon. In addition, the arrangement of FIG. 25 shows a data entity 2566 disposed on the processor 2560. As noted previously, a data entity (such as an operating system) may not necessarily be part of various embodiments, but nevertheless may be present and in communication with various embodiments. The data entity 2566 is shown in dashed outline so as to emphasize this point.

The processor 2562 is adapted to execute executable instructions instantiated thereon. The invention is not limited with regard to the choice of processor 2562. Suitable processors 2562 include but are not limited to digital electronic microprocessors. Although the processor 2562 is referred to in at least some places herein as a self-contained physical device for purposes of clarity, this is not required, and other arrangements may be suitable. For example, the processor 2562 may constitute two or more physical processors working cooperatively, a processing capability in a network without a well-defined physical form, etc.

The sensor 2564 is adapted to sense free space input. As shown in FIG. 25, the sensor 2564 is an imager, such as a color digital camera, depth camera, etc. However, these are examples only, and embodiments are not limited with regard to what sensors may be utilized therein. Suitable sensors may include, but are not limited to, digital and/or analog cameras (whether operating in grayscale and/or color, and whether sensing visible light, infrared light, thermal radiation, and/or ultraviolet light) depth cameras, structured light sensors, time-of-flight sensors, and ultrasonic sensors.

As shown, the sensor 2564 is directly connected with the processor 2562, however this is an example only. Other arrangements may be equally suitable, including but not limited to arrangements wherein the sensor 2564 is not part of the apparatus 2560 at all, and/or wherein the sensor 2564 is physically distant from the apparatus 2560. In addition, embodiments are not limited with regard to how the processor 2562 and sensor 2564 may be in communication. Although a hard wired link may be suitable as shown in FIG. 25, other arrangements, including but not limited to wireless communication may be equally suitable.

The data entity 2566, as noted, may be an optional feature for at least certain embodiments, and where present may or may not be part of the apparatus 2560 itself (as indicated by the dashed outline thereof). Where present, a data entity 2566 may be adapted to carry out or at least to command to be carried out some function, such as a surface constrained input response, when that function is invoked by various embodiments. Embodiments are not limited with regard to what data entity 2566, if any, may be present, and/or whether that data entity 2566 is present at all. In addition, although the arrangement of FIG. 25 shows the data entity 2566 disposed on the processor 2562, the same processor 2562 upon which the interpreter 2568 is disposed, this is an example only.

Where present, the data entity 2566 may be present on a different processor. For example, an apparatus 2560 may have a processor 2562 with an interpreter 2568 disposed thereon, which is in communication with another processor. As a more concrete example, an apparatus 2560 may exist as a "plug in" device, adapted to be connected with another device so as to provide additional functionality. In such instance, the plug in device may have a processor 2560 separate from any processor that may be present in the other device. Similarly, the sensor 2564 shown as part of the apparatus 2560 may be a sensor on the other device, with the capability of that sensor 2564 then being utilized for the purposes of various embodiments.

Still with reference to FIG. 25, as noted an interpreter 2568 is disposed on the processor 2562. As previously described, an interpreter 2568 may include and/or represent two or more functions of various embodiments, such as a free space input standard and a comparer for determining whether free space input meets that standard. However, use of an interpreter 2568 is an example only, and other arrangements, including but not limited to arrangements wherein the free space input standard and comparer are individually disposed on the processor 2562, may be equally suitable.

Figure 26:
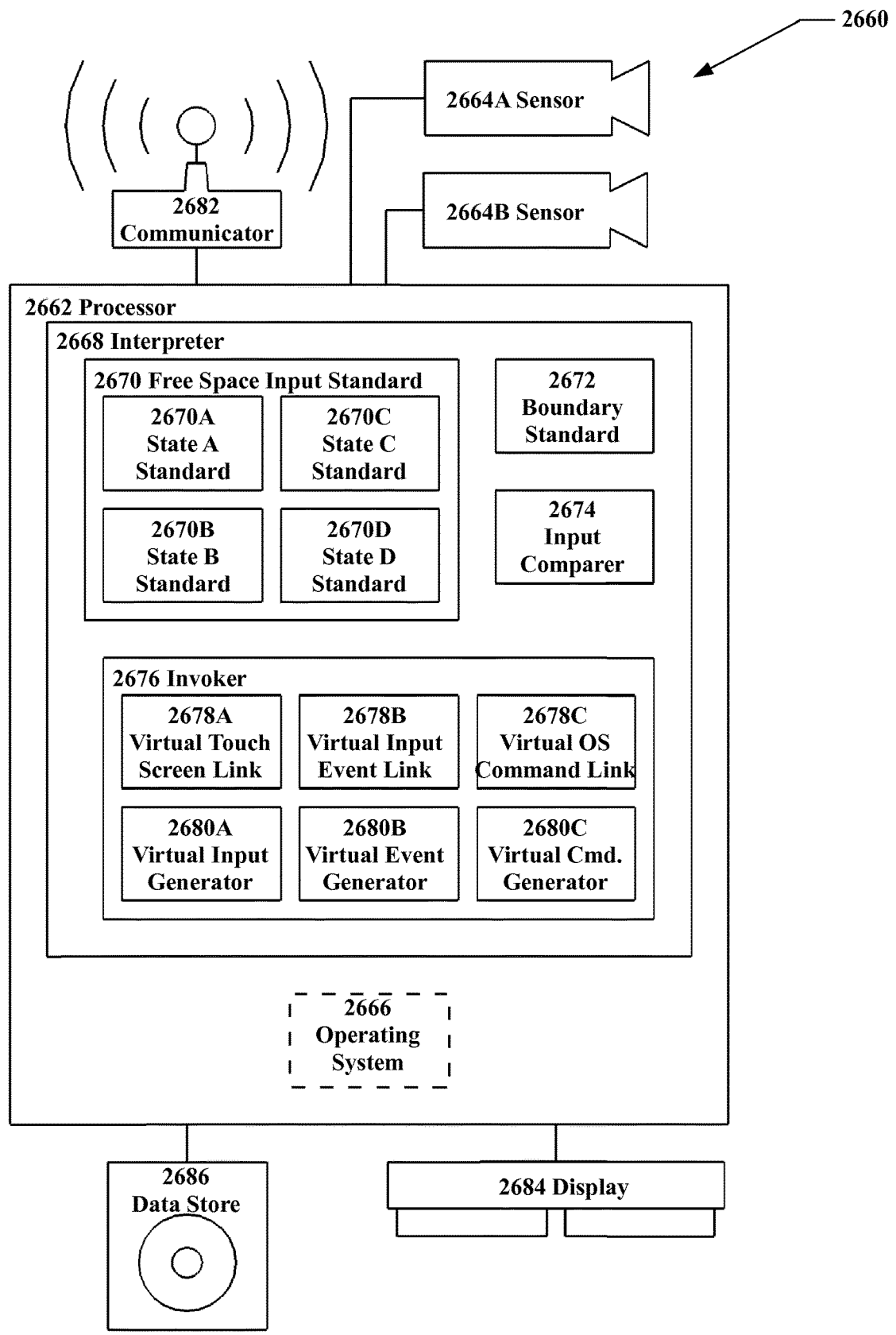
FIG. 26 shows another example embodiment of an apparatus according to, showing additional elements, in schematic form.

Now with reference to FIG. 26, therein is shown another example embodiment of an apparatus, in schematic form.

In the example arrangement of FIG. 26, the apparatus 2660 includes a processor 2662, at least somewhat similar to that described with regard to FIG. 25. The apparatus 2660 also includes sensors 2664A and 2664B in communication therewith. Sensors 2664A and 2664B also may be at least similar to that described with regard to FIG. 25, however as may be seen embodiments are not limited to only one sensor; likewise, other elements may be duplicated, combined, subdivided, etc.

The apparatus 2660 as shown in FIG. 26 also includes a communicator 2682 in communication with the processor 2662, adapted to communicate between the processor and other entities. Where a communicator 2682 is present, embodiments are not limited with regard to the communicator 2682. Typically though not necessarily a communicator 2682 may be a wireless communicator, such as a Wi-Fi or Bluetooth communicator, but other arrangements may be equally suitable.

The apparatus 2660 includes a display 2684 in communication with the processor 2662. As noted elsewhere herein, various embodiments may be applied for example to portable electronic devices, including but not limited to head mounted displays. Although embodiments do not necessarily require a display 2684, a display 2684 as may be present in certain embodiments is shown herein as an example. As illustrated in FIG. 26, the display 2684 is a stereo display, with left and right screens adapted to output to the left and right eyes of a viewer. However this also is an example only. Embodiments are not particularly limited with regard to the type of display 2684. Typically, although not necessarily, the display 2684 may be a visual display. Where present, a range of devices may be suitable for use as the display 2684, including but not limited to light emitting diodes (LED), organic light emitting diodes (OLED), plasma screen panels (PDP), liquid crystal displays (LCD), etc. Likewise, the use of projected or transmitted displays, where the viewed surface is essentially a passive screen for an image projected or otherwise transmitted after being generated elsewhere, may also be suitable. Other arrangements including but not limited to systems that display images directly onto a user's eyes also may be equally suitable. Either digital or analog display technologies may be suitable. Furthermore, embodiments are not limited only to the use of visual displays as a display 2684.

Still with regard to FIG. 26, the apparatus 2660 as shown therein includes a data store 2686 such as a hard drive, solid state drive, etc. in communication with the processor 2662. Neither a data store 2686 nor the functionality thereof is necessarily required for all embodiments, however previous examples and comments herein with regard to methods and apparatuses include references to data stores and/or other devices/systems, for example as facilitating instantiation of free space input standards onto processors, etc. As a more concrete example, a data store 2686 as shown in FIG. 26 may store information relevant to such establishment, that information being accessed by the processor 2662 and/or instantiated thereupon. Embodiments are not limited with regard to the inclusion and/or connection of elements such as a data store 2686, and while not necessarily required, neither are elements such as a data store 2686 (or communicator, display, etc.) prohibited. Embodiments also are not limited with regard to what data store 2686 may be suitable; although the data store 2686 is shown as a hard drive in FIG. 26, this is an example only and other arrangements may be equally suitable.

The processor 2662 includes an interpreter 2668 instantiated thereon. Typically though not necessarily, the interpreter 2668 and/or elements thereof may include executable instructions, data, etc.

As shown, the interpreter 2668 includes a free space input standard 2670, with the free space input standard 2670 including state standards: state A standard 2670A, state B standard 2670B, state C standard 2670C, and state D standard 2670D. The use of state standards 2670A through 2670D has been addressed previously herein, and is an example only; other arrangements, including but not limited to those also described in detail herein, may be equally suitable.

The interpreter 2668 includes a boundary standard 2672. Boundary standards also have been previously described herein. It is noted that previous examples may not have combined state standards (e.g. 2670A through 2670D) with a boundary standard 2672. Likewise, not all embodiments including state standards 2670A through 2670D necessarily will include a boundary standard 2672, or vice versa. Both are shown together herein as examples (though an embodiment including both is not excluded).

The interpreter 2668 includes an input comparer 2674 adapted to compare free space input (e.g. as received from sensors 2664A and/or 2664B) against the free space input standard 2670 and/or state standards 2670A through 2670D thereof.

The interpreter 2668 further includes an invoker 2676, adapted to invoke a touch screen input response. As shown in FIG. 26, the invoker 2676 includes a virtual touch screen link 2678A and a virtual input generator 2680A; a virtual touch input event link 2678B and a virtual event generator 2680B; and a virtual operating system command link 2678C and a virtual command generator 2680C. As noted, each such pair may be adapted to invoke a touch screen input response in a different manner. Typically, though not necessarily, a given embodiment may include only one such pair: a virtual touch screen link 2678A and a virtual input generator 2680A (adapted to communicate and generate virtual touch screen input, respectively), or a virtual touch input event link 2678B and a virtual event generator 2680B (adapted to communicate and generate virtual events, respectively), or a virtual operating system command link 2678C and a virtual command generator 2680C (adapted to communicate and generate virtual commands, respectively). All three pairs are shown in FIG. 26 for completeness, though typically only one such may be present (though embodiments having more than one are not excluded).

As noted previously with regard to FIG. 25, although certain elements of the apparatus 2660 are shown as being and/or being part of an interpreter 2668, similar elements and/or similar functionality thereof may be incorporated into various embodiments of an apparatus without necessarily utilizing an interpreter 2668.

The apparatus 2660 also may include, and/or may address without necessarily including, an operating system 2666 instantiated on the processor 2662, including but not limited to a mobile operating system.

Figure 27:
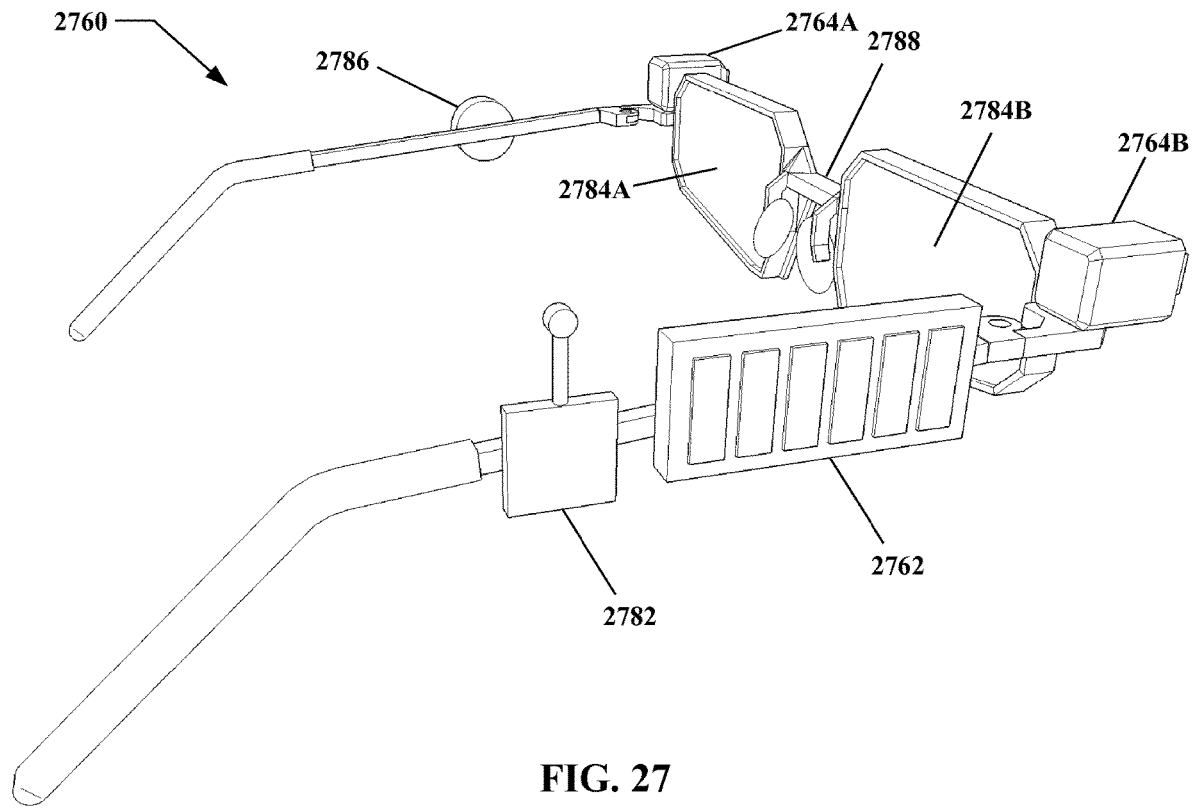
FIG. 27 shows an example embodiment of an apparatus according to, in perspective view.

Now with reference to FIG. 27, embodiments are not particularly limited with regard to form, and may be disposed on and/or incorporated into many shapes and/or other devices. Suitable configurations include but are not limited to the example shown in FIG. 27, is illustrated an apparatus configured in the form of a head mounted display resembling a pair of glasses.

As shown in FIG. 27, the example embodiment of the apparatus 2760 therein includes a body 2788 having a form similar to a pair of glasses, and adapted to be worn in a similar fashion. A processor 2762 adapted for executing executable instructions is disposed on the body 2788. Although not visible as distinct entities, the processor 2762 may support thereon an interpreter and a data entity similar to those shown in FIG. 25, an interpreter (including a free space input standard and/or state standards, a boundary standard, an input comparer, and an invoker including a virtual touch screen link and virtual input generator, virtual input event link and virtual event generator, or virtual operating system command link and virtual command generator) and an operating system similar to those shown in FIG. 26, and/or some other arrangement of executable instructions and/or data.

The apparatus 2760 in FIG. 27 includes a communicator 2782 and a data store 2786, both disposed on the body 2788. The apparatus 2760 also includes sensors 2764A and 2764B disposed on the body 2788, illustrated in FIG. 27 as imagers in a stereo configuration, though these are examples only. The apparatus 2760 further includes a display 2784A and 2784B disposed on the body 2788, illustrated as left and right visual displays in a stereo configuration.

It is noted that in the arrangement shown, the body 2788 is configured and sensors 2764A and 2764B are disposed thereon such that when the body 2788 is worn by a viewer, display motion sensors 2764A and 2764B would be substantially aligned with the lines of sight of the viewer's eyes, and could potentially encompass fields of view at least somewhat comparable to those of the viewer's eyes, assuming display motion sensors 2764A and 2764B exhibit fields of view similar in extent to those of the viewer. Similarly, in the arrangement shown the body 2788 is configured and the display 2784A and 2784B disposed thereon such that when the body 2788 is worn by a viewer, the display 2784A and 2784B would be proximate to and substantially in front of the viewer's eyes.

However, it is emphasized that the arrangement in FIG. 27 is an example only, and that other arrangements may be equally suitable, including but not limited to other head mounted displays and devices and systems other than a head mounted display.

Figure 28:
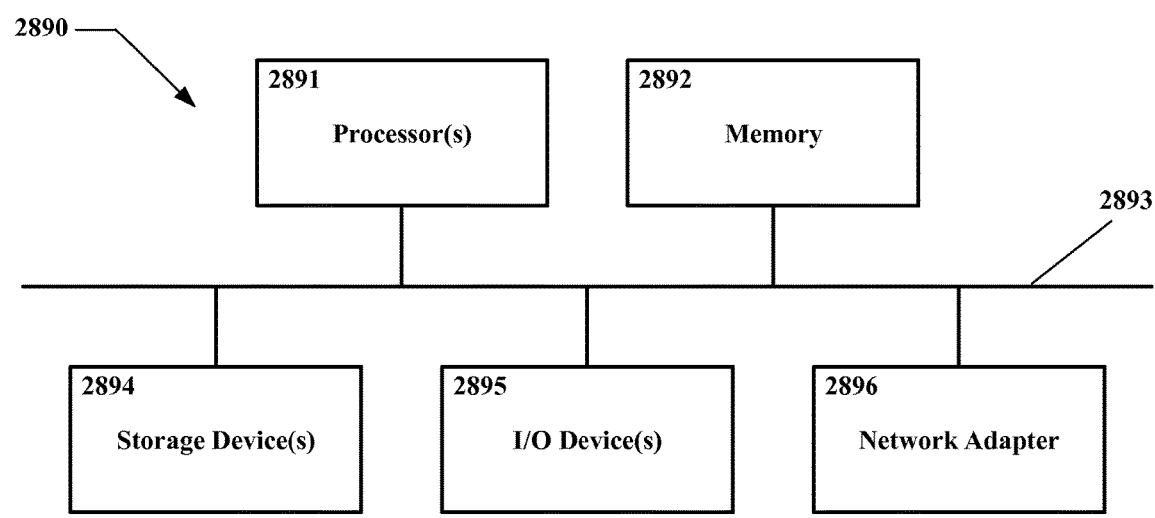

FIG. 28 is a block diagram of an apparatus that may perform various operations, and store various information generated and/or used by such operations, according to an embodiment of the disclosed technique. The apparatus may represent any computer or processing system described herein. The processing system 2890 is a hardware device on which any of the other entities, components, or services depicted in the examples of FIG. 1 through FIG. 27 (and any other components described in this specification) may be implemented. The processing system 2890 includes one or more processors 2891 and memory 2892 coupled to an interconnect 2893. The interconnect 2893 is shown in FIG. 28 as an abstraction that represents any one or more separate physical buses, point to point connections, or both connected by appropriate bridges, adapters, or controllers. The interconnect 2893, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The processor(s) 2891 is/are the central processing unit of the processing system 2890 and, thus, control the overall operation of the processing system 2890. In certain embodiments, the processor(s) 2891 accomplish this by executing software or firmware stored in memory 2892. The processor(s) 2891 may be, or may include, one or more programmable general-purpose or special-purpose microprocessors, digital signal processors (DSPs), programmable controllers, application specific integrated circuits (ASICs), programmable logic devices (PLDs), trusted platform modules (TPMs), or the like, or a combination of such devices.

The memory 2892 is or includes the main memory of the processing system 2890. The memory 2892 represents any form of random access memory (RAM), read-only memory (ROM), flash memory, or the like, or a combination of such devices. In use, the memory 2892 may contain a code. In one embodiment, the code includes a general programming module configured to recognize the general-purpose program received via the computer bus interface, and prepare the general-purpose program for execution at the processor. In another embodiment, the general programming module may be implemented using hardware circuitry such as ASICs, PLDs, or field-programmable gate arrays (FPGAs).

The network adapter 2894, a storage device(s) 2895, and I/o device(s) 2896, are also connected to the processor(s) 2891 through the interconnect 2893 The network adapter 2894 provides the processing system 2890 with the ability to communicate with remote devices over a network and may be, for example, an Ethernet adapter or Fibre Channel adapter. The network adapter 2894 may also provide the processing system 2890 with the ability to communicate with other computers within the cluster. In some embodiments, the processing system 2890 may use more than one network adapter to deal with the communications within and outside of the cluster separately.

The I/o device(s) 2896 can include, for example, a keyboard, a mouse or other pointing device, disk drives, printers, a scanner, and other input and/or output devices, including a display device. The I/O device(s) 2896 also may include, for example, cameras and/or other imagers adapted to accept visual input including but not limited to postures and/or gestures. The display device may include, for example, a cathode ray tube (CRT), liquid crystal display (LCD), or some other applicable known or convenient display device. The display device may take various forms, including but not limited to stereo displays suited for use in near-eye applications such as head mounted displays or other wearable devices.

The code stored in memory 2892 may be implemented as software and/or firmware to program the processor(s) 2891 to carry out actions described herein. In certain embodiments, such software or firmware may be initially provided to the processing system 2890 by downloading from a remote system through the processing system 2890 (e.g., via network adapter 2894).

The techniques herein may be implemented by, for example, programmable circuitry (e.g. one or more microprocessors) programmed with software and/or firmware, or entirely in special-purpose hardwired (non-programmable) circuitry, or in a combination of such forms. Special-purpose hardwired circuitry may be in the form of, for example, one or more AISCs, PLDs, FPGAs, etc.

Software or firmware for use in implementing the techniques introduced here may be stored on a machine-readable storage medium and may be executed by one or more general-purpose or special-purpose programmable microprocessors. A "machine-readable storage medium", as the term is used herein, includes any mechanism that can store information in a form accessible by a machine.

A machine can also be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch, or bridge, or any machine capable of executing a set of instructions (sequential or otherwise) that specify actions to be taken by that machine.

A machine-accessible storage medium or a storage device (s) 2895 includes, for example, recordable/non-recordable media (e.g., ROM; RAM; magnetic disk storage media; optical storage media; flash memory devices; etc.), etc., or any combination thereof. The storage medium typically may be non-transitory or include a non-transitory device. In this context, a non-transitory storage medium may include a device that is tangible, meaning that the device has a concrete physical form, although the device may change its physical state. Thus, for example, non-transitory refers to a device remaining tangible despite this change in state.

The term "logic", as used herein, may include, for example, programmable circuitry programmed with specific software and/or firmware, special-purpose hardwired circuitry, or a combination thereof.

The above specification, examples, and data provide a complete description of the manufacture and use of the composition of the invention. Since many embodiments of the invention can be made without departing from the spirit and scope of the invention, the invention resides in the claims hereinafter appended.

The invention claimed is:

1. A method, comprising:
   establishing a surface constrained input standard for a surface constrained input;
   determining a free space input standard for a free space input,
      wherein the free space input is received within an augmented reality construct defined by a virtual boundary in free space,
      wherein the free space input standard comprises a touchdown state sub-standard associated with an end effector in the free space, and
      wherein the touchdown state sub-standard:
         determines a left to right displacement range of the end effector in a first position by the free space input standard, wherein the left to right displacement range comprises a minimum size and a maximum size of a right to left motion of the end effector;
         determines a downward and an upward motion of the end effector within a range; and
         limits bounce acceleration to a predetermined number of taps, wherein a tap comprises one or more of a bounce, rapid stop, or reversal of a downward motion to an upward motion of the end effector; and
   associating the free space input with a surface constrained input response.

2. The method of claim 1, further comprising sensing the free space input with a head-mounted device, wherein the free space input comprises:
   a first stroke of a first digit within the virtual boundary, wherein the first stroke comprises the first digit moving from a first plane in the virtual boundary to a second plane in the virtual boundary;
   a second stroke of the first digit comprises the first digit moving horizontally along the second plane in the virtual boundary;
   a third stroke of the first digit within the virtual boundary, comprising:
      the third stroke comprises the first digit moving away from the second plane; and
      the first stroke, the second stroke, and the third stroke within the virtual boundary mimic the surface constrained input.

3. The method of claim 1, further comprising sensing a fourth stroke of a second digit of a hand of an individual within the virtual boundary, wherein the fourth stroke comprises: the second digit moving from being in the first position to a second position; or the second digit moving from being in the second position to being in the first position.

4. The method of claim 1, wherein a standard of the free space input standard comprises excluding the bounce by excluding sudden stops in vertical motion, rapid reversals in vertical velocity, or excessive vertical acceleration.

5. The method of claim 1, wherein a tap comprises an acceleration profile that includes the bounce.

6. The method of claim 1, wherein the left to right displacement range defines a right swipe from other inputs.

7. The method of claim 6, wherein the left to right displacement range comprises minimum threshold of an overall right to left motion or a maximum threshold of the overall right to left motion.

8. The method of claim 1, further comprising a sensor that is integrated into a head-mounted device to sense the free space input; and wherein the surface constrained input is sensed by the sensor relative to a head of an individual.

9. The method of claim 1, wherein the bounce comprises a downward motion that is reversed to an upward motion.

10. A method, comprising:
establishing a surface constrained input standard for a surface constrained input, wherein the surface constrained input is a first input;
determining a free space input standard for a free space input, the free space input being a second input generated within an augmented reality construct defined by a virtual boundary, wherein the virtual boundary is in a free space;
determining that the free space input standard includes one or more of a standard for:
determining a first movement of a first digit of a hand of an individual while the first digit is in a first position and a second digit of the hand of the individual is also in the first position;
determining a left to right displacement range of the first digit in a first position by the free space input standard;
excluding a bounce by excluding a sudden stop in a vertical motion, a rapid reversal in vertical velocity, or an excessive vertical acceleration; and
determining a pre-defined range of motion of a knuckle of the first digit; determining that the free space input standard excludes the first movement of the first digit while the first digit is in the first position and the second digit is in a second position; and
sensing the free space input within the virtual boundary.

11. The method of claim 10, wherein the first position of the first digit or second digit comprises an extended digit position; and wherein the second position of the second digit comprises a non-extended digit position.

12. The method of claim 10, wherein the free space input comprises a swipe.

13. The method of claim 10, wherein the left to right displacement range comprises a minimum size and a maximum size of a right to left motion of the first digit.

14. An apparatus, comprising:
a processor to:
determine a surface constrained input standard for a surface constrained input;
determine a free space input standard for a free space input, the free space input being received within an augmented reality construct defined by a virtual boundary, wherein the free space input standard comprises a standard that:
determines a left to right displacement range of a first digit in a first position, wherein the left to right displacement range comprises a minimum size and a maximum size of a right to left motion of an end effector; and
limits bounce acceleration to a predetermined number of taps;
determine that the free space input standard includes a second movement of the first digit while the first digit is in a first position and a second digit is in the first position, and excludes a first movement of the first digit while the first digit is in the first position and the second digit is in a second position, wherein the second movement mimics a surface constrained input;
generate the free space input that includes the second movement of the first digit and excludes the first movement of the first digit; and
execute a surface constrained input associated with the free space input.

15. The apparatus of claim 14, wherein the predetermined number of taps comprise degenerate taps that comprise left to right motions indicative of right swipes.

16. The apparatus of claim 14, wherein the bounce acceleration is indicative of imperfect hand motion comprising at least one of a tremor motion, a hand motion influenced by wind, a variation in motion due to a clothing restriction, or an injury motion.

17. The apparatus of claim 14, wherein left to right displacement range comprises a movement of an index finger from left to right within a specified range.

18. The method of claim 14, further comprising determining that the free space input standard comprises the first movement of the first digit of a hand of an individual while the first digit is in the first position and the second digit of the hand of the individual is also in the first position.

19. The method of claim 14, further comprising determining that the free space input standard excludes the first movement of the first digit while the first digit is in the first position and the second digit is in the second position different than the first position.

20. The method of claim 14, wherein:
the first position comprises an extended digit position; and
the second position of the second digit comprises a non-extended digit position.

* * * * *